US012747000B2

(12) United States Patent
Driant et al.

(10) Patent No.: US 12,747,000 B2
(45) Date of Patent: Sep. 29, 2026

(54) COOLING AND HEATING SYSTEM FOR ELECTRIC SNOWMOBILE

(71) Applicant: BOMBARDIER RECREATIONAL PRODUCTS INC., Valcourt (CA)

(72) Inventors: Thomas Driant, Saint-François-Xavier-de-Brompton (CA); Yannick Bourque, St-Denis-de-Brompton (CA); Antoine Noel, Sherbrooke (CA)

(73) Assignee: BOMBARDIER RECREATIONAL PRODUCTS INC., Valcourt (CA)

(*) Notice: Subject to any disclaimer, the term of this patent is extended or adjusted under 35 U.S.C. 154(b) by 296 days.

(21) Appl. No.: 18/712,747

(22) PCT Filed: Jun. 29, 2023

(86) PCT No.: PCT/IB2023/056782
§ 371 (c)(1),
(2) Date: May 23, 2024

(87) PCT Pub. No.: WO2024/003832
PCT Pub. Date: Jan. 4, 2024

(65) Prior Publication Data

US 2025/0010703 A1 Jan. 9, 2025

Related U.S. Application Data

(60) Provisional application No. 63/356,849, filed on Jun. 29, 2022.

(51) Int. Cl.
*B62M 27/02* (2006.01)
*B60K 11/04* (2006.01)

(52) U.S. Cl.
CPC ............ *B62M 27/02* (2013.01); *B60K 11/04* (2013.01); *B62M 2027/023* (2013.01); *B62M 2027/028* (2013.01)

(58) Field of Classification Search
CPC .. B62M 27/02; B62M 2027/028; B60K 11/04
See application file for complete search history.

(56) References Cited

U.S. PATENT DOCUMENTS 6,508,211 B1 1/2003 Asano
10,406,910 B2 9/2019 Vezina et al.
(Continued)

FOREIGN PATENT DOCUMENTS

WO 2023073673 A1 5/2023
WO WO-2024003882 A2 * 1/2024 ................ B60L 1/08

OTHER PUBLICATIONS

International Search Report of PCT/IB2023/0056782; Kari Rodriguez; Oct. 20, 2023.

*Primary Examiner* — Kevin Hurley
(74) *Attorney, Agent, or Firm* — BCF LLP

(57) ABSTRACT

An electric snowmobile having: a frame having a tunnel; a seat; at least one ski; a drive track; an electric motor; a battery pack; a charger; a cooling and heating system; and a temperature sensor. The cooling and heating system has: a valve having an inlet, and first and second outlets; a heat exchanger connected to the tunnel or defining part of the tunnel, the heat exchanger being fluidly connected to the first outlet; a heater fluidly connected to the second outlet; and a pump fluidly connected to the inlet. In a first position of the valve; the first outlet is open; and the second outlet is closed. In a second position of the valve; the first outlet is closed; and the second outlet is open.

18 Claims, 45 Drawing Sheets

(56) References Cited

U.S. PATENT DOCUMENTS

| | | | | |
|---|---|---|---|---|
| 11,597,473 | B2 * | 3/2023 | Matsushita | B62J 43/16 |
| 12,300,839 | B2 * | 5/2025 | Connors | B60K 1/00 |
| 2012/0102995 | A1 | 5/2012 | Sakata | |
| 2021/0138868 | A1 | 5/2021 | Bruneau et al. | |
| 2021/0384753 | A1 | 12/2021 | Kozuma et al. | |
| 2022/0111929 | A1 | 4/2022 | Matsushita | |
| 2025/0042305 | A1 * | 2/2025 | Driant | B60K 1/04 |
| 2026/0066374 | A1 * | 3/2026 | Boschman | H01M 10/613 |

* cited by examiner

COOLING AND HEATING SYSTEM FOR ELECTRIC SNOWMOBILE

CROSS-REFERENCE

The present application claims priority to U.S. Provisional Patent Application No. 63/356,849, filed Jun. 29, 2022, the entirety of which is incorporated herein by reference.

TECHNICAL FIELD

The present technology relates to cooling and heating systems for electric snowmobiles.

BACKGROUND

Many recent vehicles are powered by one or more electric motors instead of an internal combustion engine. Over the life of a vehicle, an electric vehicle will typically pollute less than a comparable vehicle having an internal combustion engine. Electric vehicles also tend to be quieter than their gas-powered counterparts.

Snowmobiles could also benefit from these advantages of having an electric motor. However, due to the relatively small size of a snowmobile, the need for the snowmobile to float over snow, and the lack of charging infrastructures in many areas where snowmobiles are used, the electrification of snowmobiles has many challenges not faced by other vehicles such as cars. One such challenge consists in providing a cooling system for cooling the various components of an electric snowmobile that require it. Another challenge is due to the cold temperatures in which a snowmobile operates and which can, under certain conditions, negatively impact the performance of the battery pack.

Therefore, there is a need for a system for a snowmobile that addresses at least some of these particular challenges.

SUMMARY

It is an object of the present technology to ameliorate at least some of the inconveniences present in the prior art.

According to an aspect of the present technology, there is provided an electric snowmobile having: a frame having a tunnel; a seat connected to the tunnel; at least one ski operatively connected to the frame; a drive track disposed at least in part under the tunnel; an electric motor supported by the frame, the electric motor being operatively connected to the drive track; a battery pack connected to the frame and electrically connected to the electric motor; a charger electrically connected to the battery pack a cooling and heating system; and a temperature sensor. The cooling and heating system has: a valve having an inlet, a first outlet and a second outlet; a heat exchanger connected to the tunnel or defining part of the tunnel, the heat exchanger being fluidly connected to the first outlet of the valve; a heater fluidly connected to the second outlet of the valve; and a pump fluidly connected to the inlet of the valve for causing coolant flow through the cooling and heating system. In a first position of the valve: the first outlet of the valve is open; the second outlet of the valve is closed; and coolant pumped by the pump flows: from the valve to the heat exchanger, from the heat exchanger to the charger, the battery pack and the electric motor, and from the charger, the battery pack and the electric motor to the valve. In a second position of the valve: the first outlet of the valve is closed; the second outlet of the valve is open; and coolant pumped by the pump flows: from the valve to the heater, from the heater to the battery pack and the electric motor, and from the battery pack and the electric motor to the valve.

In some embodiments, in the first position of the valve, coolant pumped by the pump flows sequentially from the valve to the heat exchanger, from the heat exchanger to the charger, from the charger to the battery pack, from the battery pack to the electric motor, and from the electric motor to the valve.

In some embodiments, in the first position of the valve, coolant pumped by the pump flows sequentially from the charger to the heater, and from the heater to the battery pack.

In some embodiments, in the second position of the valve, coolant pumped by the pump flows sequentially from the valve to the heater, from the heater to the battery pack, from the battery pack to the electric motor, and from the electric motor to the valve.

In some embodiments, in the second position of the valve, coolant pumped by the pump bypasses the heat exchanger.

In some embodiments, in the second position of the valve, coolant pumped by the pump bypasses the charger.

In some embodiments, in the first and second positions of the valve, coolant pumped by the pump flows sequentially from the battery pack to the pump, and from the pump to the electric motor.

In some embodiments, an inverter is electrically connected to the battery pack. In the first and second positions of the valve, coolant pumped by the pump flows sequentially from the inverter to the battery pack.

In some embodiments, the temperature sensor is a thermistor.

In some embodiments, the heat exchanger is fluidly connected between the first outlet of the valve and the charger. The charger is fluidly connected between the heat exchanger and the heater. The heater is fluidly connected between the charger and the battery pack. The heater is fluidly connected between the second outlet of the valve and the battery pack. The battery pack is fluidly connected between the heater and the electric motor. The electric motor is fluidly connected between the battery pack and the inlet of the valve.

In some embodiments, the pump is fluidly connected between the battery pack and the electric motor.

In some embodiments, the cooling and heating system also has an expansion tank fluidly connected to the pump.

In some embodiments, in response to the temperature sensed by the temperature sensor being below a predetermined temperature: moving the valve to the second position of the valve.

In some embodiments, in response to the temperature sensed by the temperature sensor being below a predetermined temperature and to the valve being in the second position of the valve: turning the heater on in response to the charger being powered by an external power source.

In some embodiments, in response to the temperature sensed by the temperature sensor being below a predetermined temperature and to the valve being in the second position of the valve: turning the heater off in response to the snowmobile being in use.

In some embodiments, in response to the temperature sensed by the temperature sensor being below the predetermined temperature, to the valve being in the second position of the valve, and to the snowmobile being in use: applying electric power to the electric motor for generating heat in response to the snowmobile being at rest.

In some embodiments, the predetermined temperature is a first predetermined temperature. In response to a temperature sensed by the temperature sensor being above a second predetermined temperature: moving the valve to the first position of the valve. The second predetermined temperature is higher than the first predetermined temperature.

In some embodiments, in response to the temperature sensed by the temperature sensor being above a predetermined temperature: moving the valve to the first position of the valve.

For purposes of this application, terms related to spatial orientation when referring to the vehicle orientation and positioning of its components such as forwardly, rearwardly, left, and right are as they would normally be understood by a driver of the vehicle sitting thereon in a normal riding position.

Embodiments of the present technology each have at least one of the above-mentioned aspects, but do not necessarily have all of them.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
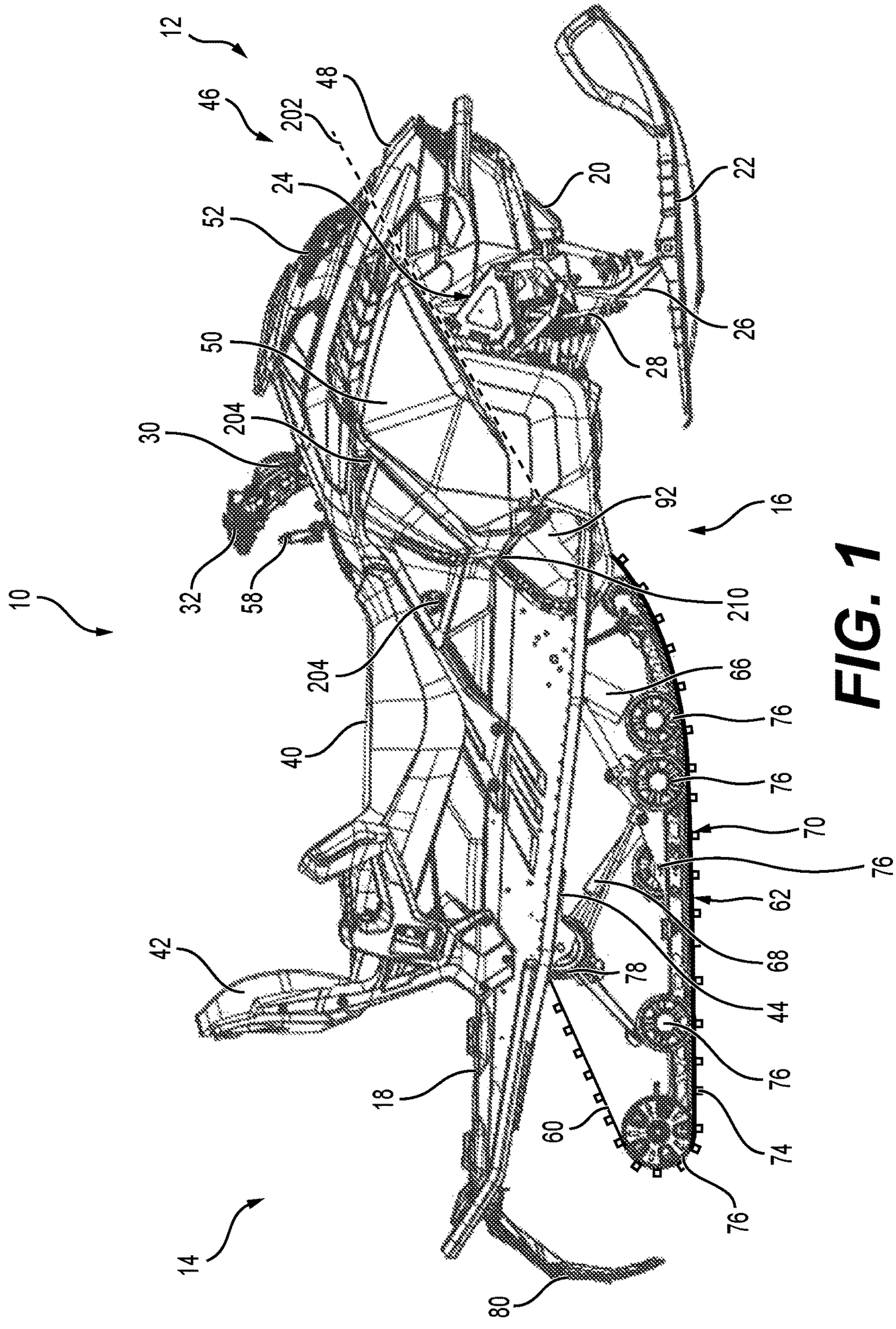
FIG. 1 is a right side elevation view of an electric snowmobile.

With reference to FIGS. 1 to 5, a snowmobile 10 in accordance with an embodiment of the present technology will be described herein. The snowmobile 10 has a front end 12 and a rear end 14, which are defined consistently with the forward travel direction of the snowmobile 10. The snowmobile 10 has a frame 16 for supporting the various components of the snowmobile 10. The frame 16 includes a tunnel 18 and a subframe 20 connected to the tunnel 18 and being disposed in front of the tunnel 18. The frame 16 will be described in more detail below.

Figure 2:
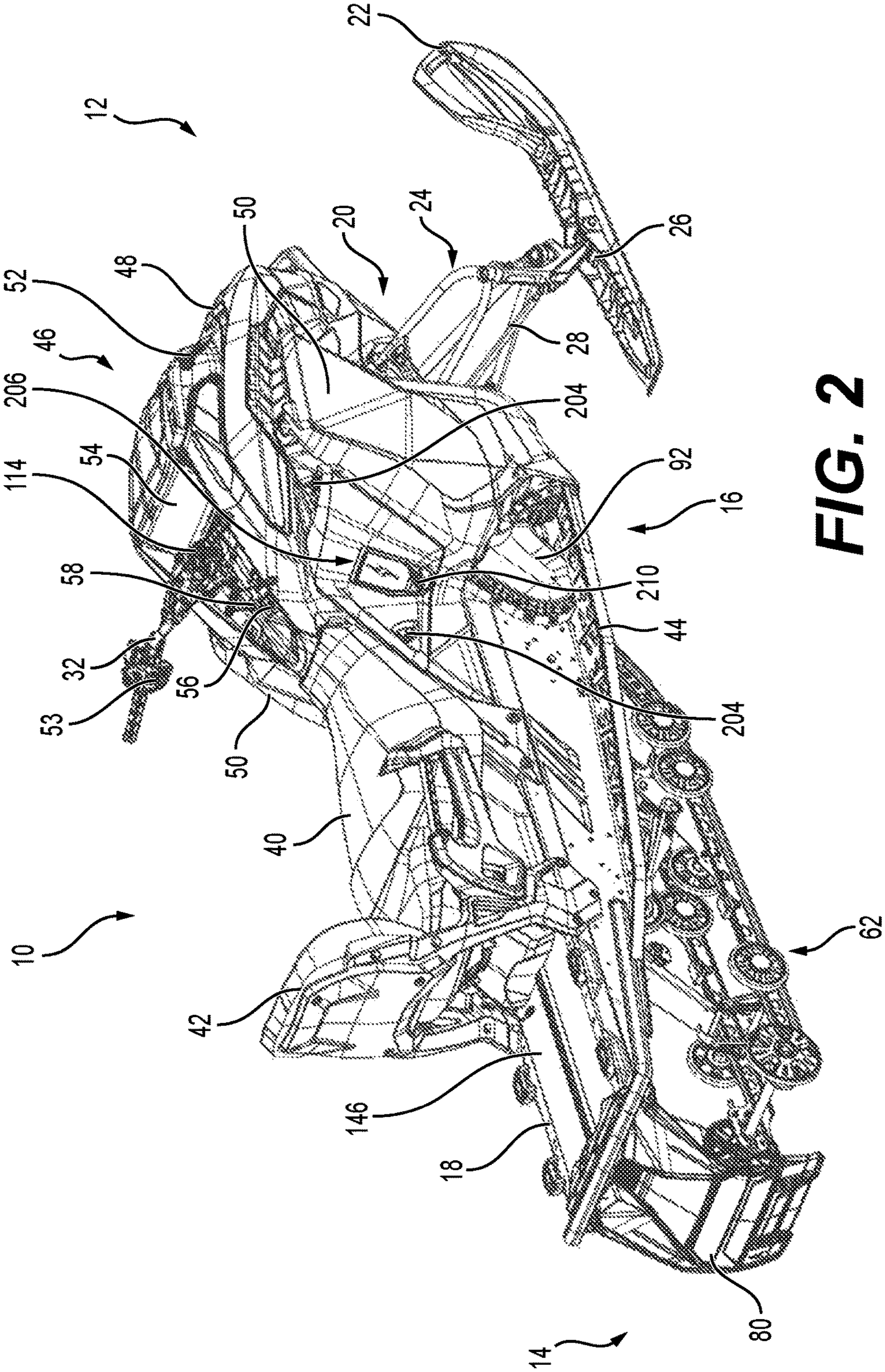
FIG. 2 is a perspective view, taken from a rear, right side of the snowmobile of FIG. 1, with the drive track being removed.
Figure 3:
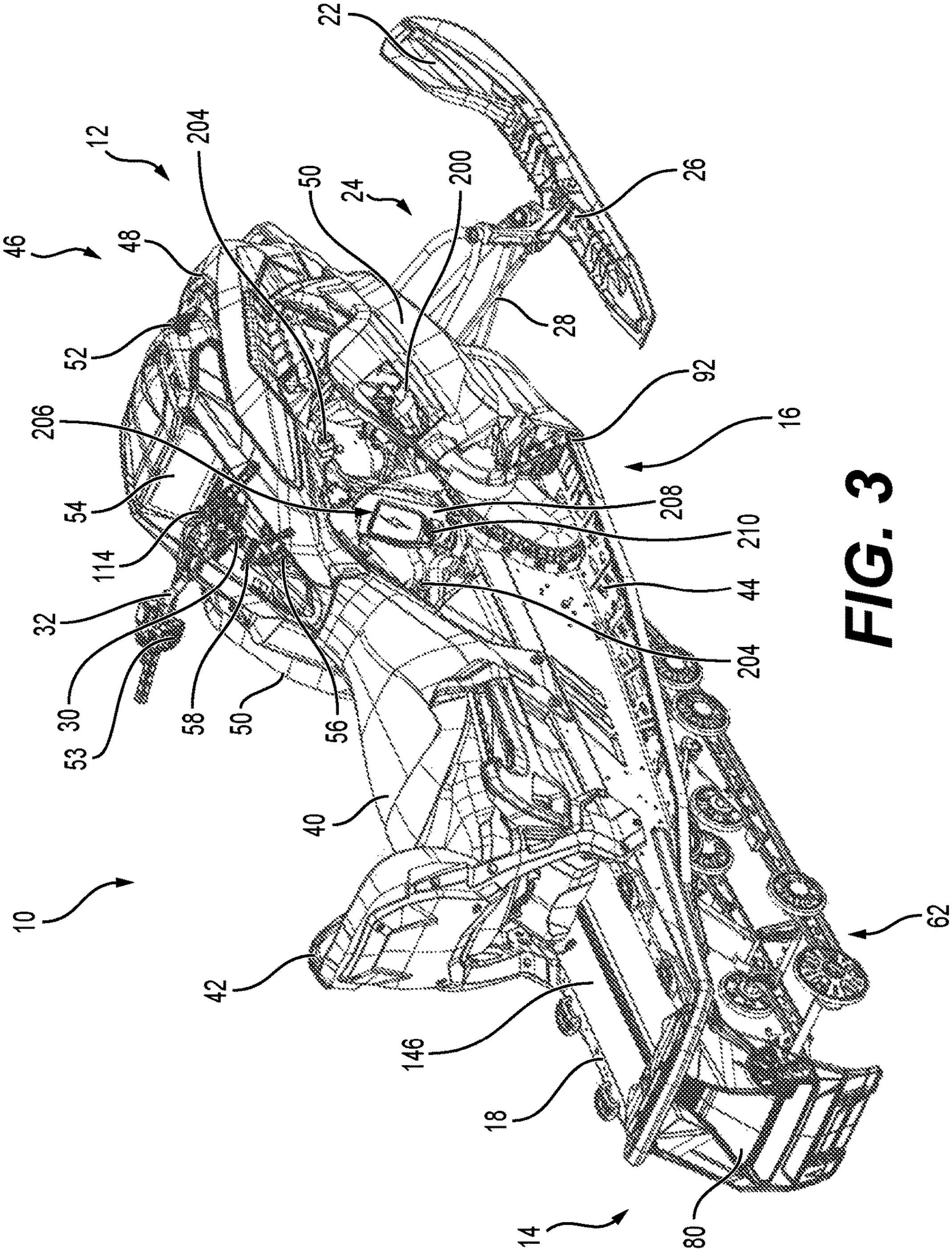
FIG. 3 is a perspective view, taken from a rear, right side of the snowmobile of FIG. 2, with a right side panel being in an open position.
Figure 12:
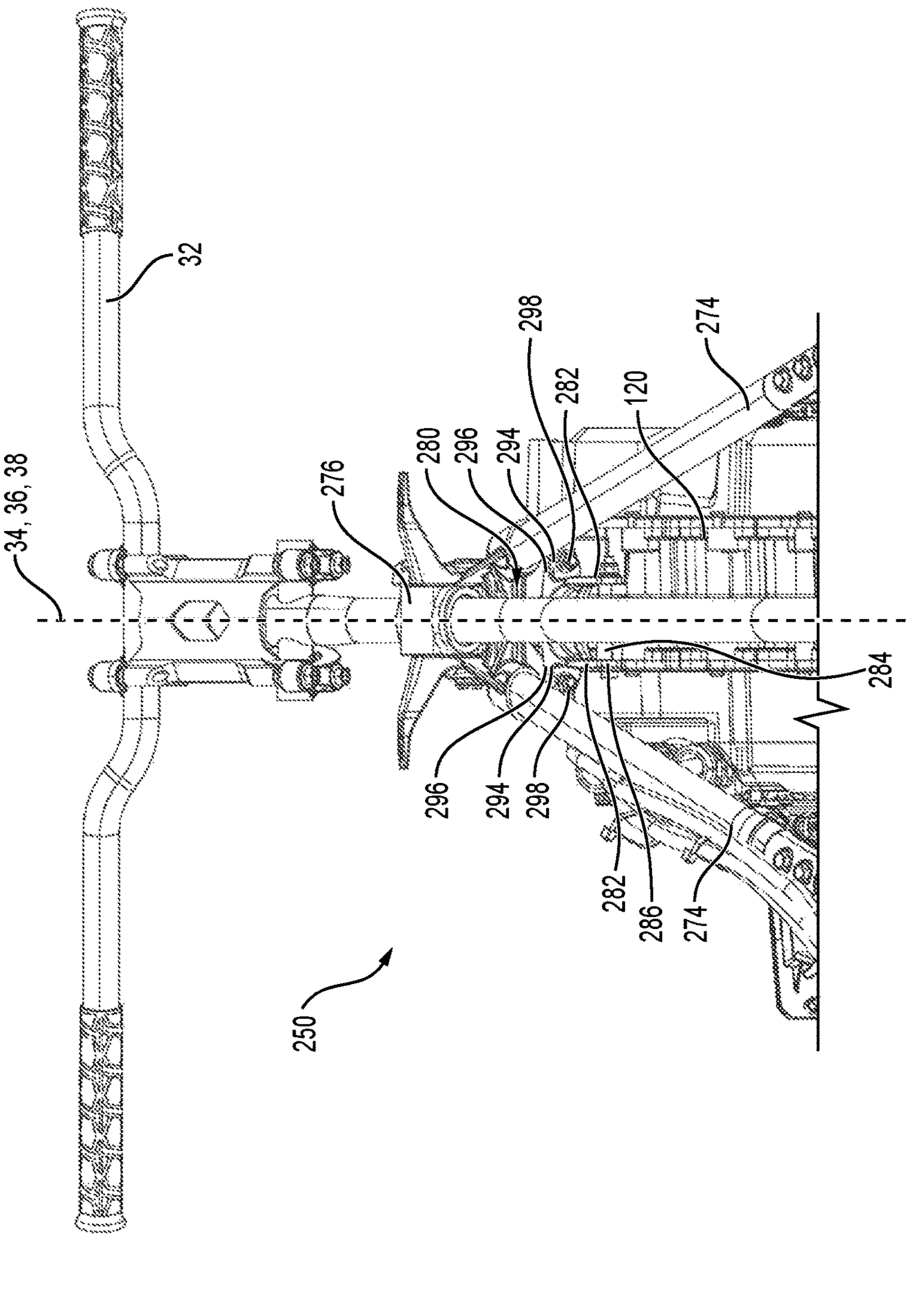
FIG. 12 is a close-up, front elevation view of an upper portion of the components of FIG. 11.
Figure 13:
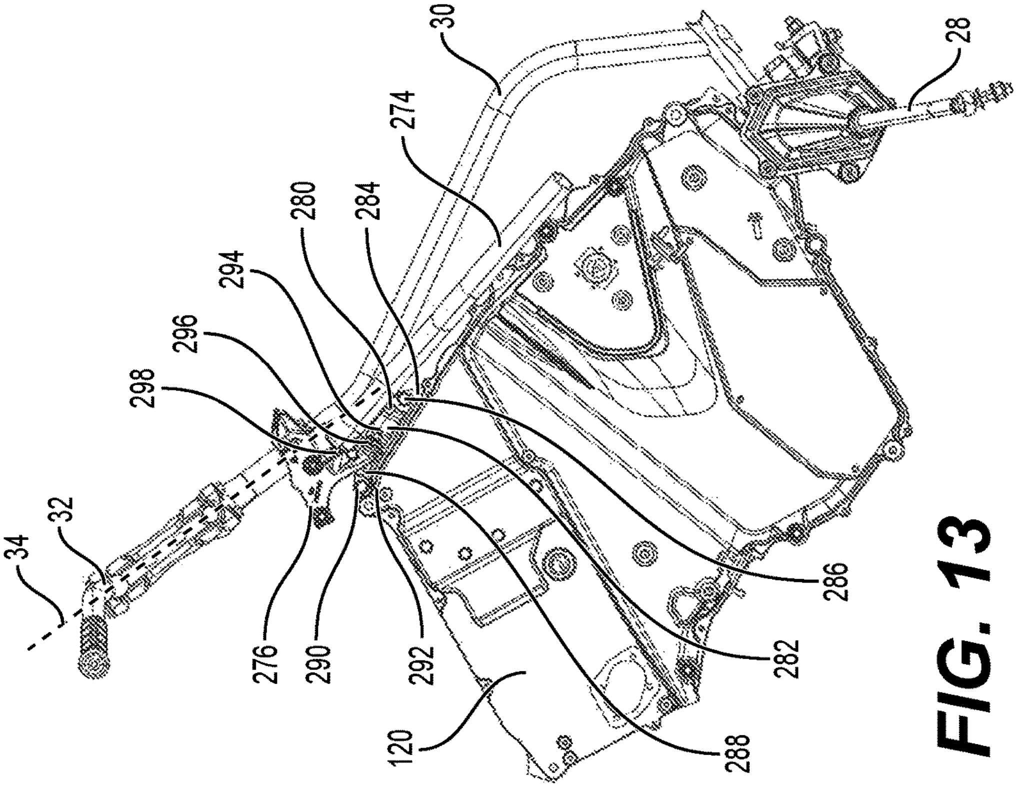
FIG. 13 is a right side elevation view of the battery pack, part of the frame and the steering assembly of the snowmobile of FIG. 1.

The snowmobile 10 has left and right skis 22 positioned at the front end 12 of the snowmobile 10 and connected to the subframe 20 through left and right front suspension assemblies 24. Left and right ski legs 26, also referred to as spindles, connect the left and right skis 22 to the left and right front suspension assemblies 24 respectively. In the present embodiment, the front suspension assemblies 24 are double A-arm suspension assemblies, but other types of front suspension assemblies are contemplated. As shown in FIG. 2 for the right ski leg 26, the ski legs 26 are connected to steering links 28. With reference to FIG. 13, the steering links 28 are operatively connected to a lower end of a steering column 30. A handlebar 32 is connected to a top end of the steering column 30. Turning the handlebar 32 pivots the steering column 30 about a steering axis 34 (FIG. 13), which in turn pushes or pulls on the steering links 28, which turns the ski legs 26, and thereby the skis 22, which steers the snowmobile 10. In the present embodiment, a vertical plane 36 (see FIG. 12 for example) containing the steering axis 34 is coplanar with a plane 38 (FIG. 5) extending vertically and longitudinally along a center of the snowmobile 10. It is contemplated that in some embodiments, the snowmobile 10 could have only one central ski 22.

A straddle seat 40 is disposed rearward of the handlebar 32 over the tunnel 18 and is connected to the tunnel 18. A passenger backrest 42 is connected to the tunnel 18 and is disposed at the rear of the straddle seat 40. It is contemplated that the backrest 42 could be omitted. Left and right footrests 44 are connected to and extend outward from the tunnel 18. The footrests 44 are vertically lower than the straddle seat 40 to accommodate the driver's and the passenger's feet.

Figure 32:
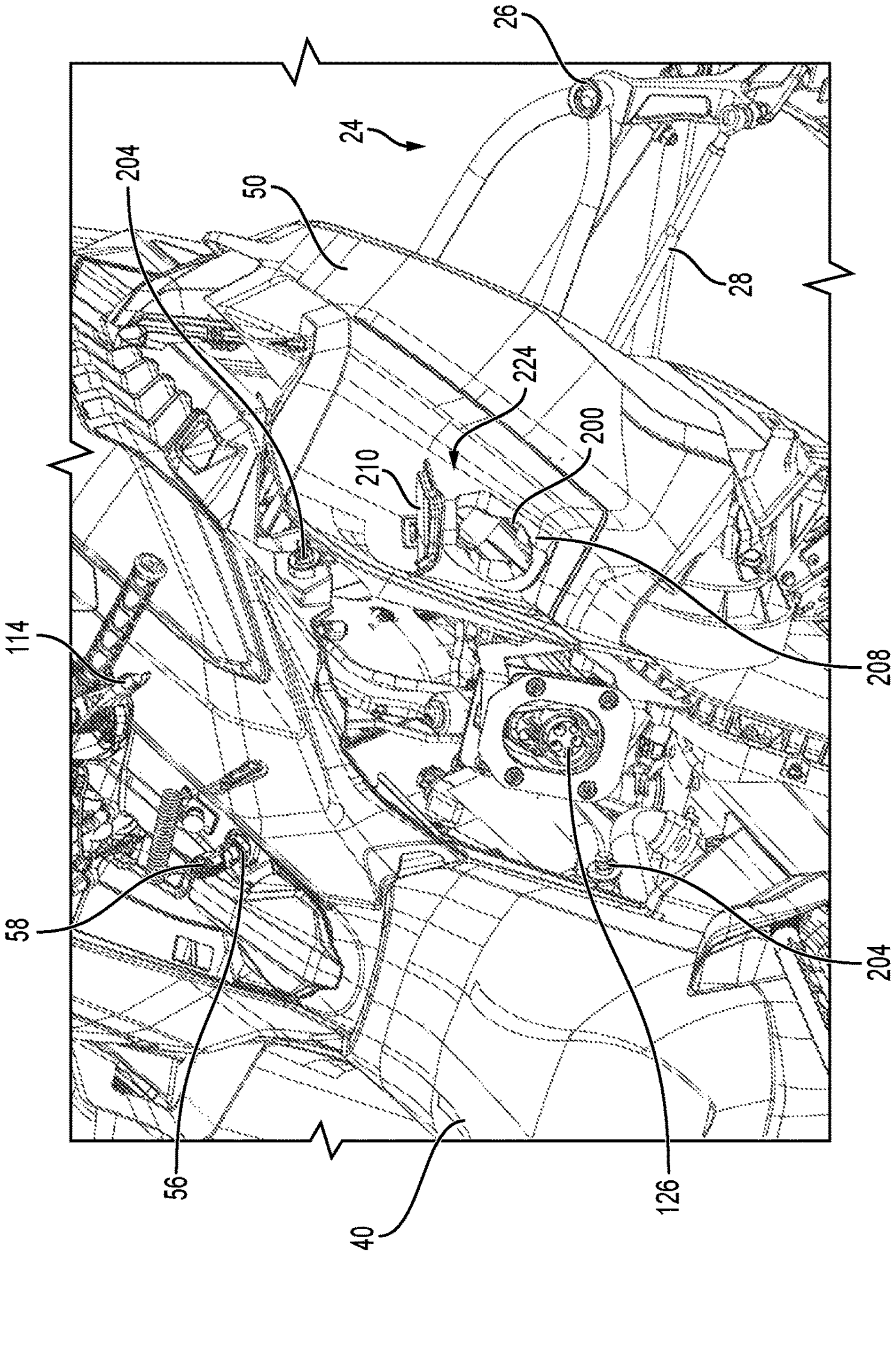
FIG. 32 is a close-up, perspective view, taken from a rear right side of a front right portion of an alternative embodiment of the snowmobile of FIG. 1 having the door of the charging port of FIG. 30, with a right side panel being in an open position.
Figure 33:
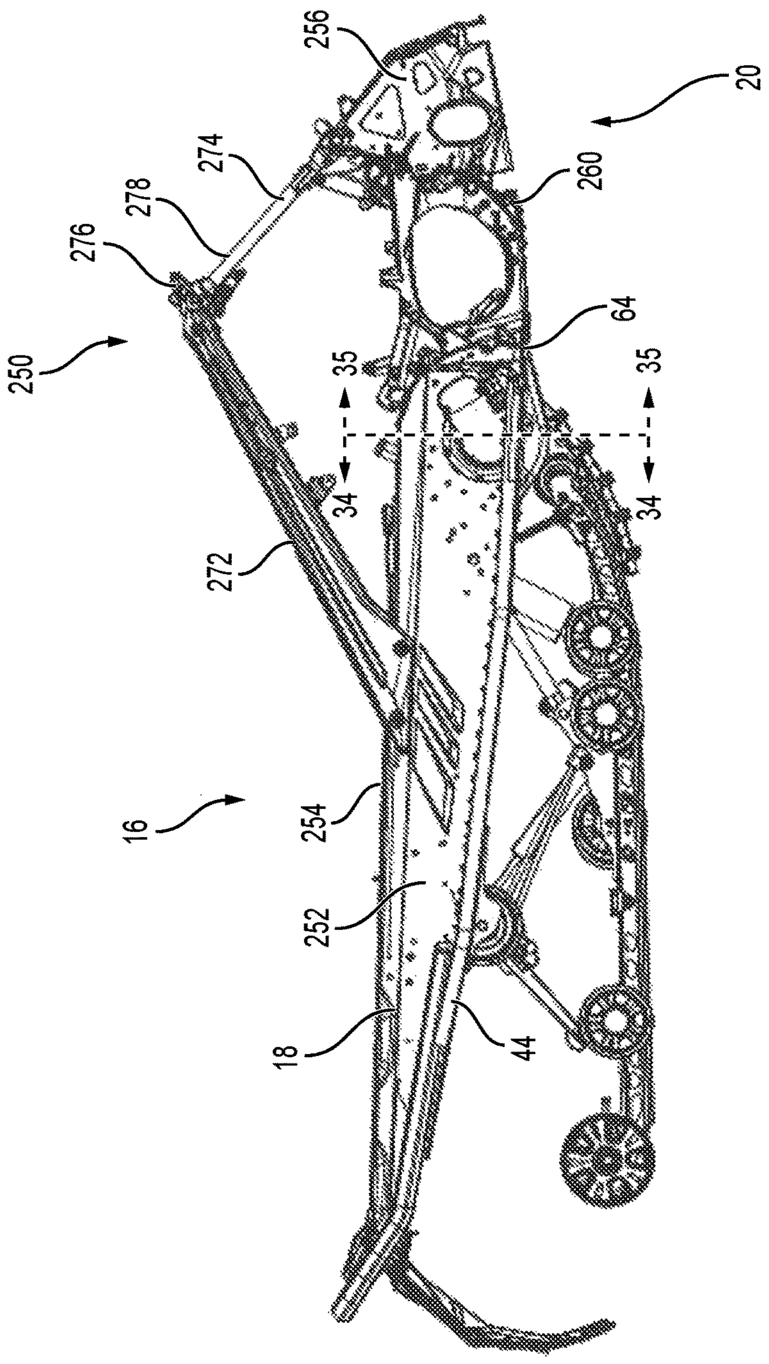
FIG. 33 is a right side elevation view of a frame, rear suspension, electric motor and associated drive components according to an alternative embodiment of the snowmobile of FIG. 1.
Figure 34:
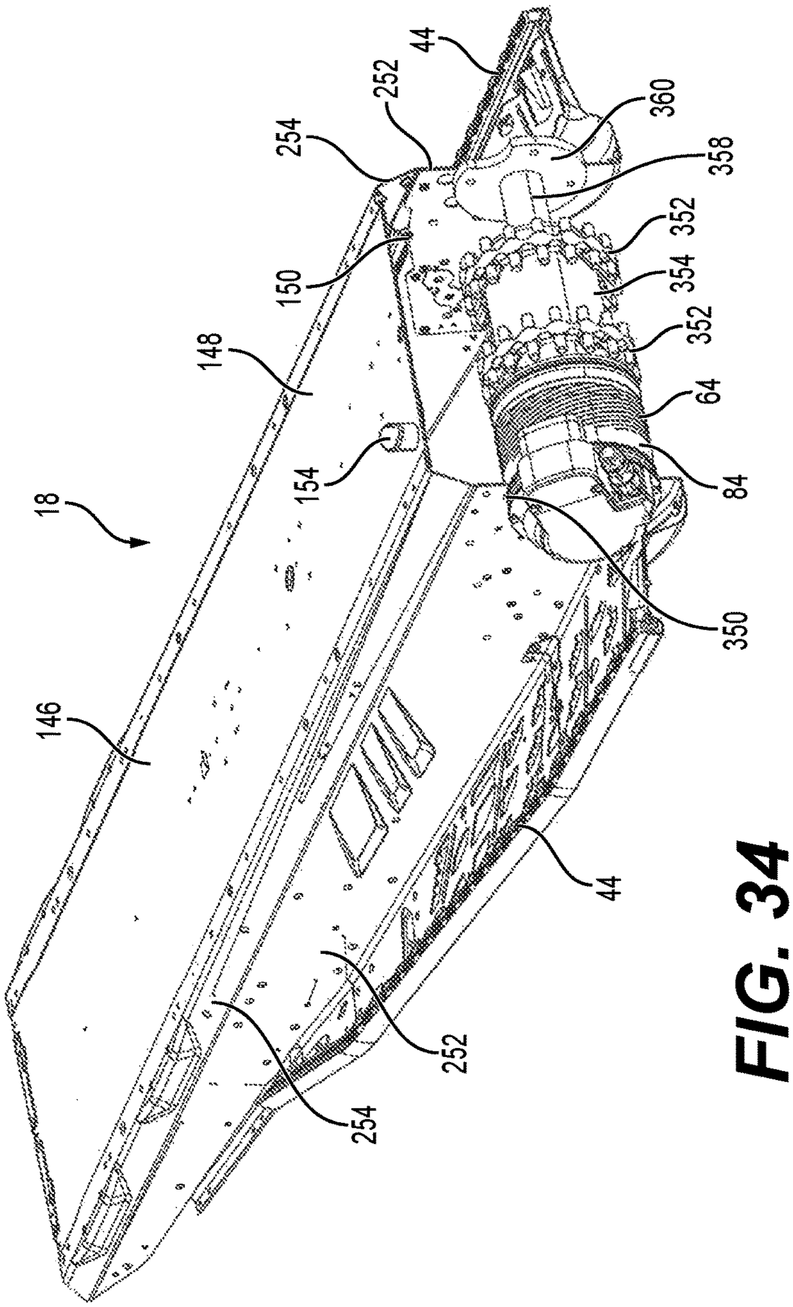
FIG. 34 is a perspective view taken from a front, right side of a partial cross-section of a tunnel, the electric motor and its associated drive components taken along line 34-34 of FIG. 33.

At the front end 12 of the snowmobile 10, fairings 46 are provided that enclose internal components of the snowmobile 10, thereby providing an external shell that not only protects these components of the snowmobile 10, but also make the snowmobile 10 more aesthetically pleasing. The fairings 46 include a hood 48 and side panels 50. The side panels 50 can be opened to provide access to the internal components of the snowmobile as will be described in more detail below. Headlights 52 are provided in an opening in the fairings 46. A display screen 54 (FIG. 2) is provided under one of the fairings 46 in front of the handlebar 32. The screen 54 is a touch screen that displays information to the driver as well as menus allowing the driver to make various selections regarding the operation of the snowmobile 10 or the information to be displayed. As best seen in FIG. 32, a key receiving post 56 is provided on one of the fairings 46 to receive a digitally encoded key and lanyard 58. The key receiving post 56 is disposed longitudinally between the seat 40 and the steering column 30, but other positions are contemplated. It is contemplate that the key could be a type of key other than a digitally encoded key.

As best shown in FIG. 1, a drive track 60 is supported by a rear suspension assembly 62 and is disposed under the tunnel 18. It is contemplated that the drive track 60 could extend rearward of the tunnel 18. The drive track 60 is operatively connected to an electric motor 64 (FIG. 17) which drives the endless drive track 60, as will be described in more detail below.

The rear suspension assembly 62 is connected to the tunnel 18. The rear suspension assembly 62 has front and rear shock absorbers 66, 68. The front shock absorber 66 extends rearwardly and downwardly from a front portion of the tunnel 18 and is disposed between the tunnel 18 and a slide frame assembly 70 of the rear suspension assembly 62 partially forward of front suspension arms 72 of the rear suspension assembly 62. The rear shock absorber 68 extends forwardly and downwardly from a rear portion of the tunnel 18 and is disposed at least in part rearwardly of the front suspension arms 72. The slide frame assembly 70 includes a pair of spaced apart slide rails 74 that engage the inner side of the ground-engaging portion of the drive track 60. As best shown in FIG. 1, the slide frame assembly 70 journals a plurality of rollers 76. In addition, further rollers 78 are carried by the tunnel 18 to define the path over which the drive track 60 travels. Other types of rear suspension assemblies are contemplated.

A snow flap 80 is connected to and extends downward from the rear end of the tunnel 18. The snow flap 80 helps prevent snow and ice from being projected upward behind the snowmobile 10 by the drive track 60 while the snowmobile 10 is in motion. The snow flap 80 also redirects at least some of the snow and ice being projected by the drive track 60 onto the bottom of the tunnel 18 to assist in cooling coolant used for cooling certain components of the snowmobile 10 as will be described in more detail below.

Figure 16:
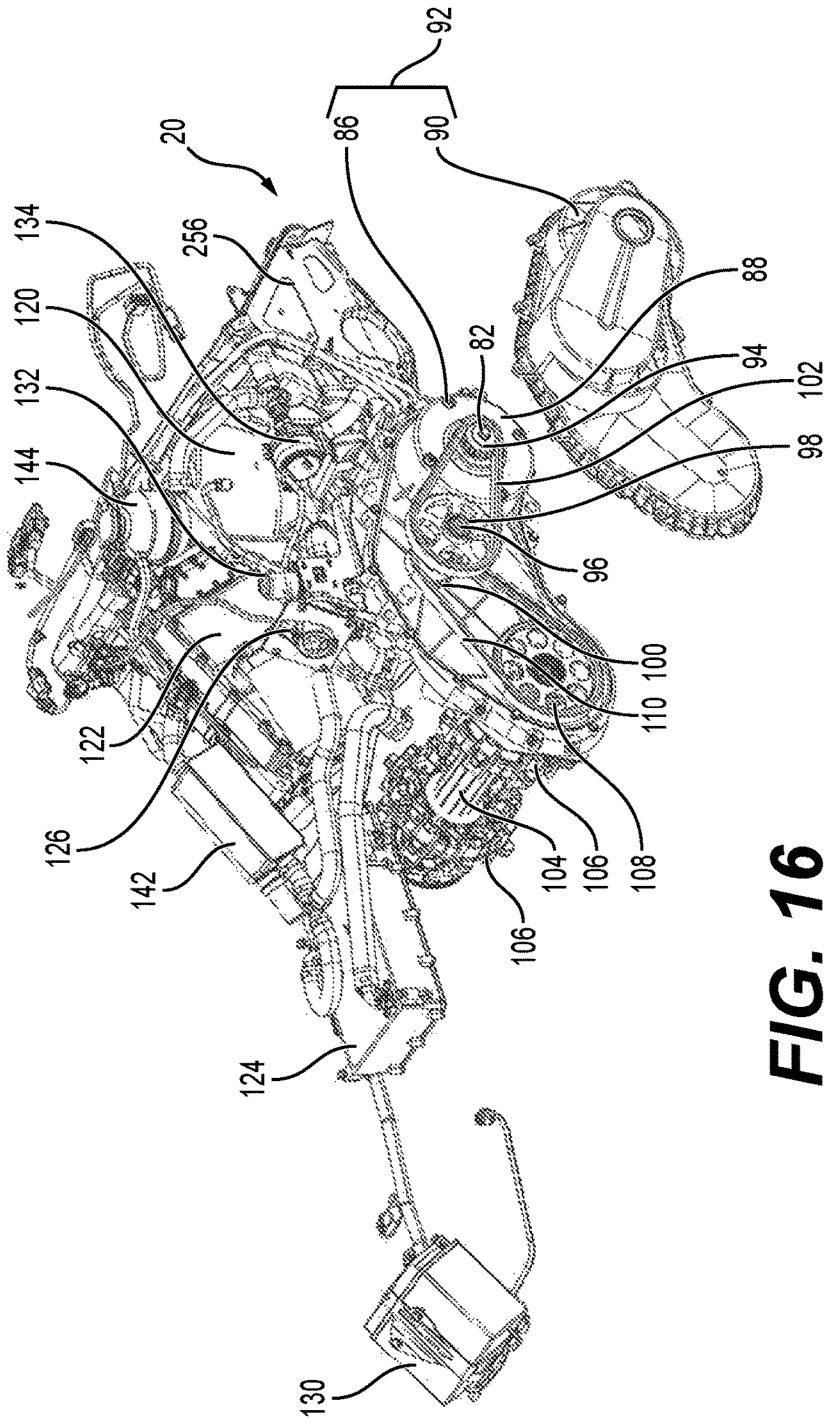
FIG. 16 is a perspective view, taken from a rear, right side of some of the components of the snowmobile of FIG. 1.
Figure 17:
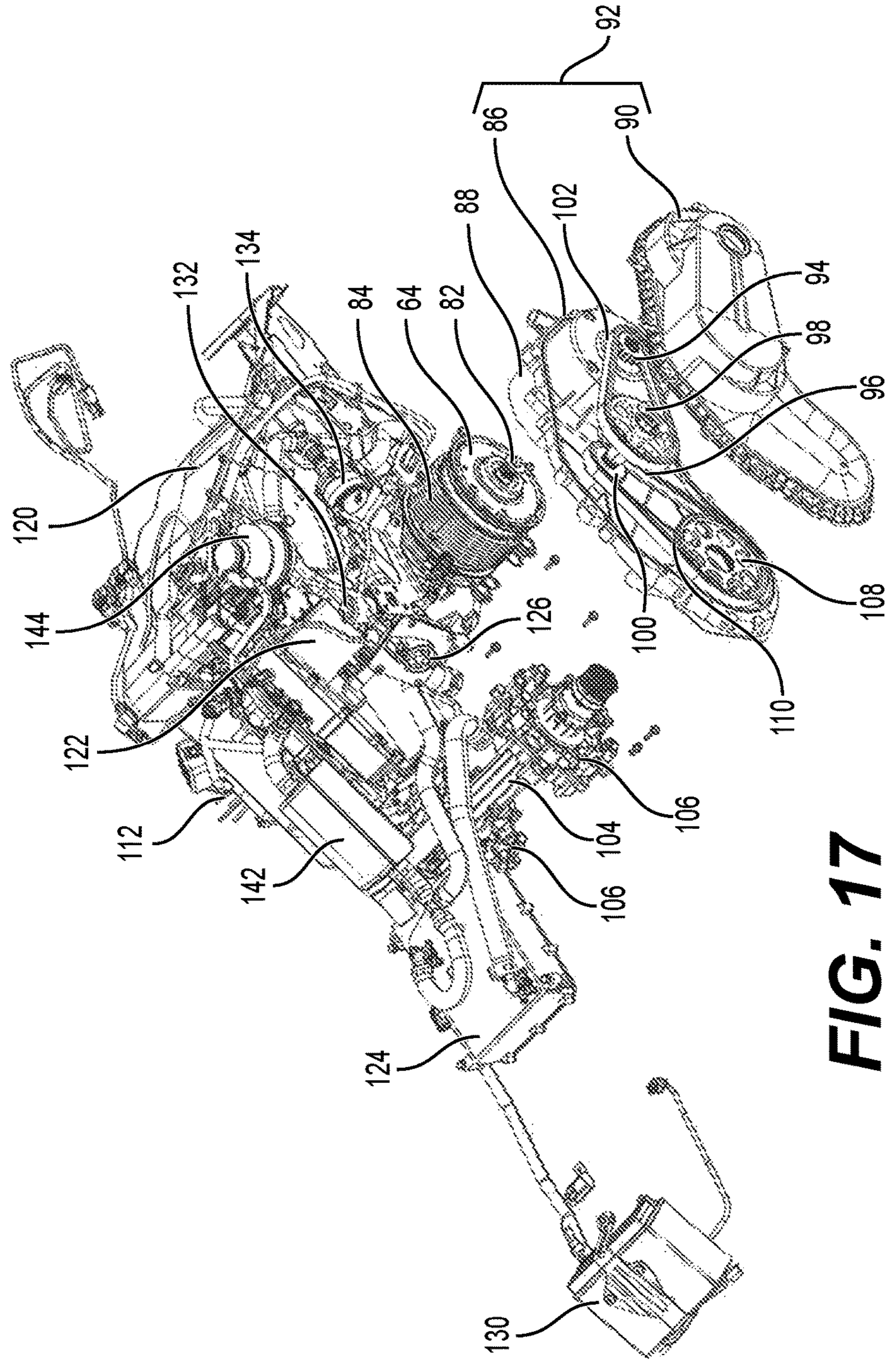
FIG. 17 is a partially exploded perspective view, taken from a rear, right side of the components of FIG. 16.
Figure 18:
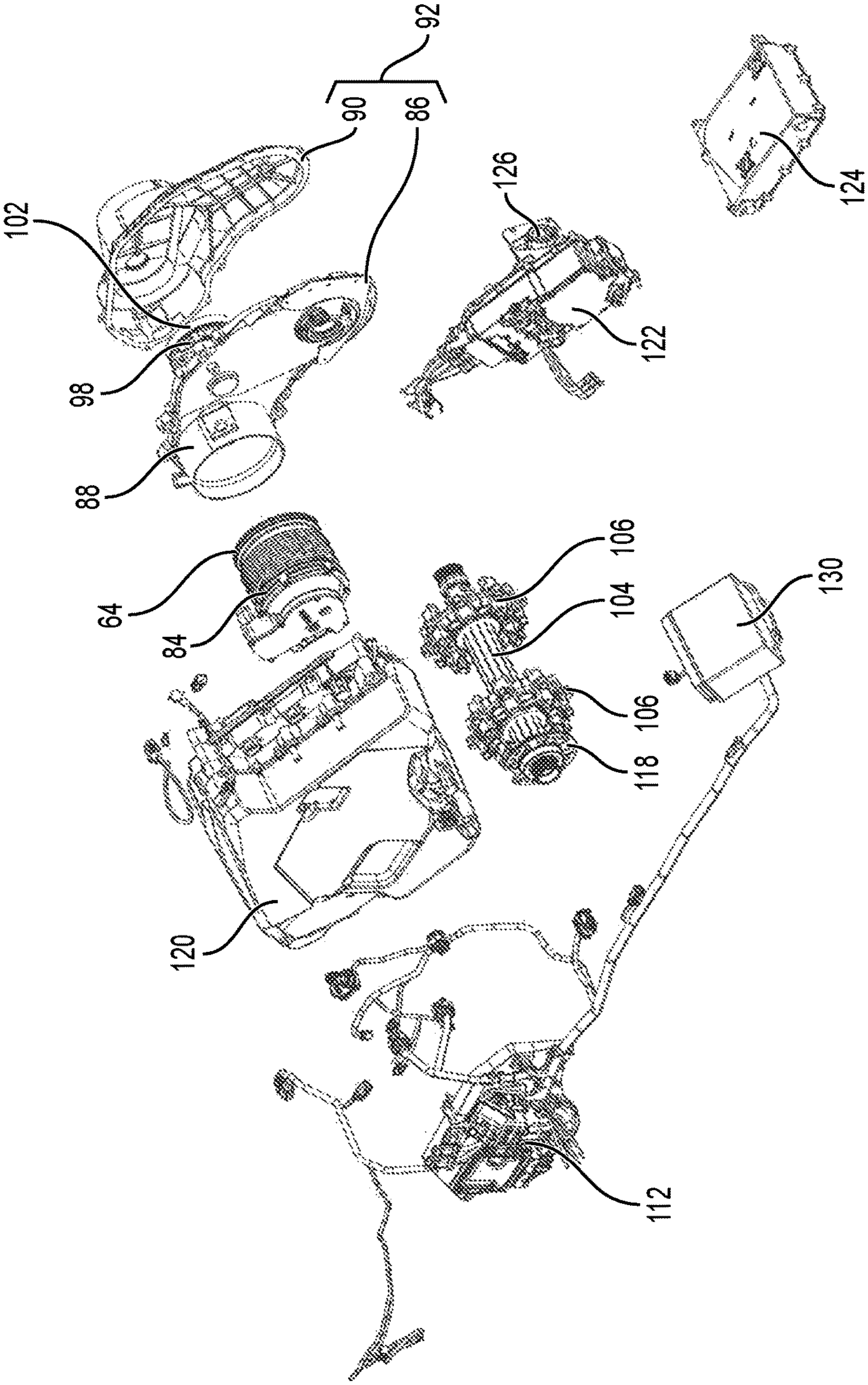
FIG. 18 is a partially exploded perspective view, taken from a rear, left side of some of the components of the snowmobile of FIG. 1.

With reference to FIGS. 16 to 18, the operative connection between the electric motor 64 and the drive track 60 will be described in more detail. The electric motor 64 is a three-phase electric motor 64. The electric motor 64 is mounted to a right side of the subframe 20 and is completely on a right side of the vertical planes 36, 38. An output shaft 82 of the electric motor 64 extends from a right side of a housing 84 of the electric motor 64. An inner cover 86 is placed over the electric motor 64 and is fastened to a right side of the subframe 20 and to a right side of the tunnel 18. The inner cover 86 has a cylindrical portion 88 inside which the electric motor 64 is received. An outer cover 90 is fastened to the inner cover 86 to define a reduction drive housing 92. The output shaft 82 extends through the inner cover 86. A drive sprocket 94 is connected to the end of the output shaft 82. A sprocket shaft 96 is mounted laterally between and is rotationally supported by the inner and outer covers 86, 90. A driven sprocket 98 and a drive sprocket 100 are connected to the sprocket shaft 96. A silent chain 102 is looped around and engages the drive sprocket 94 and the driven sprocket 98. A silent chain is a type of chain that can transmit power at high efficiency, with reduced vibration, and, as its name suggests, with low noise. The sprockets 94, 98 and the silent chain 102 together define a reduction drive, and more specifically a silent chain drive. It will be noted that in the present embodiment, not chain tensioner is required. The snowmobile 10 has a drive axle 104 disposed laterally in a front portion of the tunnel 18. Two drive sprockets 106 are mounted to the drive axle 104. A left end of the drive axle 104 is rotationally supported by the tunnel 18. A right end of the drive axle 104 extends through the inner cover 86 and is rotationally supported thereby. A driven sprocket 108 is connected to the right end of the drive axle 104. A silent chain 110 is looped around and engages the drive sprocket 100 and the driven sprocket 108. The sprockets 100, 108 and the silent chain 110 together define another reduction drive, and more specifically a silent chain drive. It will be noted that in the present embodiment, not chain tensioner is required. The drive sprockets 94, 100, the driven sprockets 98, 108, the silent chains 102, 110, and the sprocket shaft 96 are housed inside the reduction drive housing 92 and together define a reduction drive assembly. It should be noted that both reduction drive assemblies are not provided with chain tensioners. It is contemplated that in some embodiments, the reduction drive assembly could have only one or more than two reduction drives. It is contemplated that in some embodiments, the sprockets 94, 98, 100, 108 and silent chains 102, 110 could be replaced by gears or by pulleys and belts. It is contemplated that in some embodiments, the silent chains 102, 110 could be replaced by another type of flexible drive element such as drive chains or drive belts.

To drive the snowmobile 10, the driver inserts the digitally encoded key onto the key receiving post 56 and then presses a start button 53. The driver then selects a drive direction (i.e. forward or reverse) via a button provided on the handlebar 32. In the present embodiment, this button is the start button 53 which is a multi-function button. It is contemplated that in other embodiments the drive direction could be selected by a different button or via the touch screen 54. The forward driving direction is selected by default. This determines the direction of rotation of the electric motor 64. It is contemplated that the drive direction could be selected via physical buttons, a switch, a lever, or other means. The key identification, start signal, and drive direction selection are all received by a controller 112. The controller 112 includes one or more central processing units (CPUs), and one or more computer readable media. It is contemplated that more than one controller 112 could be provided, in which case different controllers could be responsible for different functions of the snowmobile 10. To accelerate, the driver actuates an accelerator, which in the present embodiment is a thumb-actuated lever 114 provided on the right of the handlebar 32, as best seen in FIG. 32. The controller 112 receives a signal from an accelerator position sensor (not shown) that is representative of a position of the thumb-actuated lever 114. Based at least in part on the signal from the accelerator position sensor and the selected drive direction, the controller 112 controls the power delivered to the electric motor 64 to control the speed and direction of turning of the output shaft 82 of the electric motor 64.

The rotation of the output shaft 82 of the electric motor 64 turns the drive sprocket 94. The drive sprocket 94 drives the silent chain 102, which drives the driven sprocket 98. The driven sprocket 98 drives the sprocket shaft 96, which drives the drive sprocket 100. The drive sprocket 100 drives the silent chain 110, which drives the driven sprocket 108. The driven sprocket 108 drives the drive axle 104, which drives the drive sprockets 106. The drive sprockets 106 have radial and axial teeth which respectively engage apertures (not shown) in the drive track 60 and inner lugs (not shown) of the drive track 60, thereby causing the drive track 60 to turn around the rear suspension assembly 62, thereby causing the snowmobile 10 to be propelled forward or rearward depending on the direction of rotation of the drive track 60. Since the diameter of the driven sprocket 98 is larger than the diameter of the drive sprocket 94, and the diameter of the driven sprocket 102 is larger than the diameter of the drive sprocket 100, the drive axle 104 turns slower than the output shaft 82 of the electric motor 64.

To brake the snowmobile 10, the driver actuates a brake lever 116 (FIG. 5) provided on the left of the handlebar 32. This actuates a brake caliper with brake pads (not shown) that engage a brake disc 118 (FIG. 18) mounted on the left end of the drive axle 104. It is contemplated that the electric motor 64 could also provide regenerative braking when the driver releases the thumb-actuated lever 114.

Figure 14:
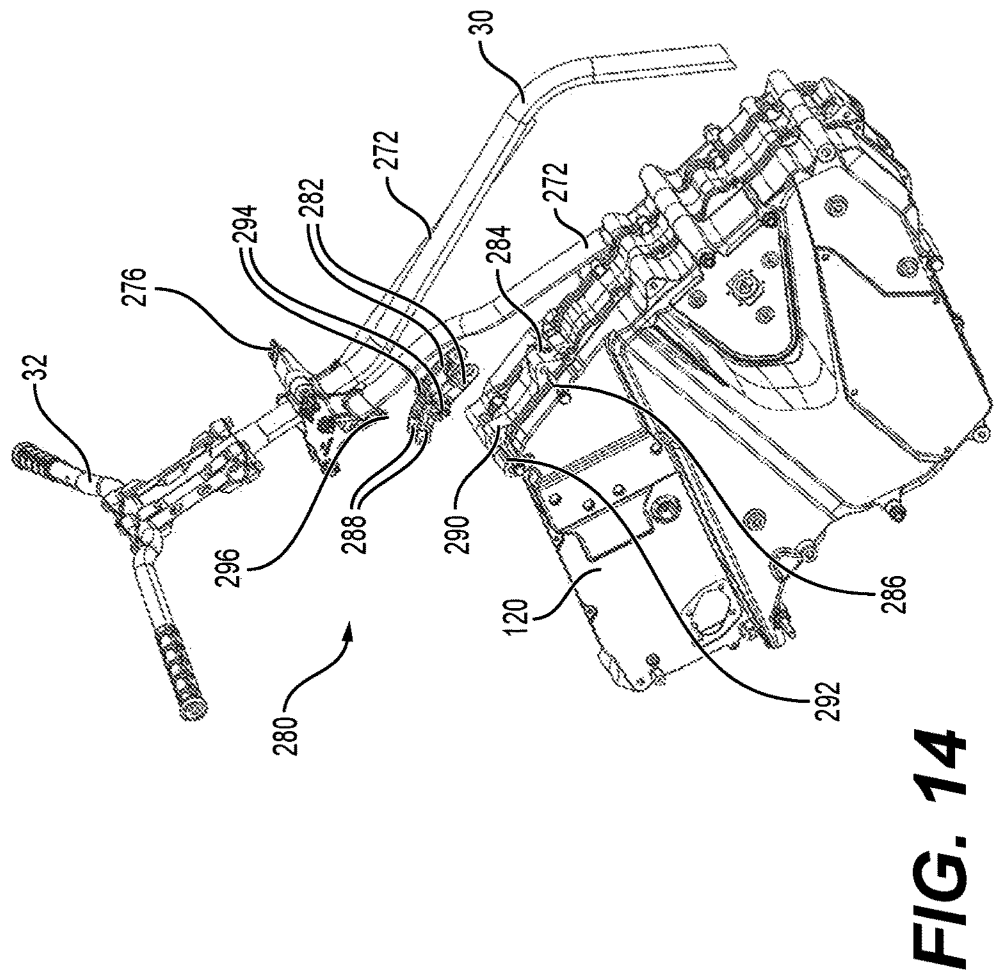
FIG. 14 is a perspective view, taken from a front, right side, of the battery pack, part of the frame and part of the steering assembly of the snowmobile of FIG. 1.
Figure 23:
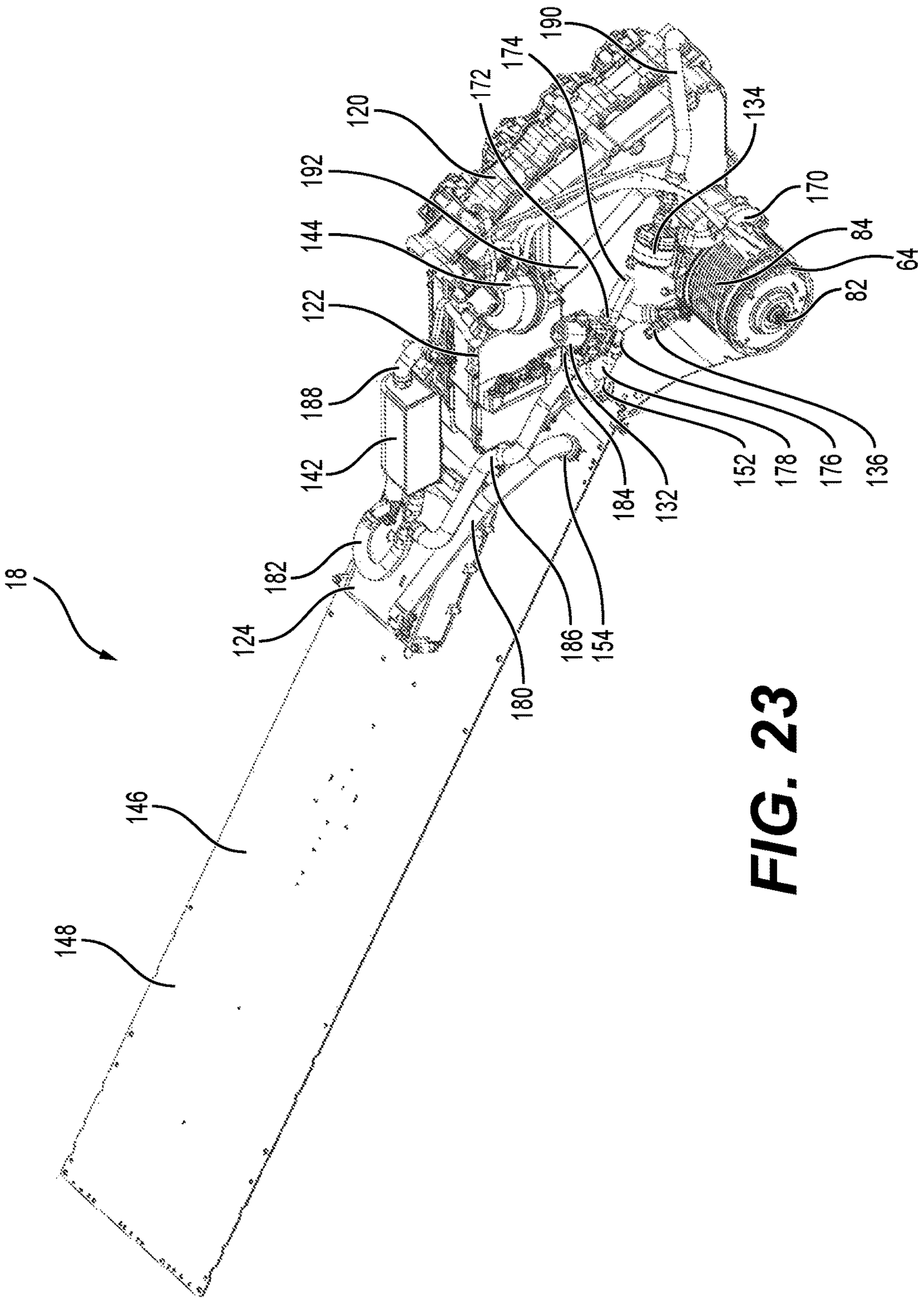
FIG. 23 is a perspective view taken from a front, right side of the cooling and heating system, the battery pack and the motor of the snowmobile of FIG. 1.

The electric motor 64 is powered by a battery pack 120. The battery pack 120 has a housing containing a plurality of battery cells. The maximum output voltage of the battery pack 120 depends on the type and number of battery cells being used. In some embodiments, the maximum output voltage of the battery pack 120 is in a range between 196 volts and 416.5 volts inclusively. The battery pack 120 is disposed in part in the subframe 20 and is connected to the subframe 20 as will be described in more detail below. As can be seen in FIG. 23, a rear portion of the battery pack 120 extends over a front portion of the tunnel 18. Most of the battery pack 120 is disposed forward of the drive axle 104 (see FIG. 16). As can be seen in FIG. 12, the battery pack 120 is positioned such that the vertical planes 36, 38 pass through the battery pack 120. With reference to FIGS. 12 to 14, it can be seen that a width of the battery pack 120 is smaller than a height of the battery pack 120 and is smaller than a length of the pack 120. It can also be seen that the battery pack 120 is narrower than the handlebar 32. The steering column 30 extends over the battery pack 120.

Electric System

Figure 19:
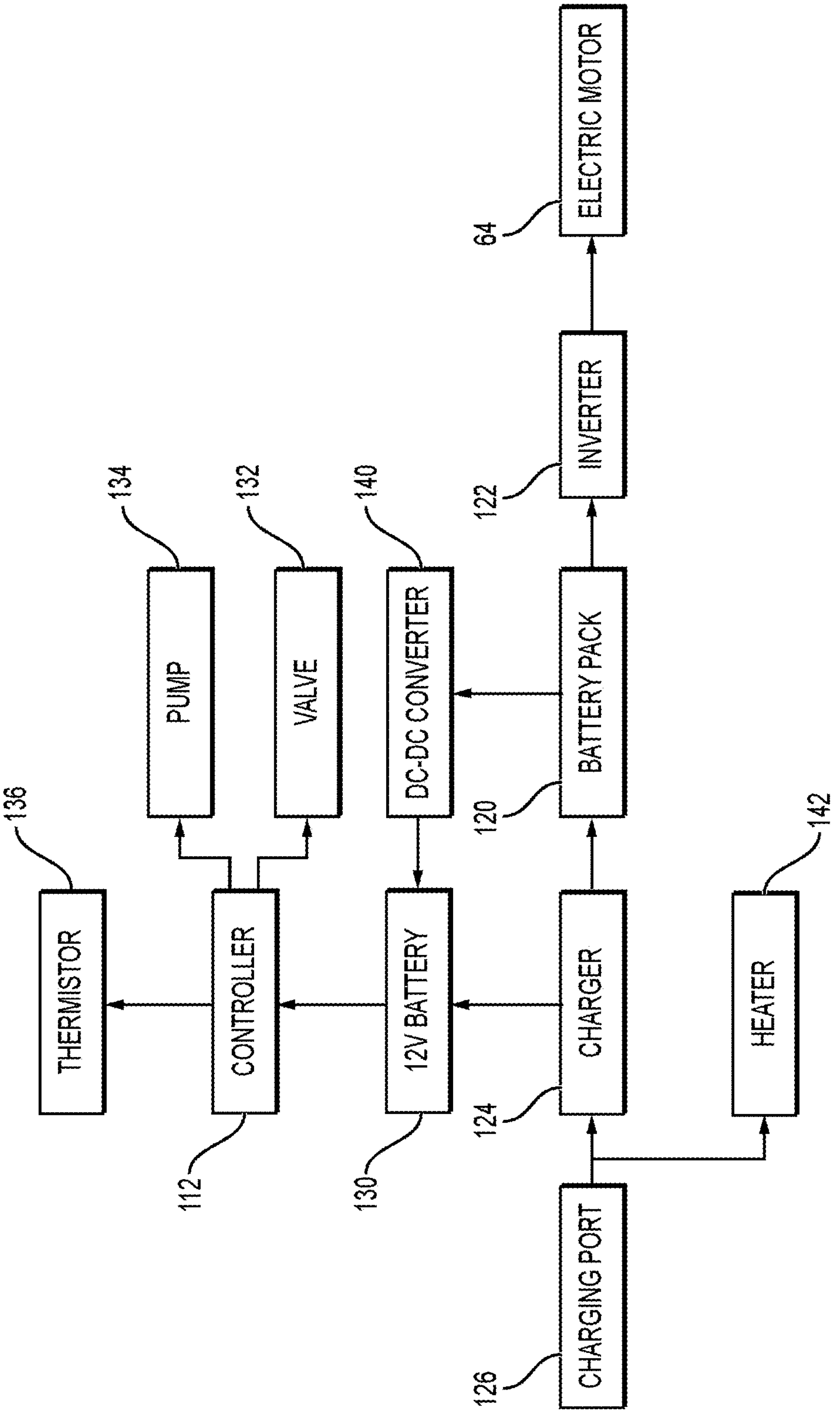
FIG. 19 is a schematic diagram of electric components of the snowmobile of FIG. 1.

With reference to FIG. 19, the battery pack 120 is electrically connected to an inverter 122 and the inverter 122 is electrically connected to the electric motor 64. The battery pack 120 supplies direct current to the inverter 122. The inverter 122 converts the direct current from the battery pack 120 to alternating current and supplies the alternating current to the electric motor 64. The inverter 122 also converts the alternating current generated by the electric motor during regenerative braking to direct current and supplies this direct current to the battery pack 120 to recharge the battery pack 120. The controller 112 controls the flow of electric current in and out of the battery pack 120 and controls the operation of the inverter 122 such that the output shaft 82 of the electric motor 64 turns in the desired direction and at the desired speed. The inverter 122 is connected to a rear portion of the right side of the battery pack 120 and is disposed above a front portion of the tunnel 18 (see FIG. 23).

Figure 7:
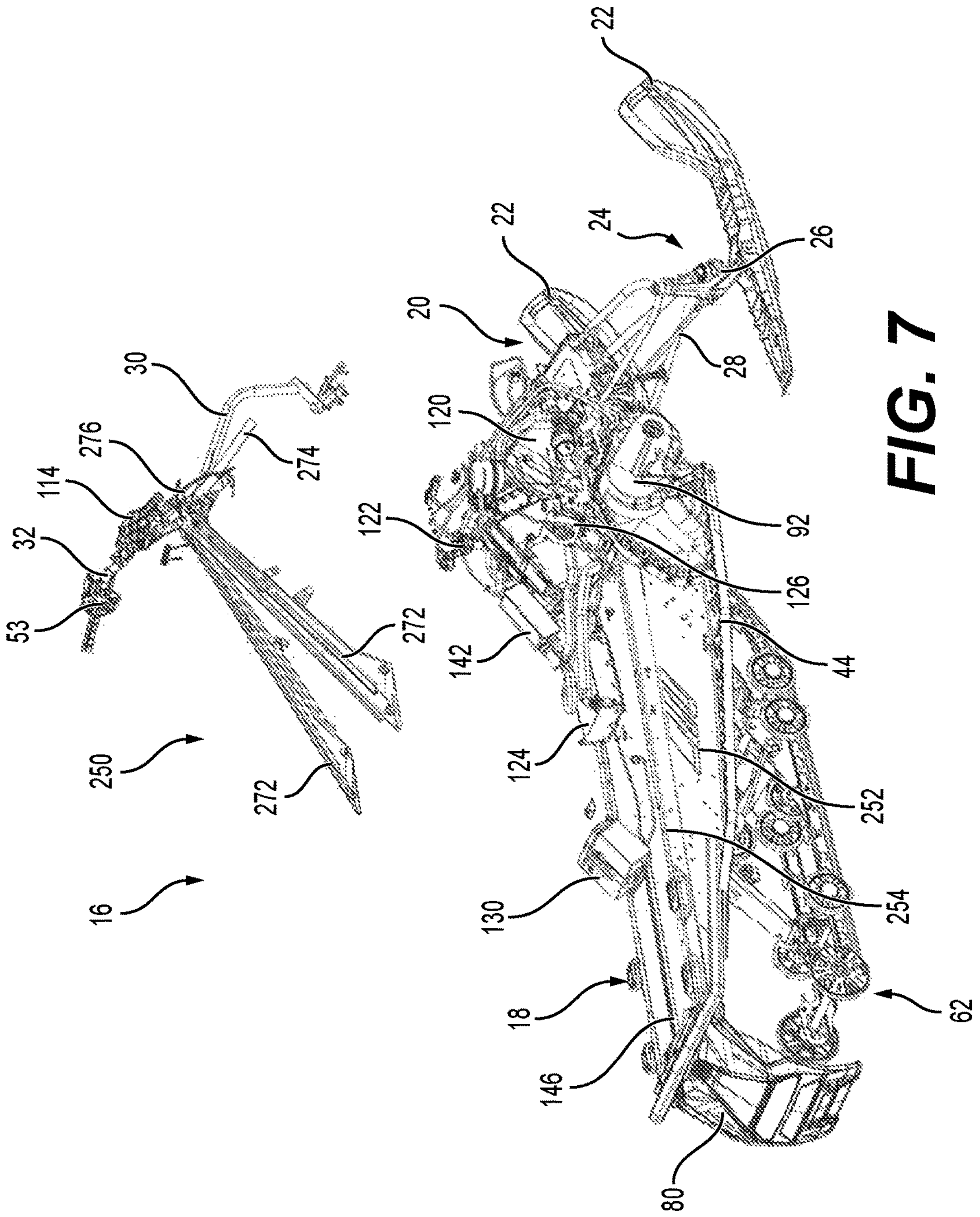
FIG. 7 is a partially exploded, perspective view, taken from a rear, right side of some of the components of FIG. 6.

A charger 124 is electrically connected to the battery pack 120. The charger 124 is electrically connected to a charging port 126. In the present embodiment, the charging port 126 is an SAE J1772 AC charging port, but other types of charging ports are contemplated. To recharge the battery pack 120, an external power source is connected to the charging port 126. More specifically, a plug 128 (FIG. 4) from a charging station (not shown) is connected to the charging port 126. The charging station supplies alternating current to the charging port 126. The alternating current is supplied from the charging port 126 to the charger 124. The charger 124 converts this alternating current to direct current and supplies the direct current to the battery pack 120 to recharge the battery pack 120. Instead of a plug 128 from a charging station, it is contemplated that a plug of a mobile power cord connected to a 120 volt or 240 volt power outlet could be plugged in the charging port 126 to power the charger 124. For purposes of the present application, the plug 128 from a charging station will be used in the description provided below, but it should be understood that the plug of a mobile power cord could also be used. The charger 124 is connected to a top of the tunnel 18 (see FIG. 7) and is disposed under the seat 40. The charging port 126 is connected to the frame 16 and is disposed to the right of the seat 40. As such the charging port 126 is disposed on the right side of the planes 36, 38 and on the same side as the electric motor 64. It is contemplated that the charging port 126 could be disposed on the left side of the seat 40 and the planes 36, 38. The charging port 126 will be described in more detail below.

The snowmobile 10 is also provided with a secondary battery 130 having a voltage that is lower than the voltage of the battery pack 120. The secondary battery 130 is used to power components of the snowmobile 10 that operate at a lower voltage. In the present embodiment, the second battery 130 is a 12-volt battery. The secondary battery 130 is connected to the top of the tunnel 18 (see FIG. 7) behind the charger 124 and is disposed under the seat 40. As can be seen in FIG. 19, the secondary battery 130 is electrically connected to the controller 112 to supply direct current to the controller 112 for powering the controller 112. The controller 112 controls the supply of direct current from the secondary battery 130 to the headlights 52 and to the display screen 54. With reference to FIG. 19, the controller 112 is electrically connected to a valve 132, a pump 134 and a thermistor 136 to supply direct current from the secondary battery 130 to these components for powering and controlling these components. The valve 132, the pump 134 and the thermistor 136 are components of a cooling and heating system 138 (FIGS. 20 to 22) of the snowmobile 10 which will be described in more detail below. It is contemplated that in some embodiment, the thermistor 136 could be replaced by another type of temperature sensor. The controller 112 also supplies direct current from the secondary battery 130 to other components of the snowmobile 10.

With reference to FIG. 19, the secondary battery 130 is selectively electrically connected to the charger 124. The secondary battery 130 is also selectively electrically connected to the battery pack 120 via a DC-DC converter 140. During operation of the snowmobile 10, the secondary battery 140 is disconnected from the charger 124 and is connected to the battery pack 120 via the DC-DC converter 140 such that the secondary battery 130 is recharged by the battery pack 120. The DC-DC converter 140 reduces the voltage of the battery pack 120 to the voltage of the secondary battery 130. When the battery pack 120 is being recharged by an external power source (i.e. plug 128 is plugged into the charging port 126), the secondary battery 130 is connected to the charger 124 and is disconnected from the battery pack 120 such that the secondary battery 130 is recharged by the external power source via the charger 124. The charger 124 has an integrated DC-DC converter (not shown) to supply power to the secondary battery 130 at the appropriate voltage.

The snowmobile 10 also has an electric heater 142 which is part of the cooling and heating system 138. As the snowmobile 10 generally operates in environments where the temperature is below 0 degree Celsius, the battery pack 120 and other components of the snowmobile 10 need to be heated in order to operate efficiently. The heater 142 is used to heat coolant in the cooling and heating system 138, and the heated coolant is then supplied to the battery pack 120 and these other components to heat them as will be described in more detail below. The heater 142 is used to heat the battery pack 120 and these other components while the snowmobile 10 is stopped and the battery pack 120 is being recharged (i.e. plug 128 is plugged into the charging port 126). During operation of the snowmobile 10, the heat generated by the electric motor 64 is transferred to the coolant which then heats the battery pack 120 and these other components.

With reference to FIG. 19, the heater 142 is electrically connected to the charging port 126. The charger 124 and the heater 142 are connected in parallel to the charging port 126. The heater 142 is only turned on by the controller 112 when a signal received by the controller 112 from the thermistor 136 indicates that the temperature of the coolant in the cooling and heating system 138 sensed by the thermistor 136 is below a predetermined temperature T1. In an alternative embodiment, the heater 142 is only turned on by the controller 112 when a signal received by the controller 112 from a battery temperature sensor (not show) indicates that the temperature of the battery pack 120 sensed by the battery temperature sensor is below the predetermined temperature T1. It is also contemplated that instead of being a constant, the predetermined temperature T1 could be a variable determined from an algorithm based on one or more of the temperature of the coolant in the cooling and heating system 138 sensed by the thermistor 136, the temperature of the battery pack 120 sensed by the battery pack temperature sensor, charging requirements, and performance requirements. It is contemplated that other elements could be taken into consideration by such an algorithm. In response to the charging port 126 receiving power from the external power source when the battery pack 120 is being recharged by an external power source (i.e. plug 128 is plugged into the charging port 126) and in response to the thermistor 136 (or battery temperature sensor) sensing a temperature below the temperature T1, the pump 134 is turned on and the heater 142 is powered from external power source via the charging port 126 such that the heater 142 is turned on and heats the coolant flowing therethrough. In response to the thermistor

136 (or battery temperature sensor) sensing a temperature above the temperature T1, the pump 132 is turned off, and the heater 142 is turned off. Similarly, when the snowmobile 10 is not in operation and the charging port 126 is not receiving power from the external power source (i.e. the plug 128 is not plugged into the charging port 126 or the battery pack 120 is fully charged for example), the pump 132 and the heater 142 are turned off regardless of the temperature sensed by the thermistor 136 (or battery temperature sensor). It is contemplated that when the plug 128 is plugged into the charging port 126, the controller 112 could be programmed to turn on the pump 132 and the heater 142 for a predetermined amount of time at regular intervals to maintain the temperature of the battery pack 120 above the predetermined temperature T1. It is also contemplated that the pump 132 and the heater 142 could be turned on when the snowmobile 10 is started to pre-heat the battery pack 120 and other components in preparation for the operation of the snowmobile 10 while the plug 128 is plugged into the charging port 126. As will be noted, the heater 142 is not connected to the battery pack 120 for receiving power from the battery pack 120. In the present embodiment, the heater 142 is disposed partly over a rear part of the battery pack 120 and partly over a front part of charger 124 as can be seen in FIG. 16. A rear part of the heater 142 is disposed below a front part of the seat 40 and a front part of the heater 142 is disposed in front of the seat 40.

Cooling and Heating System

Turning now to FIGS. 20 to 24, the cooling and heating system 138 and its operation will be described in more detail. It should be noted that since the cooling and heating system 138 is used for both cooling and heating, it may be referred to herein as the cooling system 138 or the heating system 138 depending on its mode of operation.

As can be seen in FIG. 23, the previously described valve 132, pump 134 and thermistor 136 are disposed to the right of the battery pack 120. The pump 134 is disposed above the electric motor 64. The cooling and heating system 138 also includes an expansion tank 144 disposed to the right of the battery pack 120. The expansion tank 144 is at the highest portion of the cooling and heating system 138.

Figure 24:
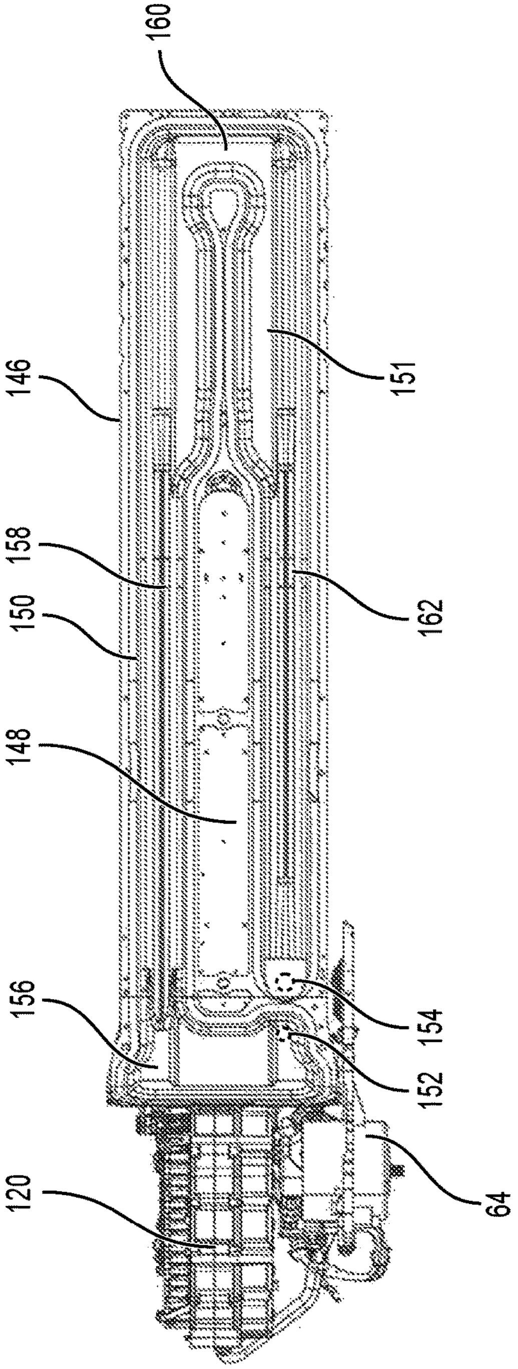
FIG. 24 is a bottom, plan view of the components of FIG. 23.

The cooling system 138 includes a heat exchanger 146. It is contemplated that the heat exchanger 146 could be a heat exchanging unit mounted to a top or a bottom of the tunnel 18. However, in the present embodiment, the heat exchanger 146 defines part of the tunnel 18. More specifically, the heat exchanger 146 defines part of the top of the tunnel 18 and part of the front portion of the tunnel 18. It is contemplated that the heat exchanger 146 could define only part of the top of the tunnel 18 or only part of the front of the tunnel 18. With reference to FIG. 24, the heat exchanger 146 has a top part 148 and a bottom part 150 joined to the top part 148. The bottom part 150 defines a recess such that a passage 151 is defined between the top and bottom parts 148, 150 of the heat exchanger 146 to permit the flow of coolant therethrough. It is contemplated that the top part 148 could define a recess in addition to or instead of the recess defined by the bottom part 150 for defining the passage 151. The heat exchanger 146 has an inlet 152 and an outlet 154 (see FIG. 8). It is contemplated that in some embodiments element 152 could be the outlet and element 154 could be the inlet. The passage 151 extends along substantially an entire length of the tunnel 18. The width of the passage 151 varies along the length of the heat exchanger 146. The front part 156 of the passage 151 is defined in the front portion of the tunnel 18 and extends along substantially an entire width of the front portion of the tunnel 18. The inlet 152 opens into this front part 156 of the passage 151 on a right side thereof. From the front part 156, the passage 151 has a linear portion 158 extending longitudinally rearward from the front part 156 along a left side of the heat exchanger 146. The passage 151 has a rear part 160 connected to the rear end of the linear portion 158 that extends laterally along the rear portion of the heat exchanger 146. From the rear part 160, the passage 151 has a linear portion 162 extending longitudinally forward from the rear part 160 along a right side of the heat exchanger 146. The outlet 154 opens into the front end of the linear portion 162. As can be seen, the linear portions 158, 162 extend along substantially an entire length of the top of the tunnel 18 and are wider near their rear ends. During operation of the snowmobile 10, the drive track 60 spray snow and ice on these wider parts of the linear portions 158, 162 of the passage 151 to enhance cooling of the coolant flowing in the passage 151. The snow flap 80 also redirects snow and ice sprayed thereon by the drive track 60 onto these wider parts of the linear portions 158, 162 of the passage 151. The charger 124 is connected on top of the heat exchanger 146 such that the charger 124 thermally communicates with the heat exchanger 146. Additional details of a heat exchanger that is similar to the heat exchanger 146 and alternative embodiments thereof are shown and described in U.S. Pat. No. 10,406,910 B2, issued Sep. 10, 2019, the entirety of which is incorporated herein by reference. Other embodiments of the heat exchanger 146 are also contemplated.

With reference to FIG. 23, the pump 134 is fluidly connected to the motor 64 by a pipe 170. The motor 64 is fluidly connected to an inlet 172 of the valve 132 by a pipe 174. The thermistor 136 is connected to the pipe 174 such that the thermistor 136 senses the temperature of coolant flowing from the motor 64 to the inlet 172 of the valve 132, and therefore senses the temperature of the coolant supplied to the inlet 172 of the valve 132. It is contemplated that in alternative embodiments, the thermistor 136 could be disposed elsewhere in the cooling and heating system 138. For example, it is contemplated that the thermistor 136 could be fluidly connected between the heater 142 and the inverter 122, or that the thermistor 136 could be provided at an inlet of the heater 142, or that the thermistor 136 could be provided on or in the heater 142. Other locations of the thermistor 136 are also contemplated. An outlet 176 of the valve 132 is fluidly connected to the inlet 152 of the heat exchanger 146 by a pipe 178. The outlet 154 of the heat exchanger 146 is fluidly connected to the charger 124 by a pipe 180. The charger 124 is fluidly connected to the heater 142 by a pipe 182. An outlet 184 of the valve 132 is fluidly connected to the heater 142 by a pipe 186. The heater 142 is fluidly connected to the inverter 122 by a pipe 188. A coolant passage (not shown) of the inverter 122 is fluidly connected to a coolant passage (not shown) of the battery pack 120 via an adapter (not shown). The battery pack 120 is fluidly connected to the pump 134 by a pipe 190. The expansion tank 144 is fluidly connected between the pump 134 and the battery pack 120 by a pipe 192. During operation of the cooling and heating system 138, should the coolant in the system 138 thermally expand, coolant will flow to the expansion tank 144. Also, during operation of the cooling and heating system 138, should the coolant in the system 138 thermally contract or should the amount of coolant in the system 138 go down due to a leak, coolant will flow from the expansion tank 144 to the pump 134. The expansion tank 144 is also used to fill the cooling and heating system 138 with coolant. The pump 134 is used to circulate coolant between the various components of the cooling and heating system 138 as will be described below.

Figure 20:
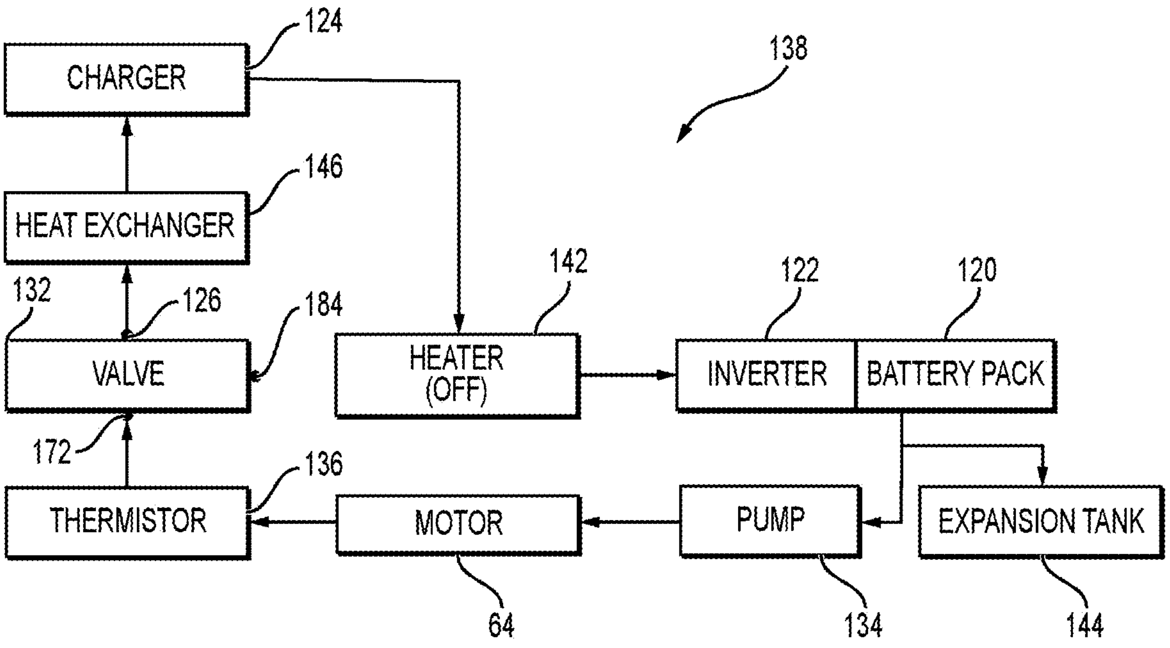
FIGS. 20 to 22 are schematic representations of coolant flow diagrams of a cooling and heating system of the snowmobile of FIG. 1.

With reference to FIG. 20, during operation of the snowmobile 10, in response to a signal received by the controller 112 from the thermistor 136 indicating that the temperature of the coolant in the cooling and heating system 138 sensed by the thermistor 136 is above a predetermined temperature T2, the valve 132 is moved to a first position where the outlet 176 is open and the outlet 184 is closed. It is contemplated that instead of being a constant, the predetermined temperature T2 could be a variable determined from an algorithm based on one or more of the temperature of the coolant in the cooling and heating system 138 sensed by the thermistor 136, the temperature of the battery pack 120 sensed by the battery pack temperature sensor, power requirements of the electric system, historical power requirements of the electric system, operation mode of the snowmobile 10, and energy level of the battery pack 120. It is contemplated that other elements could be taken into consideration by such an algorithm. The temperature T2 is greater than the temperature T1 discussed above and referred to below with respect to FIGS. 21 and 22. The temperature of the coolant sensed by the thermistor 136 being above the temperature T2 is indicative that the inverter 122, the battery pack 120 and/or the motor 64 are becoming hot and that the coolant needs to be cooled in order to cool these components. It is also contemplated that the valve 132 could be moved to the first position in response to a signal received by the controller 112 from any component that indicative of an overheat condition of this component. As such, when the valve 132 is in the first position shown in FIG. 20, coolant pumped by the pump 134 flows sequentially from the pump 134 to the motor 64, from the motor 64 to the inlet 172 of the valve 132, from the outlet 176 of the valve 132 to the inlet 152 of the heater exchanger 146, then through the passage 151 of the heat exchanger 146 to cool the coolant, from the outlet 154 of the heat exchanger 146 to the charger 124, from the charger 124 to the heater 142 which is turned off, from the heater 142 to the inverter 122, from the inverter 122 to the battery pack 120, and from the battery pack 120 back to the pump 134. As the coolant which has been cooled by the heat exchanger 146 flows through the inverter 122, the battery pack 120 and the motor 64 it cools these components.

Figure 21:
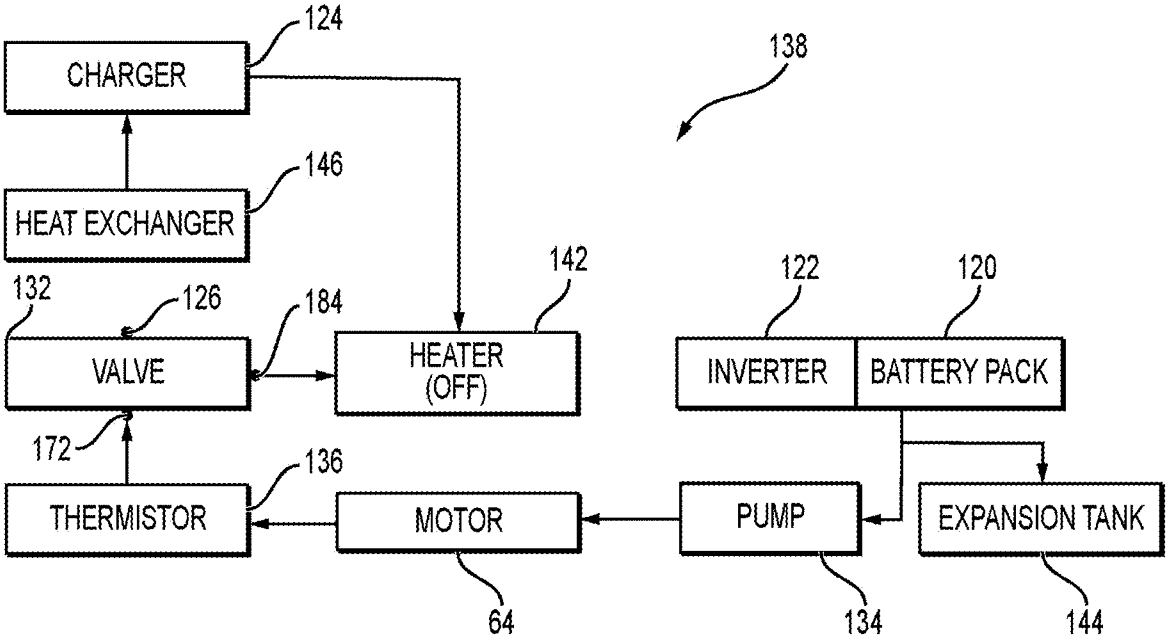

With reference to FIG. 21, during operation of the snowmobile 10, in response to a signal received by the controller 112 from the thermistor 136 indicating that the temperature of the coolant in the cooling and heating system 138 sensed by the thermistor 136 is below the predetermined temperature T1, the valve 132 is moved to a second position where the outlet 176 is closed and the outlet 184 is open. The temperature of the coolant sensed by the thermistor 136 being below the temperature T1 is indicative that the inverter 122 and/or the battery pack 120 are becoming cold and that the coolant needs to be heated in order to heat these components. As such, when the valve 132 is in the second position shown in FIG. 21, coolant pumped by the pump 134 flows sequentially from the pump 134 to the motor 64 where the coolant is heated by the motor 64, from the motor 64 to the inlet 172 of the valve 132, from the outlet 184 of the valve 132 to the heater 142 which is turned off, from the heater 142 to the inverter 122, from the inverter 122 to the battery pack 120, and from the battery pack 120 back to the pump 134. As the coolant which has been heated by the motor 64 flows through the inverter 122 and the battery pack 120, it heats these components. As will be noted, when the valve 132 is in the second position, the coolant pumped by the pump 134 bypasses the heat exchanger 146 and the charger 124. When the snowmobile 10 is in use but at rest, with the temperature sensed by the thermistor 136 being below the temperature T1 and with the valve being in the second position, the controller 112 controls the electric motor 64 to generate heat to heat the coolant. In one embodiment, the poles of the electric motor 64 are aligned and electric power is applied to the electric motor 64 which then acts like a resistive heater. The winding of the electric motor 64 to which power is applied is changed over time. In an alternative embodiment, the electric motor 64 is vibrated by causing the output shaft 82 to turn slightly and quickly back and forth. During vibration, the movement of the output shaft 82 is insufficient to cause the snowmobile 10 to noticeably move forward or backward, but the energy used to do so generates heat that is transferred to the coolant.

Figure 22:
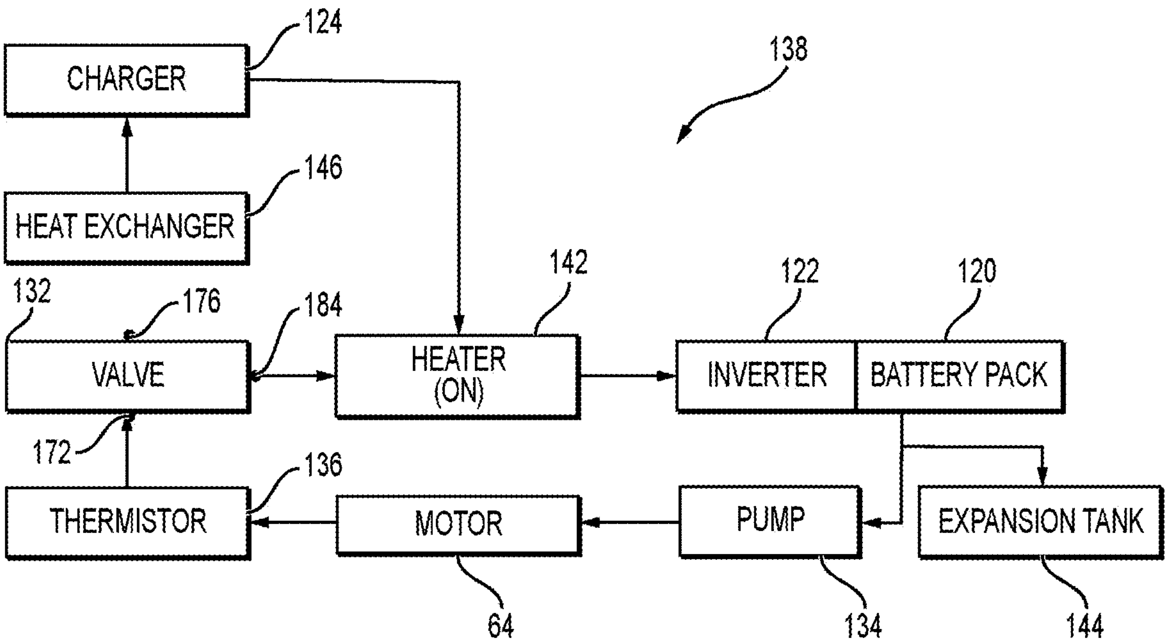

With reference to FIG. 22, when the snowmobile 10 is stopped and the battery pack 120 is being recharged by an external power source (i.e. plug 128 is plugged into the charging port 126), in response to a signal received by the controller 112 from the thermistor 136 indicating that the temperature of the coolant in the cooling and heating system 138 sensed by the thermistor 136 is below the predetermined temperature T1, the valve 132 is moved to the second position where the outlet 176 is closed and the outlet 184 is open. Also, as indicated above, the heater 142 is turned on and is powered by the external power source via the charging port 126. The temperature of the coolant sensed by the thermistor 136 being below the temperature T1 is indicative that the battery pack 120 is becoming cold and that the coolant needs to be heated in order to heat the battery pack 120 to a temperature where it can efficiently charge. As such, when the valve 132 is in the second position shown in FIG. 22, coolant pumped by the pump 134 flows sequentially from the pump 134 to the motor 64 which is turned off, from the motor 64 to the inlet 172 of the valve 132, from the outlet 184 of the valve 132 to the heater 142 which is turned on to heat the coolant, from the heater 142 to the inverter 122, from the inverter 122 to the battery pack 120, and from the battery pack 120 back to the pump 134. As the coolant which has been heated by the heater 142 flows through the battery pack 120, it heats the battery pack 120.

It is contemplated that in alternative embodiments, the position of the valve 132 could determined by comparing the temperature of the battery pack 120 sensed by the battery temperature sensor to predetermined temperatures T1, T2. It is contemplated that in some embodiments, the order in which the coolant flows through some of the components of the cooling and heating system 138 could be different than described above. For example, it is contemplated that coolant could flow through the battery pack 120 before flowing through the inverter 122, and that the coolant could flow through the motor 64 before flowing through the pump 134. It is also contemplated that the pump 134 could be fluidly connected between the heater 142 and the inverter 122, or that coolant from the outlet 184 of the valve 132 and the charger 124 could flow to the pump 134 and then to the heater 142.

Charging Port

Figure 4:
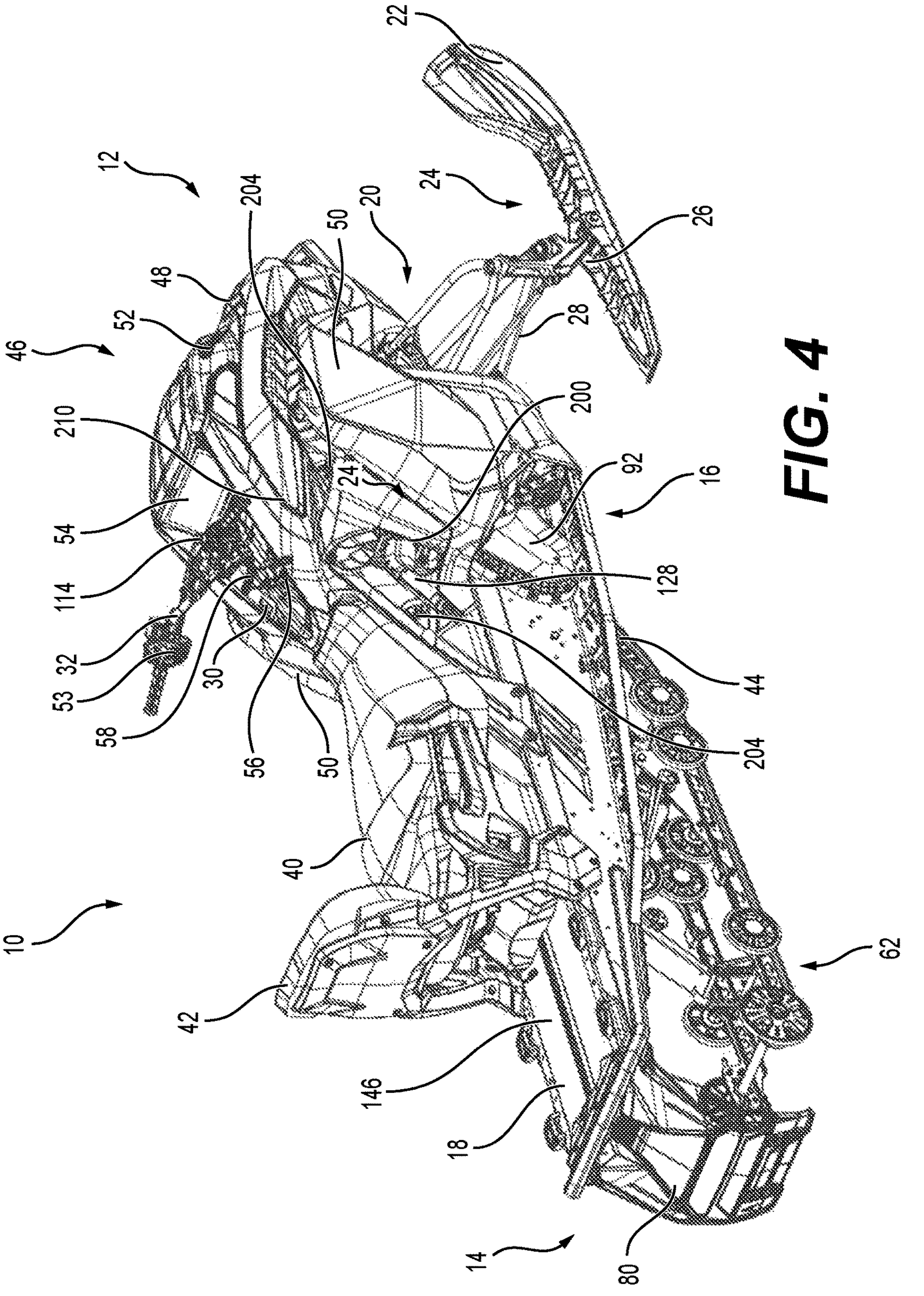
FIG. 4 is a perspective view, taken from a rear, right side of the snowmobile of FIG. 2, with a plug of an electric vehicle charger connected to a charging port of the snowmobile.
Figure 5:
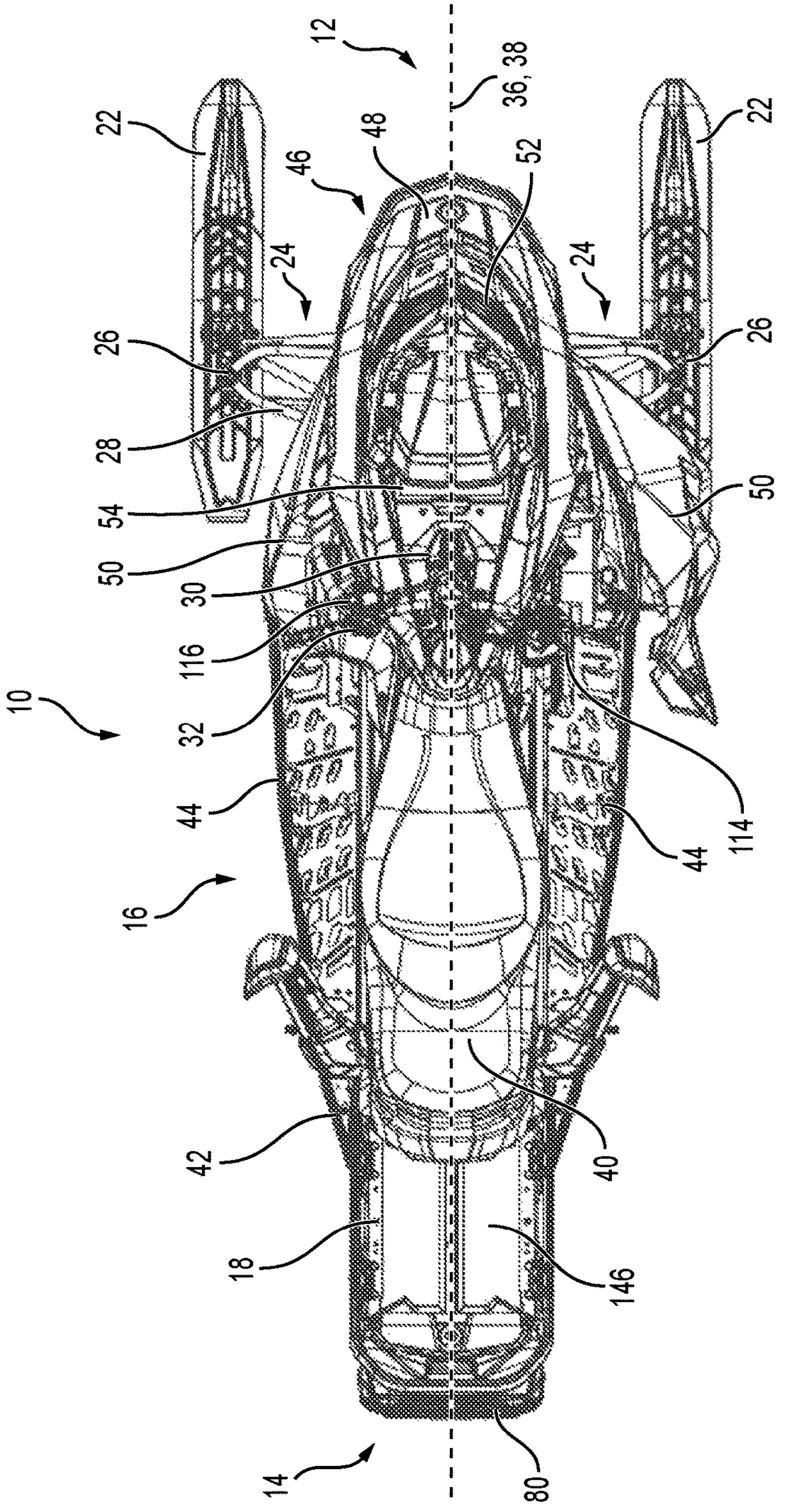
FIG. 5 is a top plan view of the snowmobile of FIG. 2, with the right side panel being in an open position.
Figure 6:
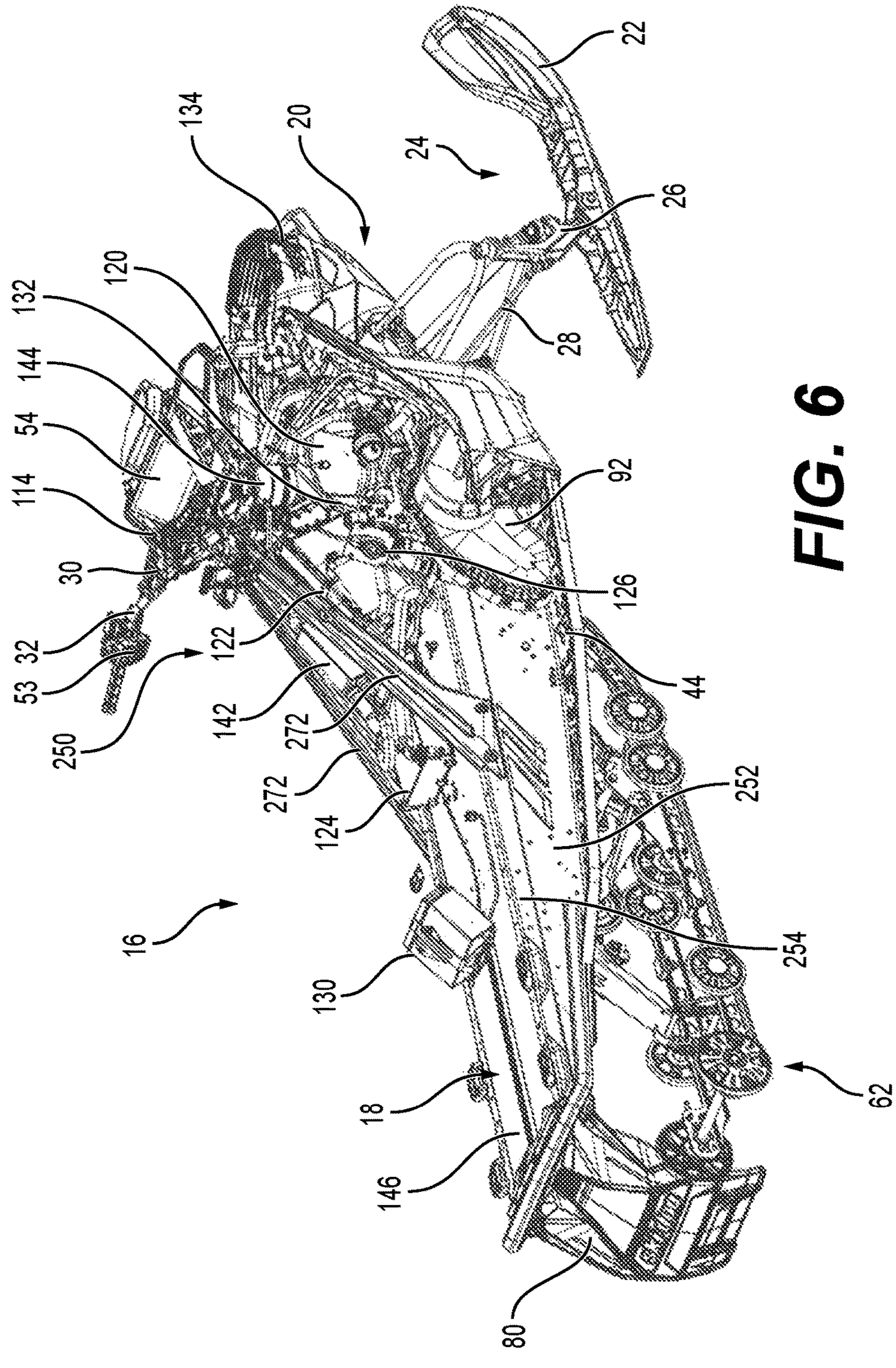
FIG. 6 is a perspective view, taken from a rear, right side of the snowmobile of FIG. 2, with some body panels and a seat of the snowmobile being removed.

With reference to FIGS. 1 to 6 and 25, the charging port 126 and its associated components will now be described in more detail. The charging port 126 faces generally rearward and is lower than a top of the seat 40. The charging port 126 is laterally aligned with the right footrest 44. Although it is contemplated that the charging port 126 could be located elsewhere on the snowmobile 10 in some embodiments, by having the charging port 126 in this position, when the plug 128 for recharging the battery pack 120 is plugged into the charging port 126 as shown in FIG. 4, the plug 128 will interfere with the leg of a person desiring to sit on the seat 40 of the snowmobile 10. As such, this person will realize that the plug 128 is plugged into the charging port 126 and needs to be unplugged before the snowmobile 10 can be driven.

The right side panel 50 defines an aperture 200 in a generally vertically extending and generally rearwardly facing surface of the right side panel 50 to provide access to the charging port 126. The right side panel 50 is pivotable about an axis 202 (FIG. 1) defined by a hinge (not shown). In the present embodiment, the pivot axis 202 is at less than 45 degrees from horizontal. The right side panel 50 can pivot between a closed position, shown in FIGS. 1, 2 and 4 and an open position shown in FIGS. 3 and 5. The charging port 126 remains in position relative to the frame 16 as the right side panel 50 pivots between the open and closed positions. In the closed position, the right side panel 50 covers part of a front right side portion of the frame 16 and some components of the snowmobile 10 such as the electric motor 64 and part of the reduction drive assembly. In the closed position of the right side panel 50, the aperture 200 is aligned with the charging port 126. In the open position, the right side panel 50 provides access to the front right side portion of the frame 16 and some components of the snowmobile 10 such as the electric motor 64 and part of the reduction drive assembly. Latches 204 are used to lock the right side panel 50 in the closed position.

Figure 25:
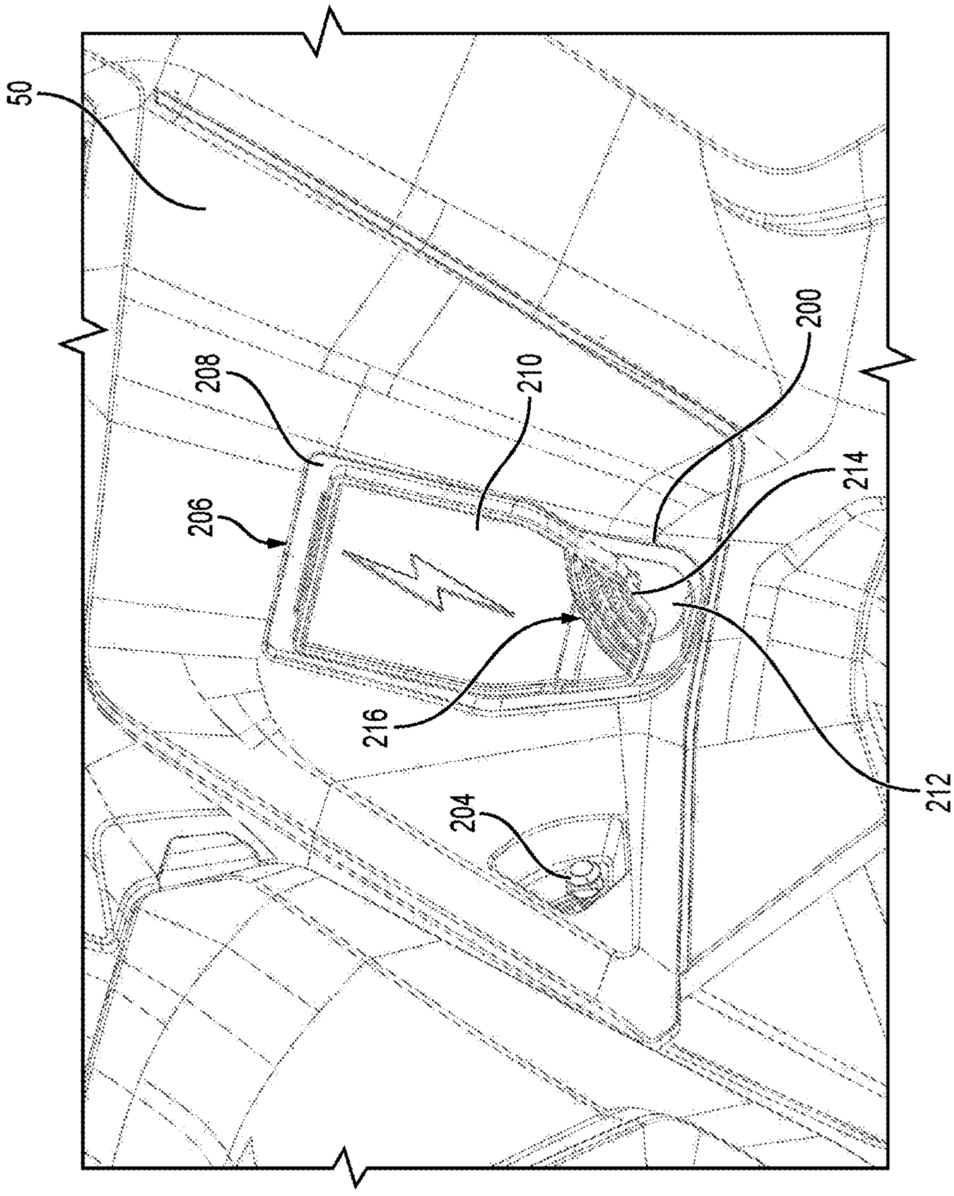
FIG. 25 is a close-up, perspective view, taken from a rear, right side of a door of the charging port and of its surrounding components of the snowmobile of FIG. 1.

A door assembly 206 is connected to the charging port 126. The door assembly 206 has a base 208 (FIG. 3) mounted to the charging port 126 and a door 210 pivotally connected to the base 208. The door 210 selectively covers the charging port 126. More specifically, the door 210 pivots between a closed position covering the charging port 126 (FIG. 3) and an open position providing access to the charging port 126 (FIG. 4). A spring (not shown) biases the door 210 toward the closed position. When the right side panel 50 is in the closed position, the door assembly 206 is received in the aperture 200. When the right side panel 50 is moved to the open position, the door assembly 206, and therefore the door, remains in position and does not move with the right side panel 50. With reference to FIG. 25, the base 208 defines a recess 212 and the door 210 has a truncated corner 214 that make it easier to reach under the door 210 to lift the door 210 to the open position. This is useful when the user is wearing gloves or mittens. Ribs 216 are also provided on the door 210 to make handling of the door 210 easier.

FIGS. 26 to 32 illustrate door assemblies 218, 220, 222 and 224 that are alternative embodiments of the door assembly 206. For simplicity, elements of the door assemblies 218, 220, 222 and 224 that are similar to those of the door assembly 206 have been labeled with the same reference numerals as those used to label the elements of the door assembly 206.

Figure 26:
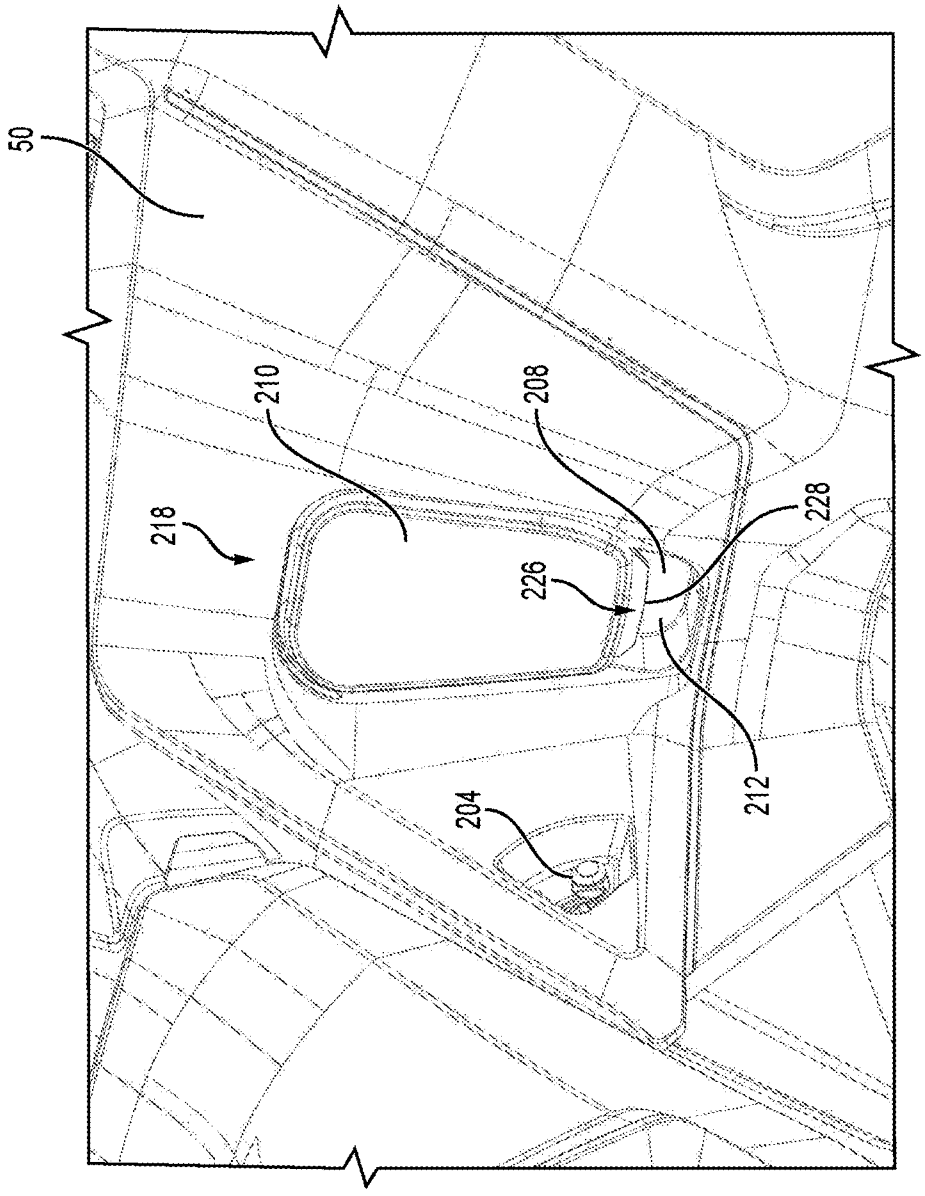
FIG. 26 is a close-up, perspective view, taken from a rear, right side of an alternative embodiment of a door of the charging port of the snowmobile of FIG. 1 and of its surrounding components.
Figure 27:
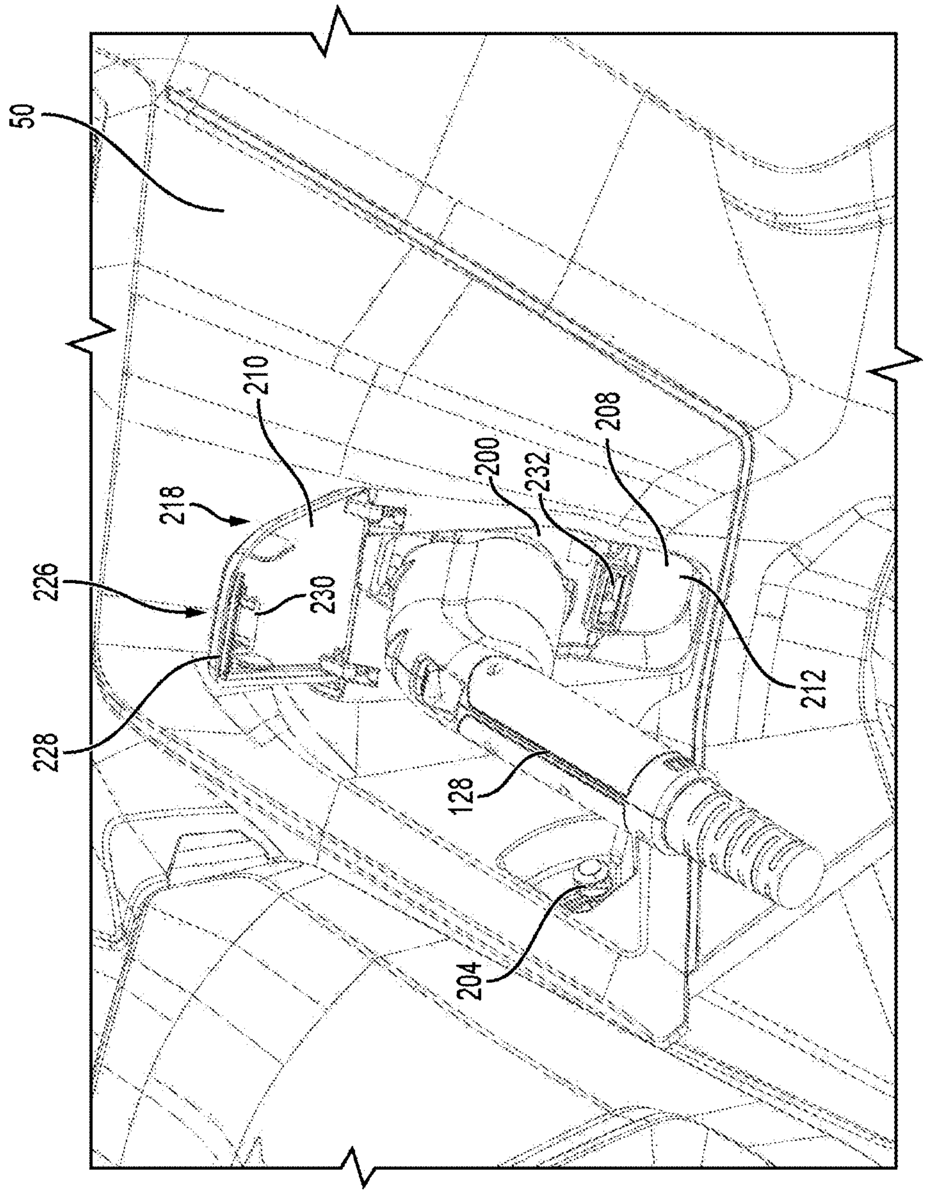
FIG. 27 is a close-up, perspective view, taken from a rear, right side of the door of the charging port of FIG. 26 and of its surrounding components with the door open and with a plug of an electric vehicle charger connected to the charging port.

FIGS. 26 and 27 illustrate the door assembly 218. The door 210 of the door assembly 218 has a spring-loaded latch 226 at its lower end. The latch 226 has a lever 228 and a hook 230. The hook 230 is selectively engaged in a port 232 defined in the base 208 to lock the door 210 in the closed position. Pressing the lever 228 disengages the hook 230 from the port 232, thereby allowing the door 210 to be moved to the open position.

Figure 28:
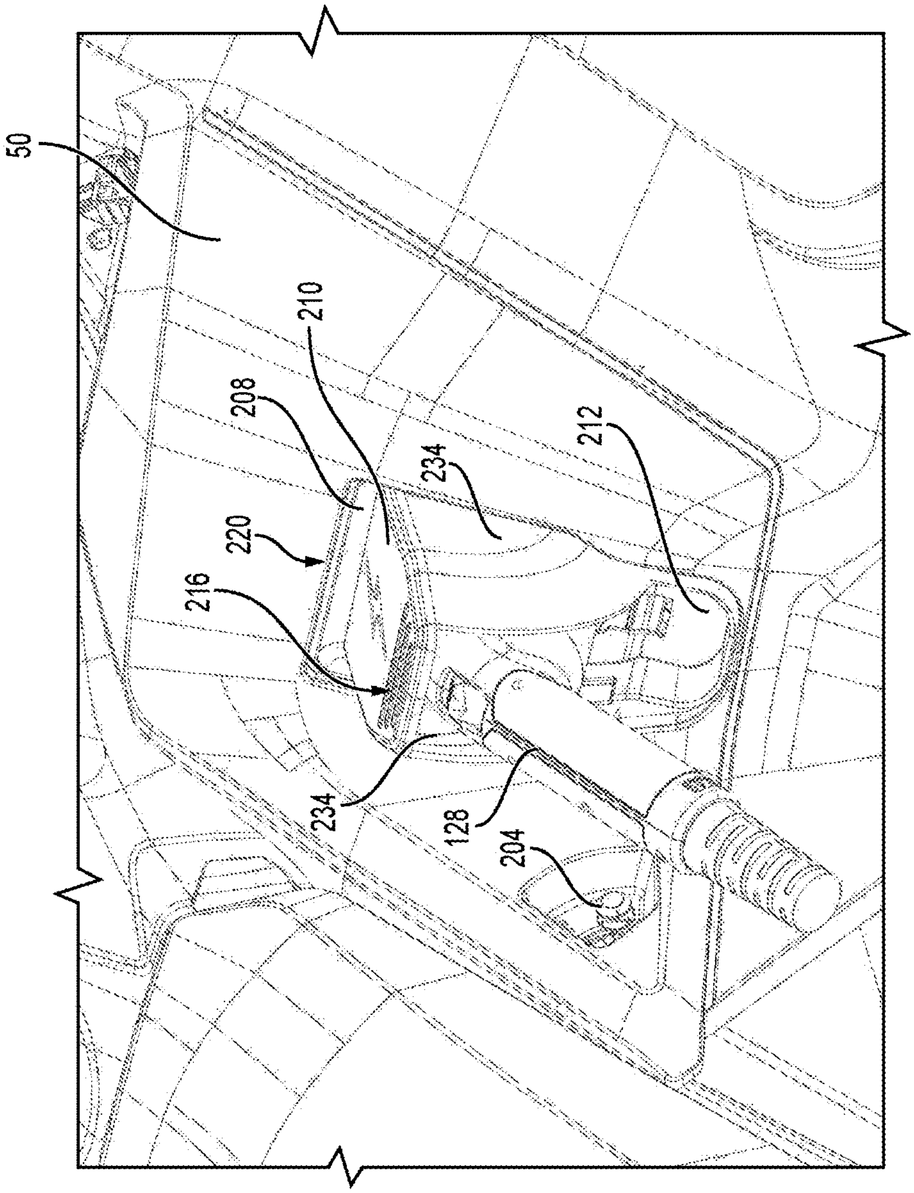
FIG. 28 is a close-up, perspective view, taken from a rear, right side of another alternative embodiment of a door of the charging port of the snowmobile of FIG. 1 and of its surrounding components with the door open and with a plug of an electric vehicle charger connected to the charging port.

FIG. 28 illustrates the door assembly 220. In this embodiment, the door 210 has side walls 234. These side walls 234 shield the sides of the plug 218 when the door 210 is in the open position and the plug 128 is connected to the charging port 126 as shown.

Figure 29:
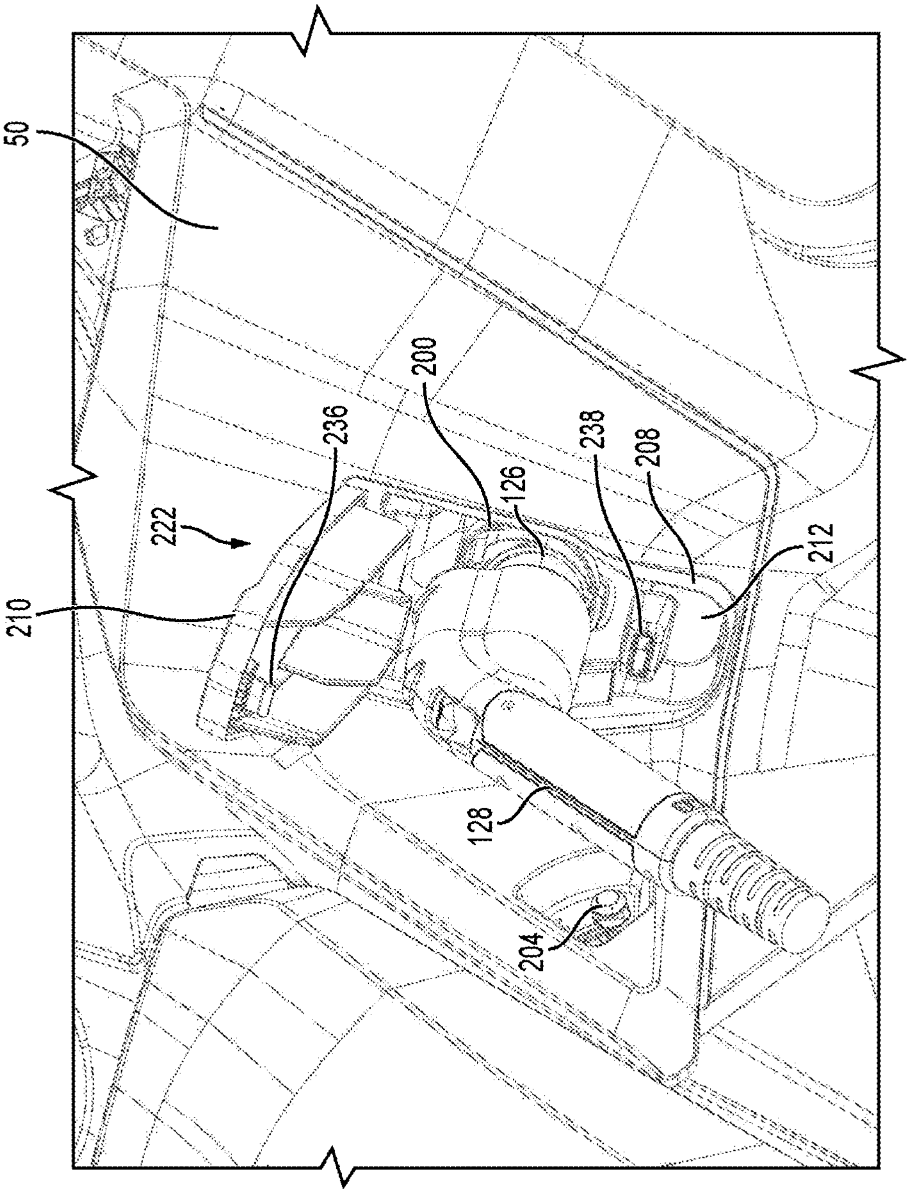
FIG. 29 is a close-up, perspective view, taken from a rear, right side of yet another alternative embodiment of a door of the charging port of the snowmobile of FIG. 1 and of its surrounding components with the door open and with a plug of an electric vehicle charger connected to the charging port.

FIG. 29 illustrates the door assembly 222. The door 210 of the door assembly 228 has a tongue 236 at its lower end. The tongue 236 is selectively engaged in a port 238 defined in the base 208 and having an internal mechanism to lock the door 210 in the closed position. The tongue 236, the port 238 and its internal mechanism together define a push-latch. Pressing down on the door 210 near its lower end disengages the tongue 236 from the port 238, thereby allowing the door 210 to be moved to the open position. Closing the door 210 moves the tongue 236 in the port 238 and locks the door 210 in the closed position.

Figure 30:
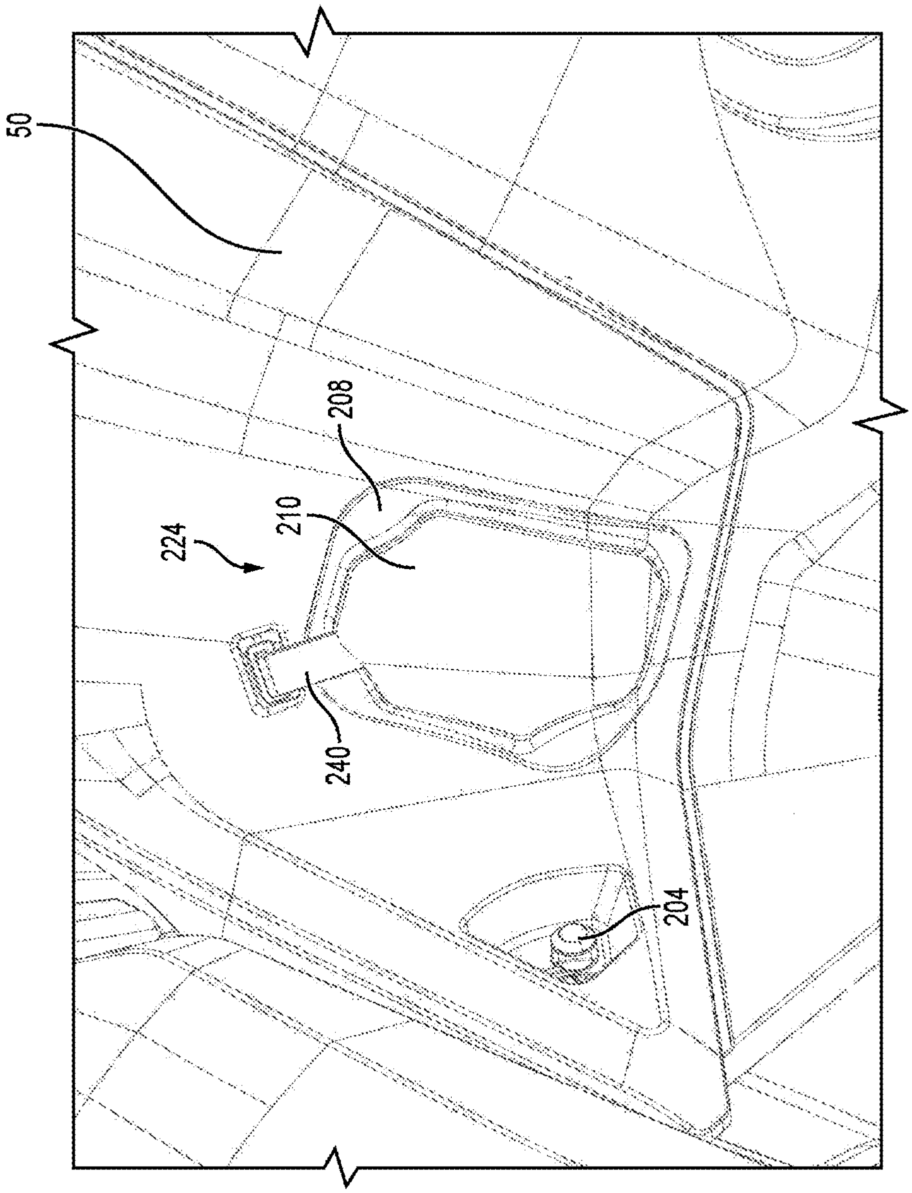
FIG. 30 is a close-up, perspective view, taken from a rear, right side of another alternative embodiment of a door of the charging port of the snowmobile of FIG. 1 and of its surrounding components.
Figure 31:
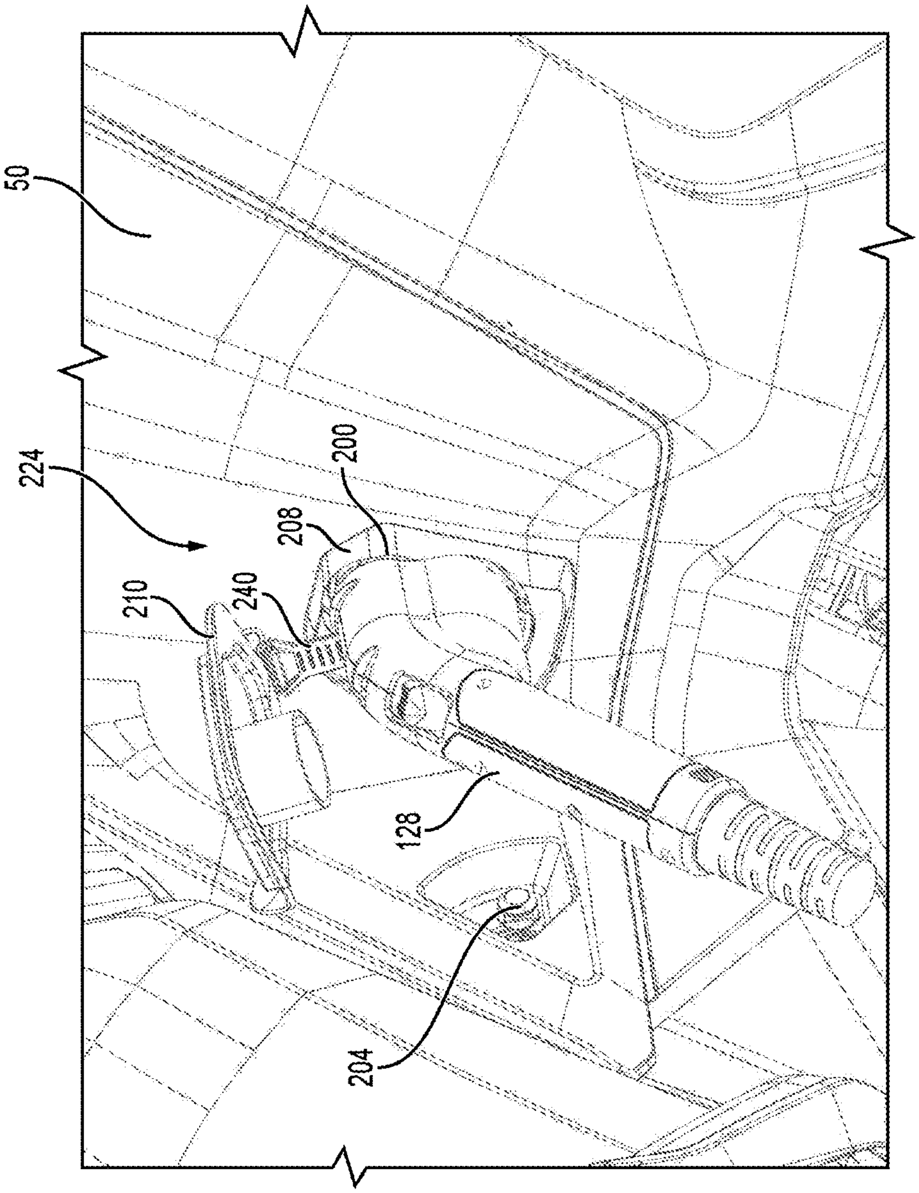
FIG. 31 is a close-up, perspective view, taken from a rear, right side of the door of the charging port of FIG. 30 and of its surrounding components with the door open and with a plug of an electric vehicle charger connected to the charging port.

FIGS. 30 to 32 illustrate the door assembly 224. In this embodiment, the base is integrated to the right side panel 50. The door 210 is removable and is connected to the right side panel by a strap 240. As such, the door 210 moves with the right side panel 50 as the right side panel 50 moves between the open and closed positions as shown in FIG. 32.

Frame

Turning now to FIGS. 7 to 15, the frame 16 of the snowmobile 10 will be described in more detail. As previously described, the frame 16 has a tunnel 18, a subframe 20 connected to the tunnel 18 and being disposed in front of the tunnel 18, and footrests 44 connected to and extending outward from the tunnel 18. In the present embodiment, the footrests are integrally connected to the tunnel 18, but it is contemplated that the footrests could be separate parts that are connected to the tunnel 18 via fasteners or welding for example. The frame 16 also has a brace assembly 250. The brace assembly 250 is connected to the tunnel 18 and the subframe 20 and extends in part forward of the tunnel 18. As will be described below, the brace assembly 250 is also mounted to the battery pack 120 such that the battery pack 120 forms a structural component of the frame 16.

The tunnel 18 has a top, which is defined by the heat exchanger 146 in the present embodiment, and left and right sides 252. The footrests 44 extend from the lower ends of the sides 152. Each of the sides 252 defines a longitudinally extending beveled surface 254 at its upper end.

Figure 8:
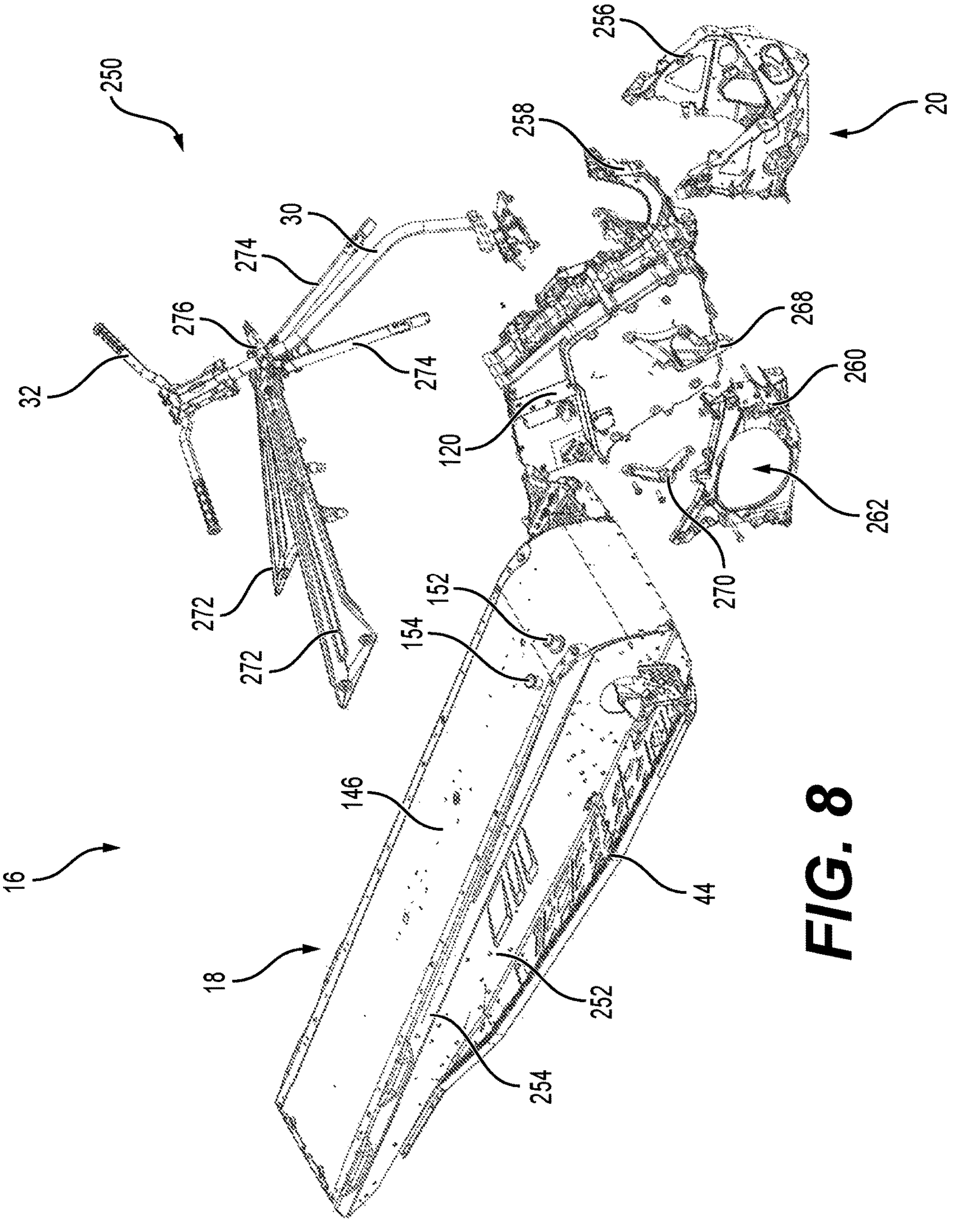
FIG. 8 is a partially exploded, perspective view, taken from a front, right side of a frame, a battery pack, and part of a steering assembly of the snowmobile of FIG. 1.
Figure 9:
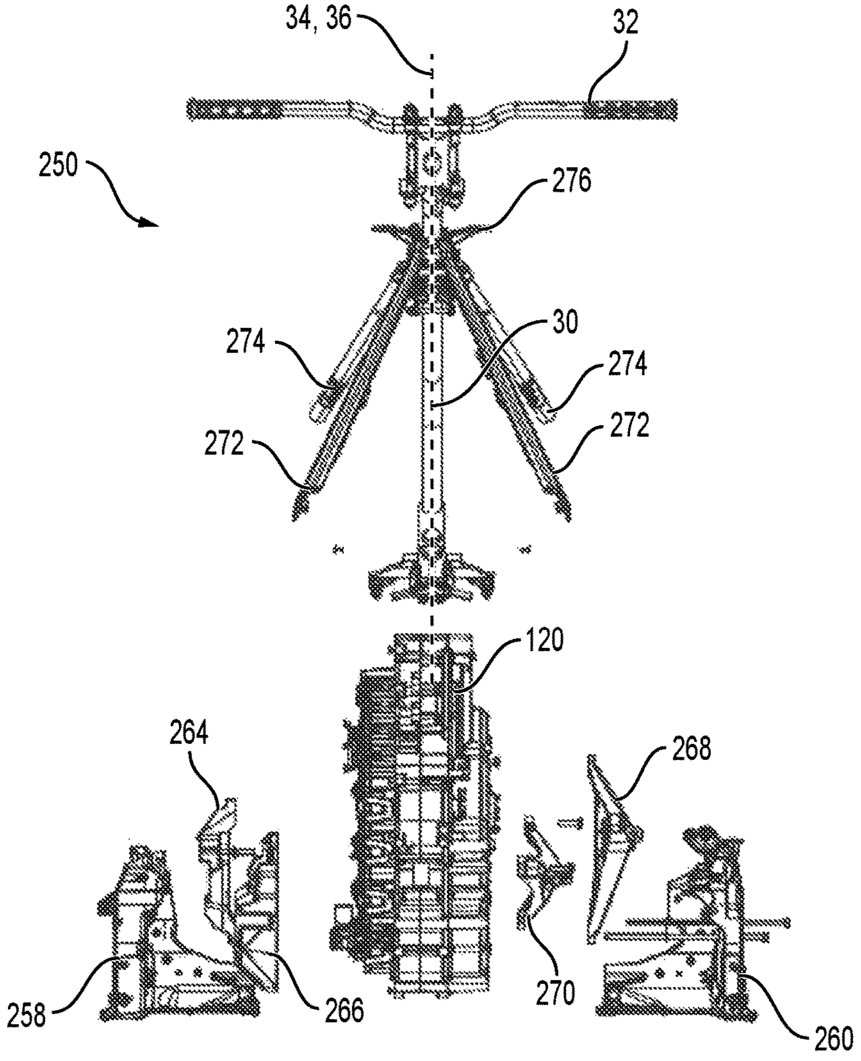
FIG. 9 is a partially exploded, rear elevation view of some of the components of FIG. 8.
Figure 10:
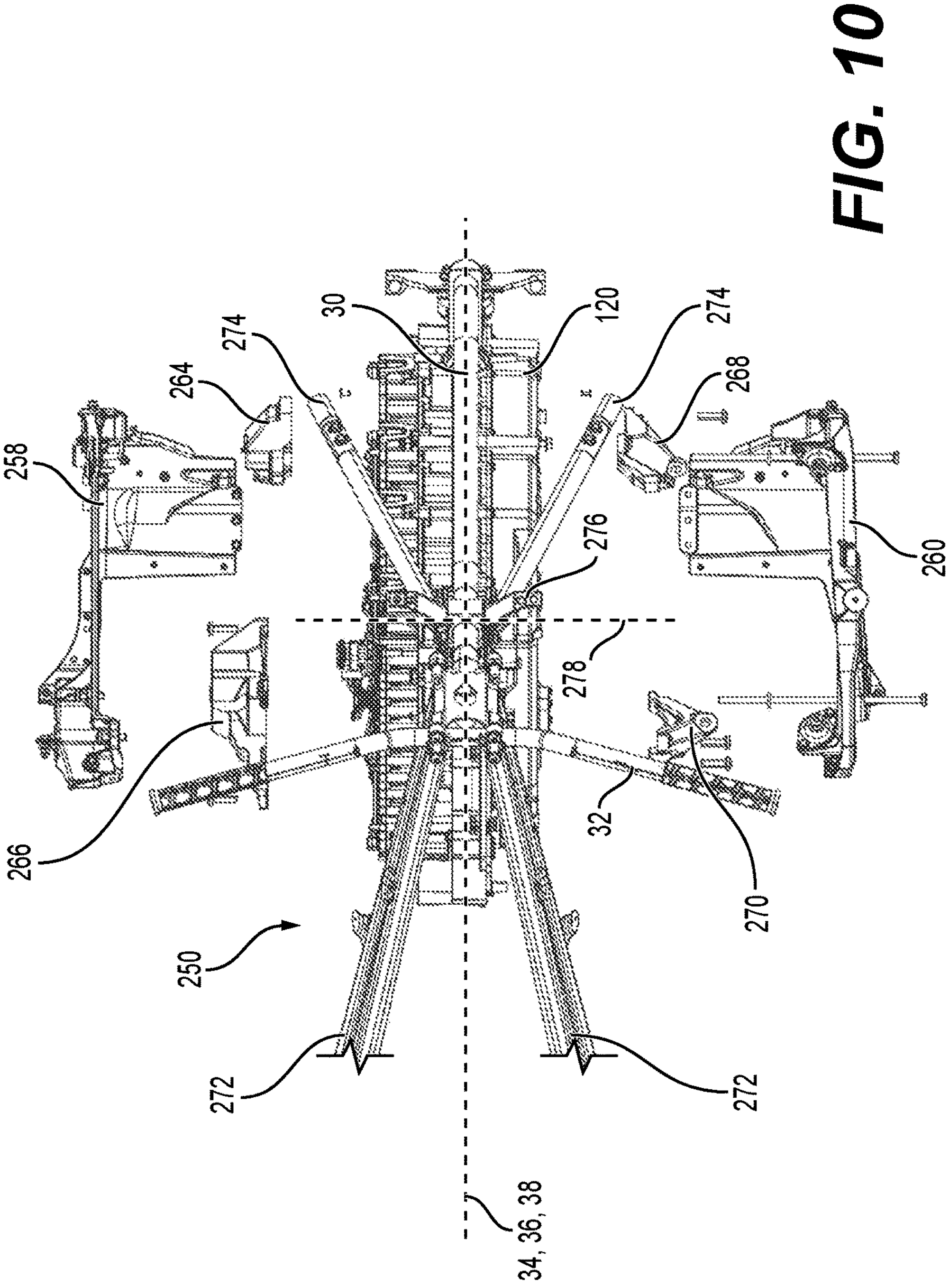
FIG. 10 is a partially exploded, top plan view of the components of FIG. 9.

The subframe 20 is made of three main parts: a center portion 256, a left side 258 and a right side 260. The front ends of the left and right sides 258, 260 are fastened to the center portion 256 such that, when viewed from above, the subframe 20 is generally U-shaped. The rear ends of the left and right sides 258, 260 of the subframe 20 are fastened to the front of the tunnel 18. The right side 260 of the subframe 20 defines an aperture 262 (FIG. 8). The electric motor 64 extends through this aperture 262 and is fastened to the right side 260. The inner cover 86 of the reduction drive housing 92 is fastened to the right side 260 of the subframe 20 and to the right side 252 of the tunnel 18.

Figure 11:
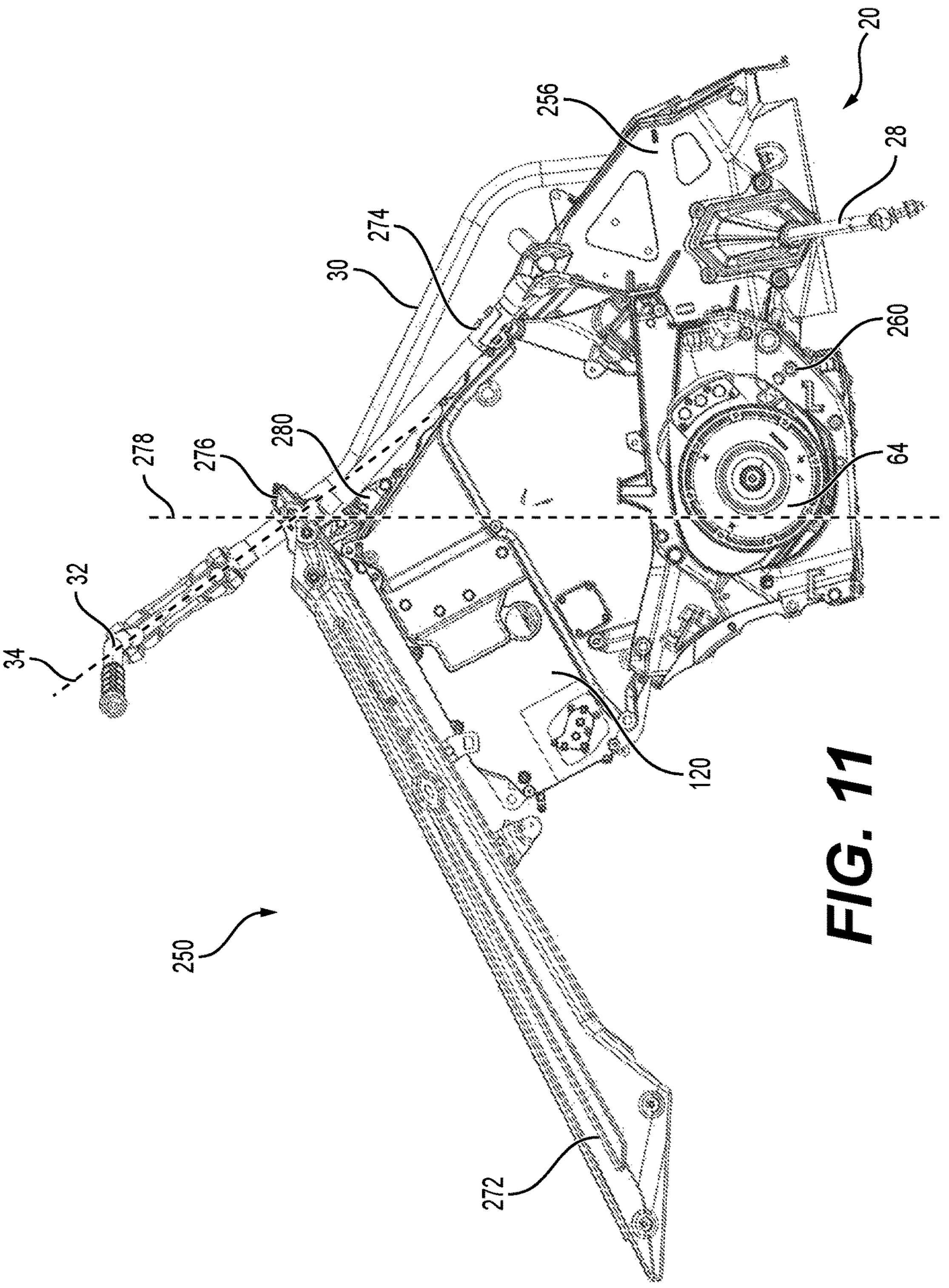
FIG. 11 is a right side elevation view of the battery pack, motor, part of the steering assembly and part of the frame of the snowmobile of FIG. 1.

The lower portion of the battery pack 120 is received in a space defined by subframe 20, as best seen in FIG. 11, in front of the tunnel 18. Battery pack 120 is connected to the subframe 20 by spacers 264, 266, 268, 270. The front and rear left spacers 264, 266 are disposed between the left side 258 of the subframe 20 and the battery pack 120 and connect the battery pack 120 to the left side 258 of the subframe 20. The front and rear right spacers 268, 270 are disposed between the right side 260 of the subframe 20 and the battery pack 120 and connect the battery pack 120 to the right side 260 of the subframe 20. The spacers 264, 266, 268, 270 rigidly connect the battery pack 120 to the subframe 20. It is contemplated that in some embodiments, there may be only one or more than two spacers on each side of the battery pack 120 for connecting the battery pack 120 to the corresponding side 258 or 260 of the subframe 20. Using spacers such as the spacers 264, 266, 268, 270, allows a family of snowmobiles having different widths of subframe 20 and/or different widths of power pack 120 to be assembled as will be described further below with reference to FIGS. 39A to 39D.

In the present embodiment, the brace assembly 250 is a pyramidal brace assembly 250 having two rear legs 272 and two front legs 274 that connect to a steering column support bracket 276. The steering column 30 passes through and is supported by the steering column support bracket 276 which is disposed above the battery pack 120. The steering column support bracket 276 defines an apex of the pyramidal brace assembly 250. The steering column support bracket 276 is disposed over the battery pack 120 such that a vertically and laterally extending plane 278 (FIGS. 10 and 11) passing through the apex also passes through the battery pack 120 and the electric motor 64. The brace assembly 250 also includes a battery bracket 280 connected between the steering column support bracket 276 and the battery pack 120.

The rear left leg 272 has a rear end connected to the beveled surface 254 of the left side 252 of the tunnel 18 and a front end connected to the steering column support bracket 276. The rear right leg 272 has a rear end connected to the beveled surface 254 of the right side 252 of the tunnel 18 and a front end connected to the steering column support bracket 276. As can be seen, the rear legs 272 extend upward, forward and laterally inward from their rear ends to their front ends. As such, the rear ends of the rear legs 272 are spaced further from each other than the front ends of the rear legs 272. The battery pack 120 is disposed laterally between the rear ends of the rear legs 272. The front ends of the rear legs 272 are disposed over the battery pack 120.

The front left leg 274 has a rear end connected to the steering column support bracket 276 and a front end connected to the center portion 256 of the subframe 20. The front right leg 274 has a rear end connected to the steering column support bracket 276 and a front end connected to the center portion 256 of the subframe 20. As can be seen, the front legs 274 extend downward, forward and laterally outward from their rear ends to their front ends. As such, the front ends of the front legs 274 are spaced further from each other than the rear ends of the front legs 274. The battery pack 120 is disposed laterally between the front ends of the front legs 274. The rear ends of the front legs 274 are disposed over the battery pack 120.

Figure 15:
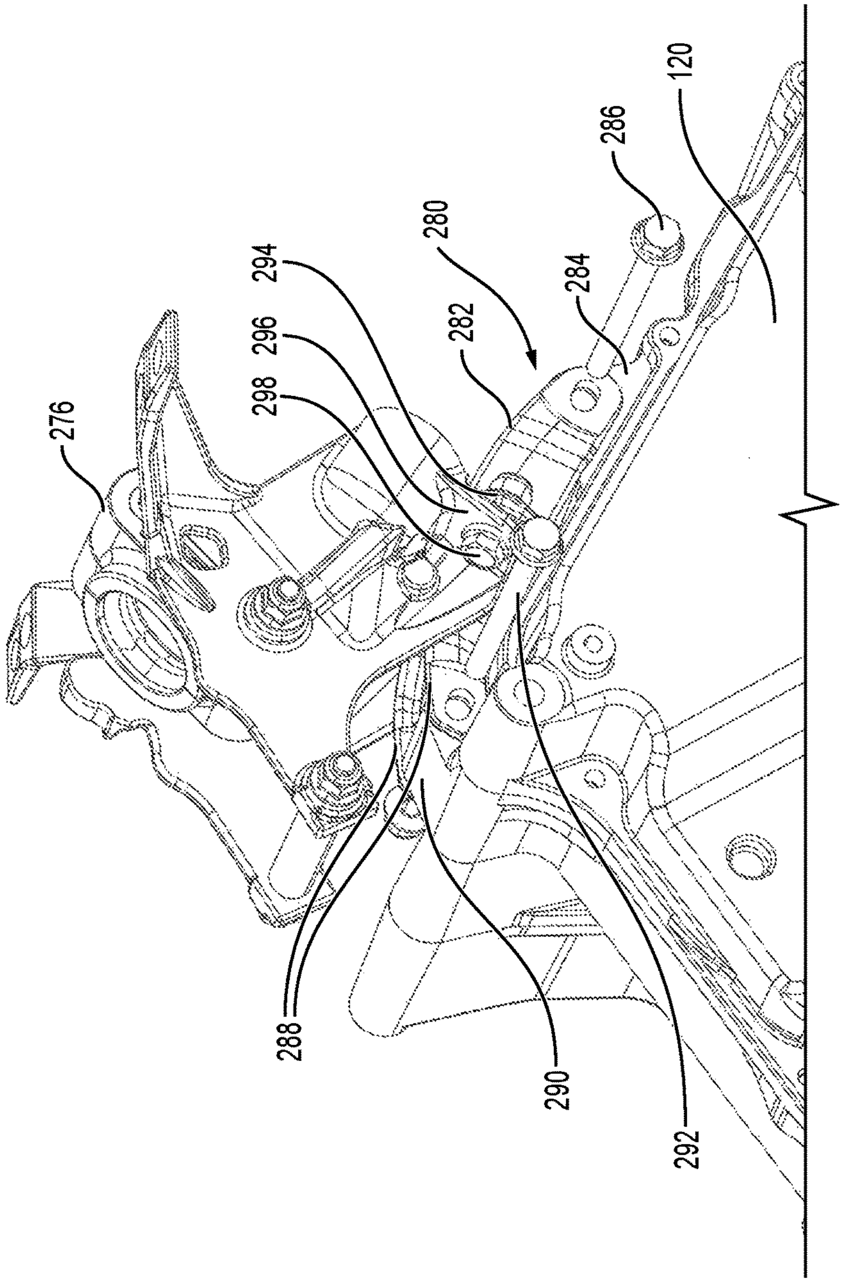
FIG. 15 is a close-up, perspective view, taken from a rear, right side of a brace assembly and an upper portion of the battery pack.

With reference to FIGS. 13 to 15, it can be seen that the battery bracket 280 has an arcuate lateral profile. The battery bracket 280 has two front bracket arms 282. A portion of a top of the battery pack 120 defines a boss 284 that is received between the two front bracket arms 282. A fastener 286 (FIG. 15) extends laterally through the front of the front bracket arms 282 and the boss 284 to fasten the front end of the battery bracket 280 to the battery pack 120. The battery bracket 280 has two rear bracket arms 288. A portion of a top of the battery pack 120 defines a boss 290 rearward of the boss 284. The boss 290 is received between the two rear bracket arms 288. A fastener 292 (FIG. 15) extends laterally through the rear of the rear bracket arms 288 and the boss 290 to fasten the rear end of the battery bracket 280 to the battery pack 120. The middle portion of the battery bracket 280 has left and right laterally extending battery bracket tabs 294. The steering column support bracket 276 has left and right laterally extending steering column support bracket tabs 296. The middle portion of the battery bracket 280 is connected to the steering column support bracket 276 by a longitudinally extending left fastener 298 fastening the left steering column support bracket tab 296 to the left battery bracket tab 294 and by a longitudinally extending right fastener 298 fastening the right steering column support bracket tab 296 to the right battery bracket tab 294.

Method for Assembling a Vehicle

Turning now to FIGS. 39A to 39D, a method for assembling an electric snowmobile will be described. The electric snowmobile has the same or similar components as the snowmobile 10 described above, but the subframe 20, the battery pack 120 and the spacers 264, 266, 268, 270 are selected from various different available versions of these components. As such, a family of electric snowmobiles each having different characteristics can be assembled using a limited number of components. As described above, using spacers such as the spacers 264, 266, 268, 270 allows this to be achieved.

The method begins with selecting a subframe from two subframes 20A, 20B. The subframe 20B is wider than the subframe 20A. Then, a battery pack is selected from two battery packs 120A, 120B. The battery pack 120A is narrower than the battery pack 120B. The wider battery pack 120B contains more battery cells than the battery pack 120A, and therefore has more usable energy. It is contemplated that the battery pack could be selected before the subframe. As such, by selecting from two different subframes 20A, 20B and two different battery packs 120A, 120B, four different combinations of subframes and battery packs are possible: the subframe 20A with the battery pack 120A (FIG. 39A), the subframe 20A with the battery pack 120B (FIG. 39B), the subframe 20B with the battery pack 120B (FIG. 39C), and the subframe 20B with the battery pack 120A (FIG. 39D). It is contemplated that the subframe could be selected from more than two subframes and that the battery pack could be selected from more than two battery packs. It is also contemplated that only one subframe may be available and that the battery pack could be selected from two or more battery pack It is also contemplated that only one battery pack may be available and that the subframe could be selected from two or more subframes.

Then, based on the selected ones of the subframes 20A, 20B and battery packs 120A, 120B, a set of spacers is selected. The set of spacers that is selected to correspond to the lateral distance between the selected subframe and the selected battery pack such that the set of spacers can connect the selected battery pack to the subframe in the manner described above with respect to the subframe 20, the battery pack 120 and the spacers 264, 266, 268, 270.

Figure 39A:
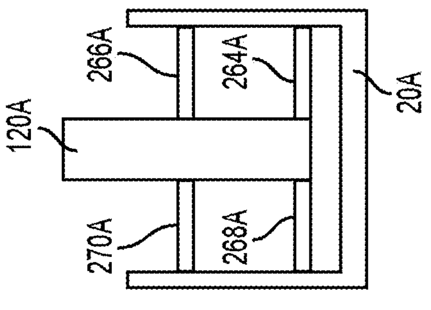
FIG. 39A to 39D are schematic illustrations of different configurations of subframes, battery packs and spacers.

With reference to FIG. 39A, in response to selecting the subframe 20A and the battery pack 120A, spacers 264A, 266A, 268A and 270A are disposed between the battery pack 120A and the sides of the subframe 20A, and the battery pack 120A is connected to the sides of the subframe 20A via the spacers 264A, 266A, 268A and 270A.

Figure 39B:
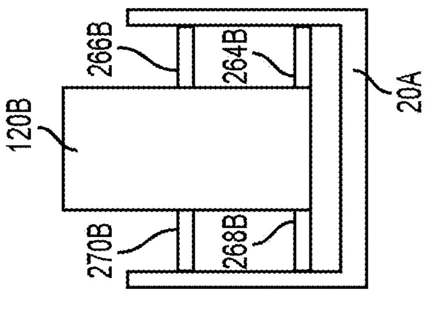

With reference to FIG. 39B, in response to selecting the subframe 20A and the battery pack 120B, spacers 264B, 266B, 268B and 270B are disposed between the battery pack 120B and the sides of the subframe 20A, and the battery pack 120B is connected to the sides of the subframe 20A via the spacers 264B, 266B, 268B and 270B. As the lateral distance between the battery pack 120A and the sides of the subframe 20A is greater than the lateral distance between the battery pack 120B and the sides of the subframe 20A, the combined width of the spacers 264A, 268A is greater than the combined width of the spacers 264B, 268B, and the combined width of the spacers 266A, 270A is greater than the combined width of the spacers 266B, 270B.

Figure 39C:
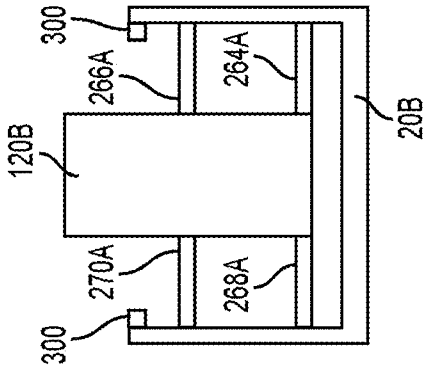
Figure 39D:
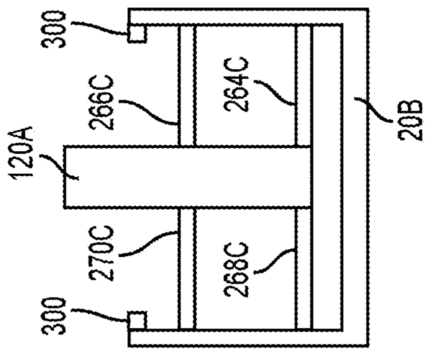
Figure 40:
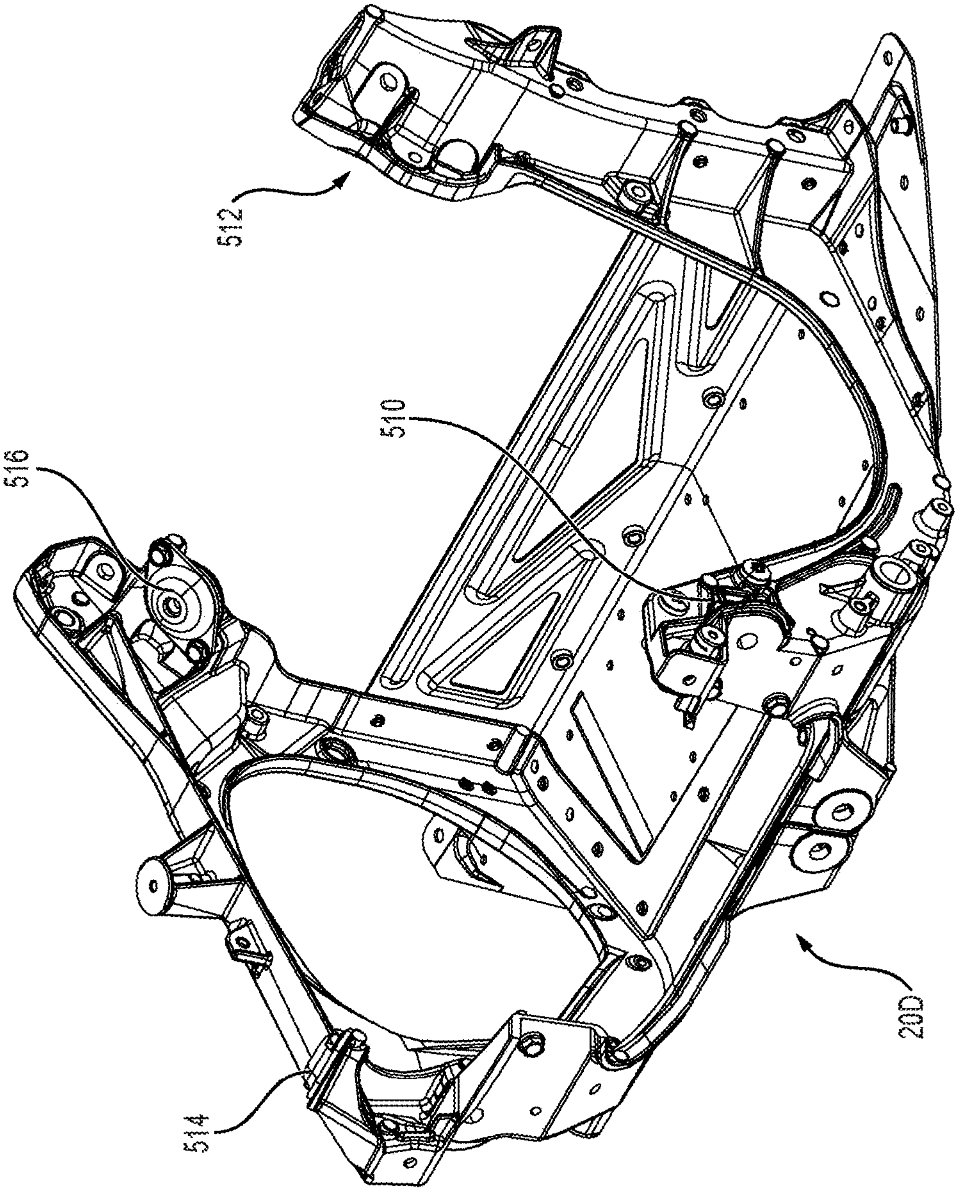
FIG. 40 is a perspective view taken from a front, left side of an alternative embodiment of a subframe.

With reference to FIG. 39C, in response to selecting the subframe 20B and the battery pack 120B, spacers 264A, 266A, 268A and 270A are disposed between the battery pack 120B and the sides of the subframe 20B, and the battery pack 120B is connected to the sides of the subframe 20B via the spacers 264A, 266A, 268A and 270A. In the present embodiment, the lateral distance between the battery pack 120A and the sides of the subframe 120A is the same as the lateral distance between the battery pack 120B and the sides of the subframe 20B, the same spacers 264A, 266A, 268A and 270A can be used in both combinations. It is contemplated that the lateral distance between the battery pack 120A and the sides of the subframe 120A could be different from the lateral distance between the battery pack 120B and the sides of the subframe 20B, in which case different sets of spacers would be used in the two combinations.

With reference to FIG. 39D, in response to selecting the subframe 20B and the battery pack 120A, spacers 264C, 266C, 268C and 270C are disposed between the battery pack 120A and the sides of the subframe 20B, and the battery pack 120A is connected to the sides of the subframe 20B via the spacers 264C, 266C, 268C and 270C. As the lateral distance between the battery pack 120A and the sides of the subframe 20B is greater than the lateral distance between the battery pack 120A and the sides of the subframe 20A, the combined width of the spacers 264C, 268C is greater than the combined width of the spacers 264A, 268A, and the combined width of the spacers 266C, 270C is greater than the combined width of the spacers 266A, 270A.

The selected one of the subframes 20A, 20B is connected to the tunnel 18. When the wider subframe 20B is selected, spacers 300 are disposed between the sides of the subframe 20B and the sides 252 of the tunnel 18 and are used to connect the subframe 20B to the tunnel 18. It is contemplated that the selected one of the subframes 20A, 20B could connected to the tunnel 18 before the selected one of the battery packs 120A, 120B is connected to the selected one of the subframes 20A, 20B. After the selected one of the subframes 20A, 20B is connected to the tunnel 18, the brace assembly 250 is connected to the selected one of the subframes 20A, 20B and to the tunnel 18.

Other steps of assembling the snowmobile, some of which are described hereafter, are also performed. The order of these steps may vary. At least some of these steps may be performed before the be performed before or between the steps described above.

The seat 40 is connected to the tunnel 18. The skis 22 are operatively connected to the selected on of the subframes 20A, 20B. The drive track 60 is disposed at least in part under the tunnel 18 and is operatively connected to the tunnel 18. The electric motor 64 is passed through the aperture 262 in the right side 260 of the selected one of the subframes 20A, 20B and is fastened to the right side 260. The electric motor 64 is electrically connected to the selected one of the battery packs 120A, 120B via the inverter 122. The electric motor 64 is operatively connected to the drive track 60 via the reduction drive assembly. The reduction drive housing 92 of reduction drive assembly is connected to right side 260 the selected one of the subframes 20A, 20B and the right side 252 of the tunnel 18. When the wider subframe 20B is selected, one or more spacers (not shown) are used to connect the inner cover 86 of the reduction drive housing 92 to the right side 252 of the tunnel 18. The brace assembly 250 is connected to the tunnel 18 and the selected one of the subframes 20A, 20B. The brace assembly 250 is also mounted to the selected one of the battery packs 120A, 120B. The steering column 30 is pivotally connected to the brace assembly 250 by passing the steering column 30 through the steering column support bracket 276. The battery bracket 280 is connected between the steering column bracket 276 and the selected one of the battery packs 120A, 120B, as described above with respect to FIGS. 13 to 15. The heat exchanger 146 is fluidly connected to the electric motor 64 and to the selected one of the battery packs 120A, 120B.

Figure 41:
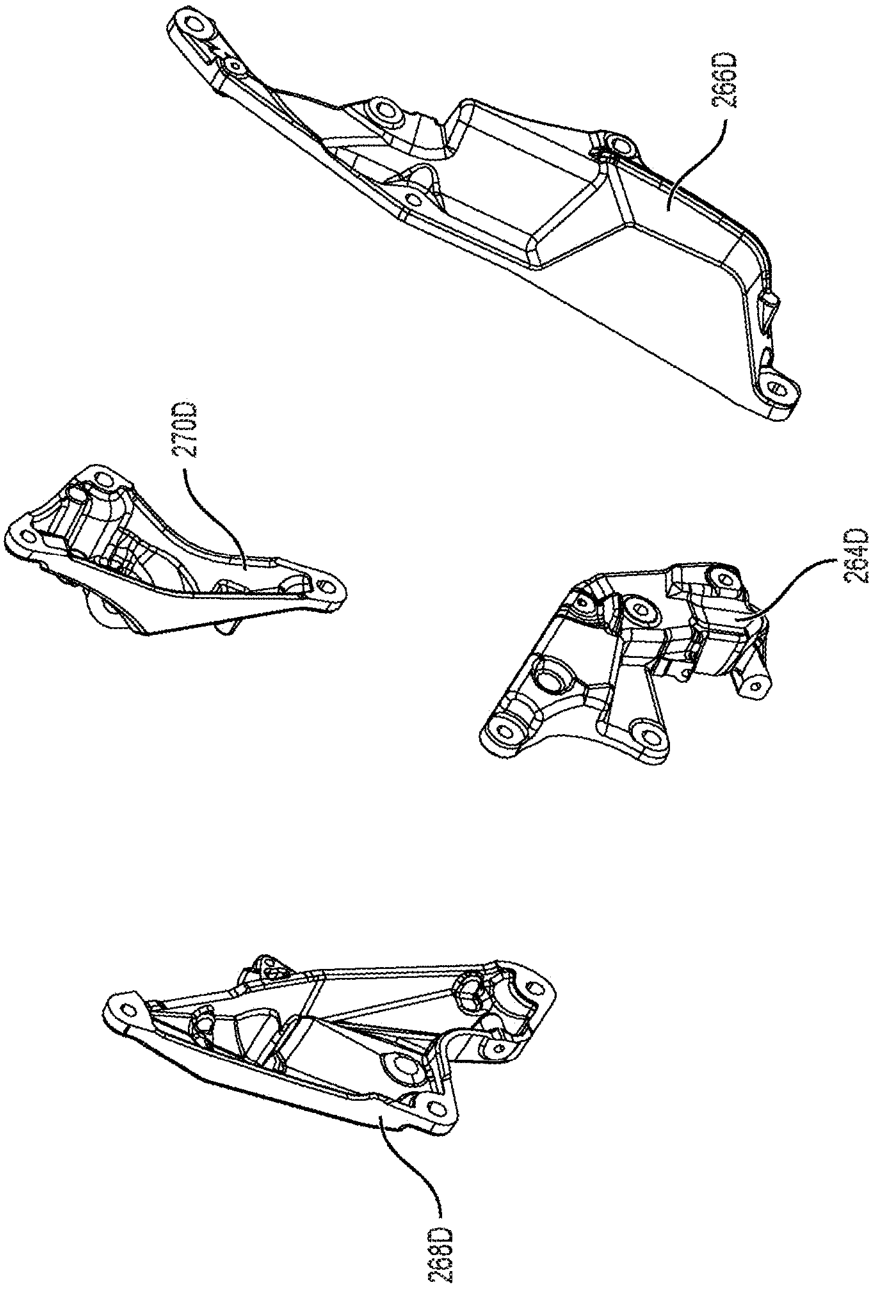
FIG. 41 is a perspective view taken from a front, left side of spacers to be used to mount a battery pack to the subframe of FIG. 40.
Figure 42:
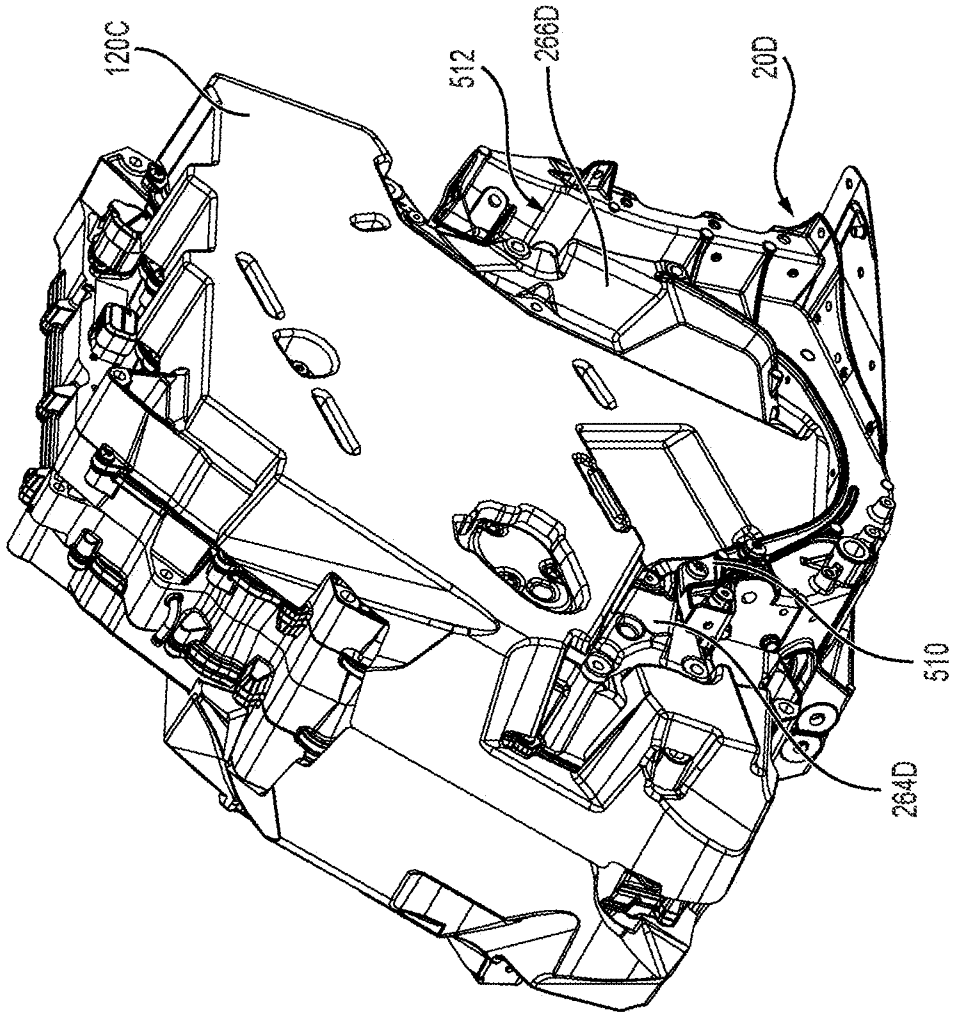
FIG. 42 is a perspective view taken from a front, left side of a battery pack connected to the subframe of FIG. 40 via the spacers of FIG. 41.
Figure 43:
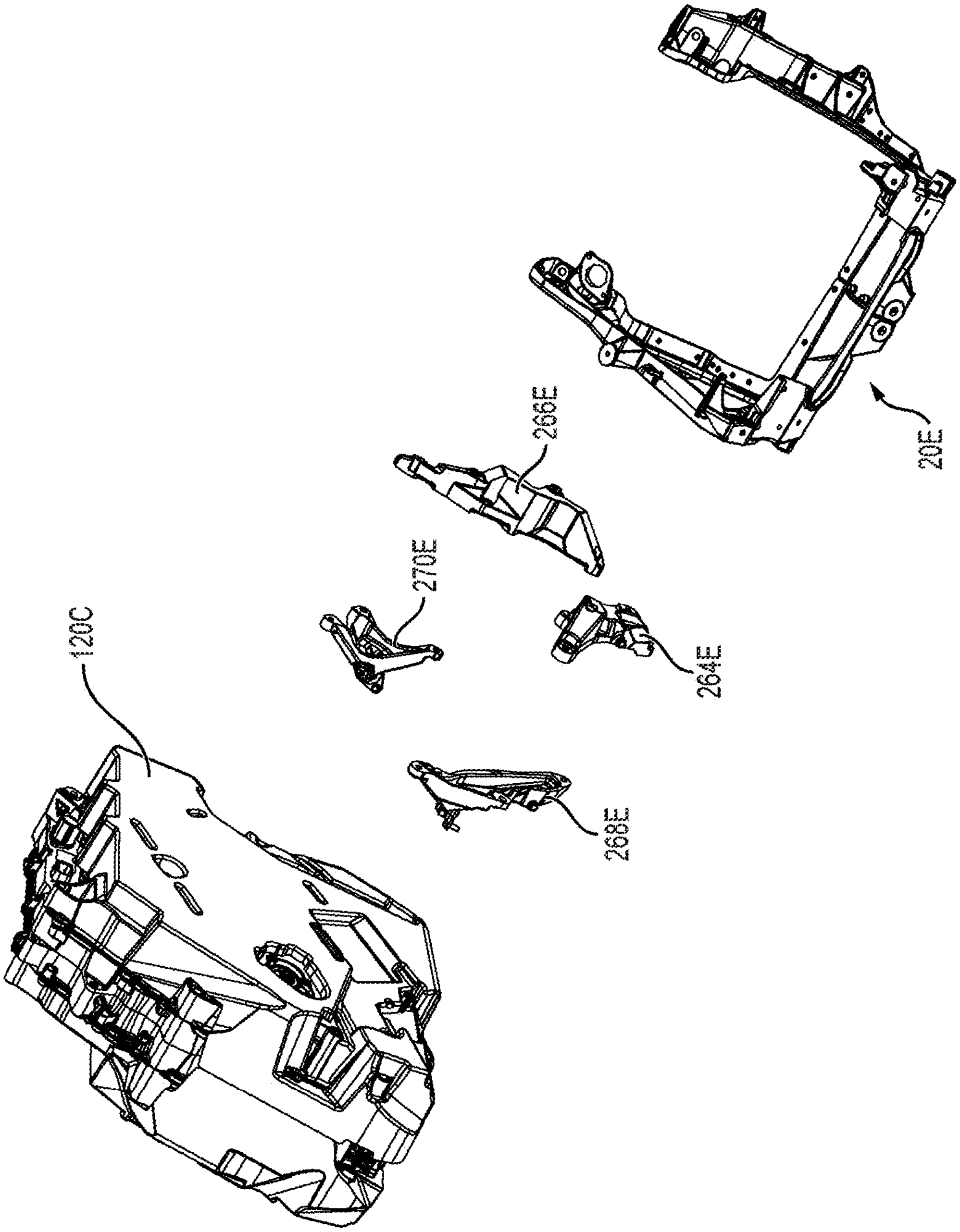
FIG. 43 is an exploded perspective view taken from a front, left side of the battery pack of FIG. 42, an alternative embodiment of the subframe of FIG. 40, and alternative embodiments of the spacers of FIG. 41 adapted for connecting the battery pack to the alternative embodiment of the subframe.

With reference to FIGS. 40 to 43, in an alternative method of assembling a snowmobile, the same battery pack 120C can be connected to two different frames that are structurally different using spacers 264D, 266D, 268D, 270D or spacers 264E, 266E, 268E, 270E. As such, a family of electric snowmobiles each having different characteristics can be assembled using a limited number of components. The two frames are a subframe 20D (FIG. 40) and a subframe 20E (FIG. 43) for snowmobiles, but as will be described below with reference to FIG. 44, it is contemplated that in alternative embodiments, the frame could be a frame for a different type of vehicle. As can be seen in FIGS. 42 and 43, the spacers 264D, 266D, 268D, 270D are used with the subframe 20D and the spacers 264E, 266E, 268E, 270E are used with the subframe 20E. In this embodiment, the structural difference between the subframes is not the width as in FIGS. 39A to 39D. As can be seen by comparing FIGS. 40 and 43, in this embodiment, the structural difference between the subframes 20D and 20E is their shapes.

As a result of this structural difference, the spacers 264D, 266D, 268D, 270D (see FIG. 41) are different from the spacers 264E, 266E, 268E, 270E (see FIG. 43) as can be seen by comparing FIGS. 41 and 43. However, the spacers 264D, 266D, 268D, 270D connect to the same connection points on the battery pack 120C as the spacers 264E, 266E, 268E, 270E. The spacers 264D, 266D, 268D, 270D and the spacers 264E, 266E, 268E, 270E are shaped to provide a connection between these connections points on the battery pack 120C and the corresponding connection points on the subframes 20D and 20E respectively. In the present embodiment, the connection points on the subframe 20D used for connecting spacers 264D, 266D, 268D, 270D between the battery pack 120C and the subframe 20D are in the same position as the connection points on the subframe 20E used for connecting spacers 264E, 266E, 268E, 270E between the battery pack 120C and the subframe 20E, but the structural differences requires the spacers 264D, 266D, 268D, 270D to be different from the spacers 264E, 266E, 268E, 270E in order to avoid interference with their corresponding frames 20D, 20E. It is contemplated that the position of the connection points on the frame 20D could be different from the position of the connection points on the frame 20E.

The method begins with selecting the subframe 20D or the subframe 20E. It is contemplated that the subframe could be selected from more than two subframes. Then, based on the selected one of the subframes 20D, 20E a set of spacers is selected: the spacers 264D, 266D, 268D, 270D or the spacers 264E, 266E, 268E, 270E.

With reference to FIG. 42, in response to selecting the subframe 20D, the spacers 264D, 266D, 268D and 270D are disposed between the battery pack 120C and the sides of the subframe 20D, and the battery pack 120C is connected to the sides of the subframe 20D via the spacers 264D, 266D, 268D and 270D.

With reference to FIG. 43, in response to selecting the subframe 20E, the spacers 264E, 266E, 268E and 270E are disposed between the battery pack 120C and the sides of the subframe 20E, and the battery pack 120C is connected to the sides of the subframe 20E via the spacers 264E, 266E, 268E and 270E.

Once the battery pack 120C is connected to the selected one of the subframes 20D and 20E, the other components of the snowmobile are assembled as described above with respect to FIGS. 39A to 39D.

In an alternative embodiment, instead of selecting between two snowmobile frames, the frame is selected between frames of different types vehicles and the same battery pack can be connected to either frames. In the present example, the frame is selected between the frame of a snowmobile having the subframe 20D and the frame 400 of a motorcycle 402 shown in FIG. 44. It is contemplated that the two types of vehicles could be two other types of vehicles, or that the frame could be selected between frames of more than just two types of vehicles. The other types of vehicles contemplated include, but at not limited to, all-terrain vehicles (ATVs), side-by-side vehicles (SSVs), and three-wheeled straddle-seat vehicles.

Figure 44:
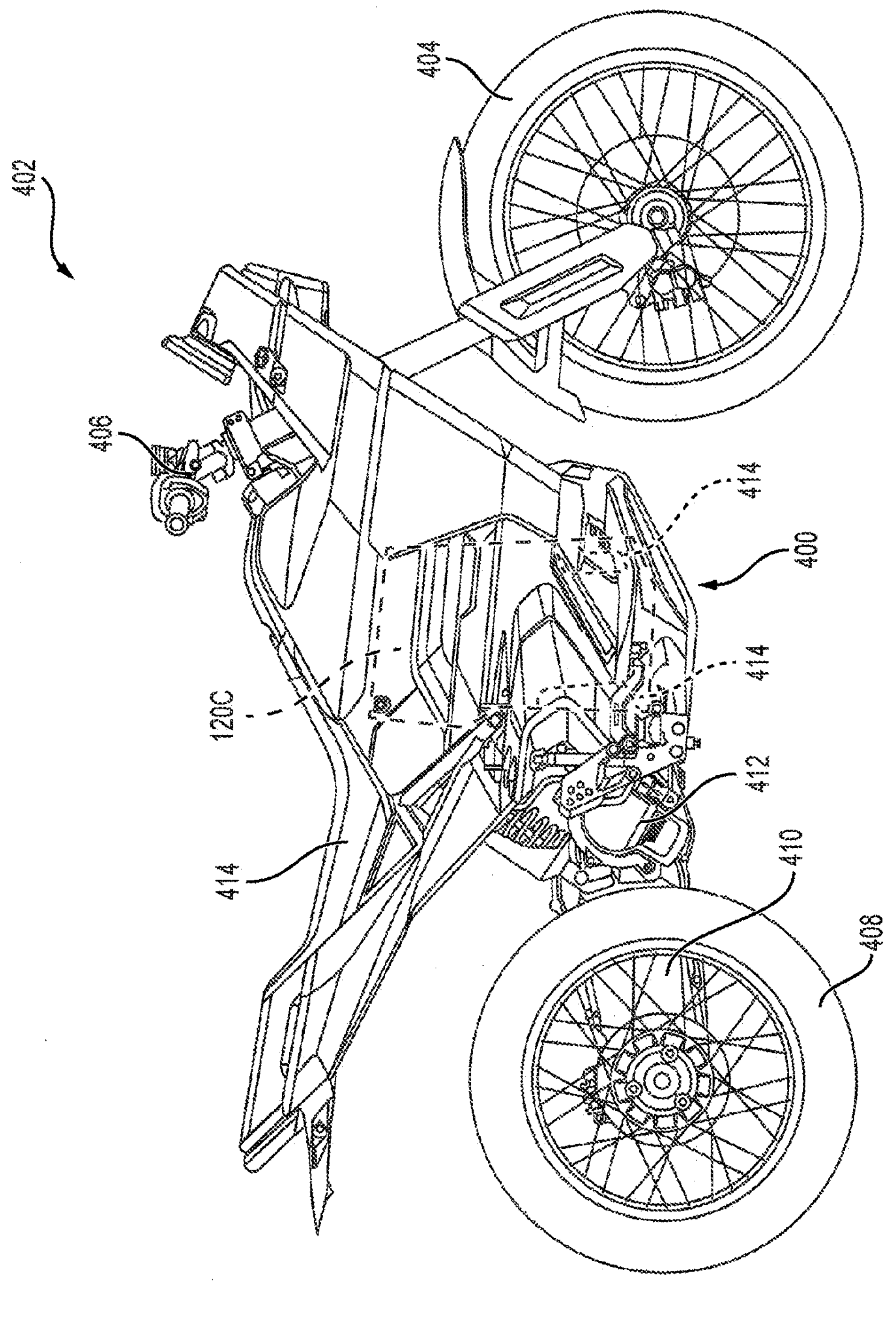
FIG. 44 is a right side elevation view of an electric motorcycle.

The motorcycle 402 has front wheel 404 connected to a handlebar 406, both of which are pivotally connected to the frame 400, and a rear wheel 408 pivotally connected to the frame 400 by a swing arm 410. An electric motor 412 is connected to the swing arm 410 and drives the rear wheel 408. A straddle-seat 414 is supported by the frame 400. The battery 120C is connected to the frame 400 using four spacers 414 (only two of which are schematically shown in FIG. 44, the two other spacers 414 being on the right side of the battery pack 120C) as described below and is electrically connected to the motor 412.

As the subframe 20D and the frame 400 are structurally different, the spacers 264D, 266D, 268D, 270D (see FIG. 41) are different from the spacers 414. However, the spacers 264D, 266D, 268D, 270D connect to the same connection points on the battery pack 120C as the spacers 414. The spacers 264D, 266D, 268D, 270D and the spacers 414 are shaped to provide a connection between these connections points on the battery pack 120C and the corresponding connection points on the subframes 20D and the frame 400 respectively.

The method begins with selecting the subframe 20D for the snowmobile or the frame 400 for the motorcycle 402. Then, based on the selected one of the subframe 20D and the frame 400, a set of spacers is selected: the spacers 264D, 266D, 268D, 270D or the spacers 414.

As in the method previously described above, in response to selecting the subframe 20D, the spacers 264D, 266D, 268D and 270D are disposed between the battery pack 120C and the sides of the subframe 20D, and the battery pack 120C is connected to the sides of the subframe 20D via the spacers 264D, 266D, 268D and 270D. The rest of the snowmobile is then assembled as described above.

With reference to FIG. 44, in response to selecting the frame 400, the spacers 414 are disposed between the battery pack 120C and the sides of the frame 400, and the battery pack 120C is connected to the sides of the frame 400 via the spacers 414. The rest of the motorcycle is then assembled, which includes electrically connecting the motor 412 to the battery pack 120C.

In yet another alternative embodiment, instead of selecting between two snowmobile frames and then connecting the battery pack to the selected one of the frames, the it is the power unit that is selected between different power units. As such, a family of vehicles each having different power units can be assembled using a limited number of components.

Figure 46:
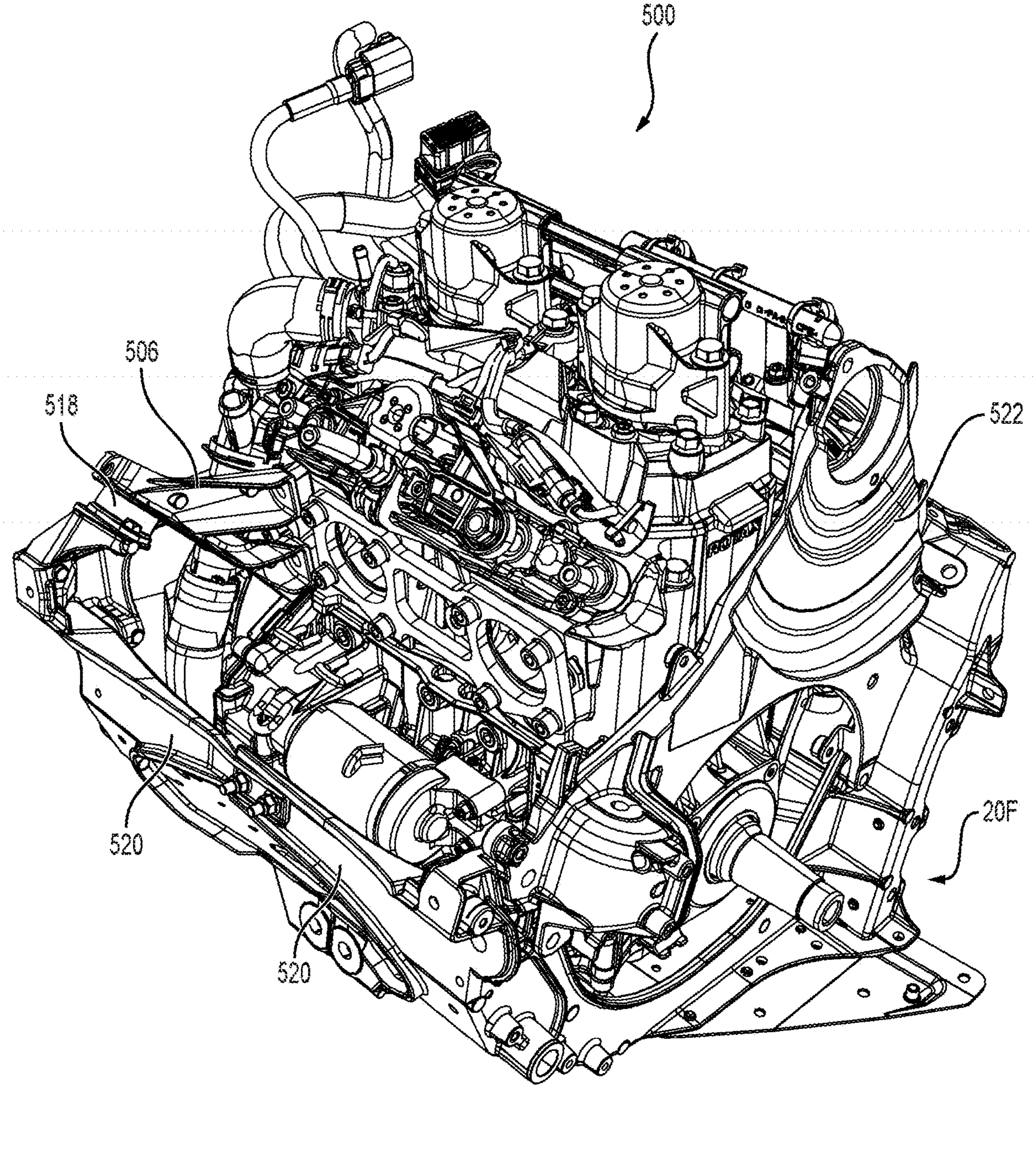
FIG. 46 is a perspective view taken from a front, left side of an internal combustion engine connected to the subframe of FIG. 40 via the engine mounts of FIG. 45.

In the present example, the power unit is selected between an electric motor such as the electric motor 64 describe above and an internal combustion engine 500 (FIG. 46).

Figure 45:
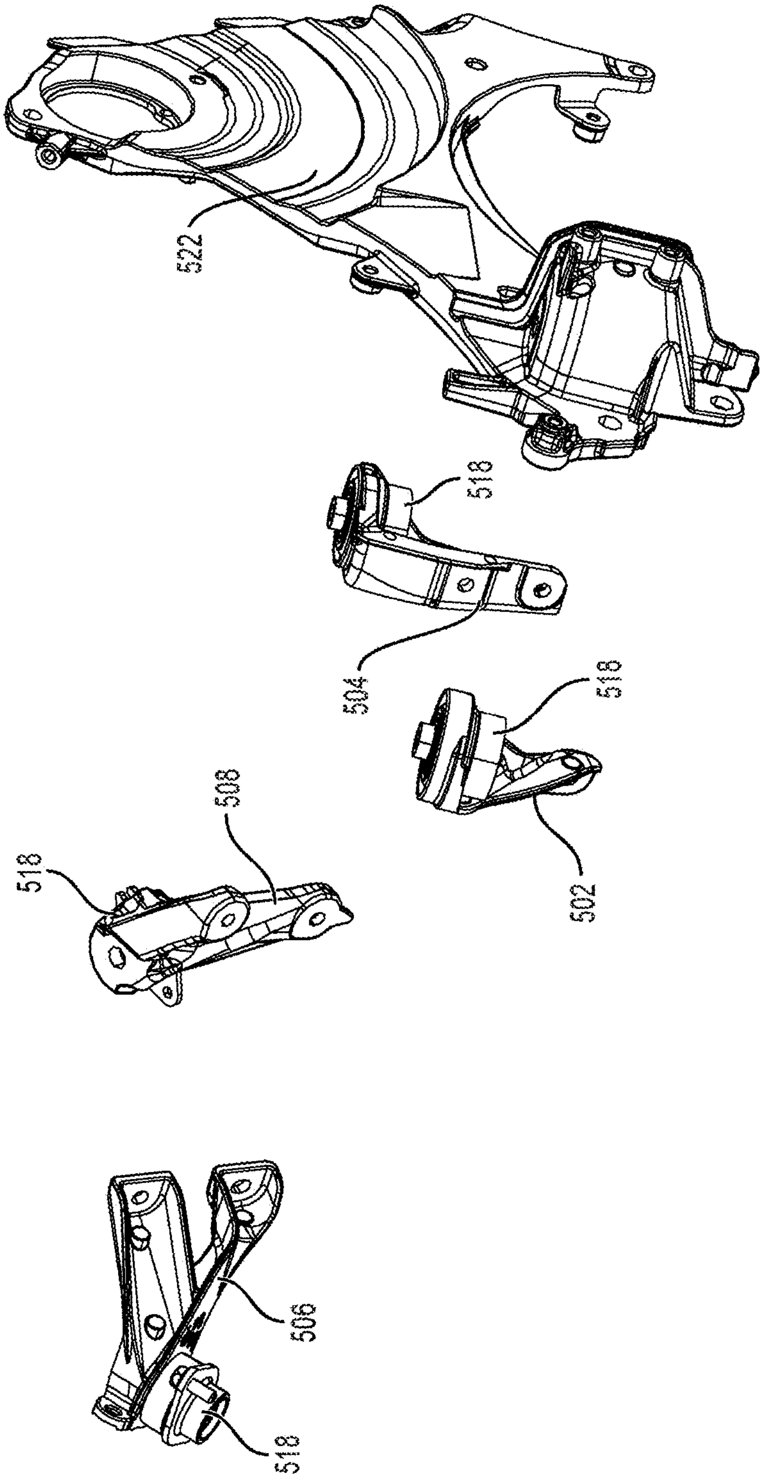
FIG. 45 is a perspective view taken from a front, left side of engine mounts to be used to mount an internal combustion engine to the subframe of FIG. 40.

In this embodiment, when the electric motor is selected, the battery pack 120C is connected to the subframe 20D using the spacers 264D, 266D, 268D, 270D, and the motor is connected to the subframe 20D in the same manner as described above for the electric motor 64. When the engine 500 is selected, the engine 500 is connected to a subframe 20F using engine mounts 502, 504, 506, 508 (FIG. 45). The subframes 20D and 20F differ from each other in that the subframe 20F has frame members 520 at a front thereof which are not present on the subframe 20D because they would interfere with the installation of the battery pack 102C. As such, connection points 510, 512, 514, 516 on the subframes 20D and 20F are in the same position. It is contemplated that there could be other differences between the subframes 20D, 20F while keeping the connection points 510, 512, 514, 516 in the same positions. It is also contemplated that the subframes 20D, 20F could be identical. As the connection points 510, 512, 514, 516 on the subframes 20D and 20F are in the same position, a direction and a magnitude of a vector extending from the connection point 510 to the connection point 512 of the subframe 20D are identical to a direction and a magnitude of a vector extending from the connection point 510 to the connection point 512 of the subframe 20F; a direction and a magnitude of a vector extending from the connection point 510 to the connection point 514 of the subframe 20D are identical to a direction and a magnitude of a vector extending from the connection point 510 to the connection point 514 of the subframe 20F; and a direction and a magnitude of a vector extending from the connection point 510 to the connection point 516 of the subframe 20D are identical to a direction and a magnitude of a vector extending from the connection point 510 to the connection point 516 of the subframe 20F.

As the battery pack 120C and the engine 500 are structurally different, the connection points on the battery pack 120C used for connecting the spacers 264D, 266D, 268D, 270D between the battery pack 120C and the subframe 20D are not in the same position as the connection points on the engine 500 used for connecting the engine mounts 502, 504, 506, 508 between the engine 500 and the subframe 20F. However, the spacers 264D, 266D, 268D, 270D connect to the connection points 510, 512, 514, 516 (some of which are hidden in the figures) on the subframe 20D which are in the same position on the subframe 20F for connecting the engine mounts 502, 504, 506, 508. This makes manufacturing the vehicle with an electric motor 64 and the vehicle with the internal combustion engine 500 simpler as factory workers can more easily adapt between assembling the two types of vehicles. The spacers 264D, 266D, 268D, 270D and the engine mounts 502, 504, 506, 508 are shaped to provide a connection between these connections points 510, 512, 514, 516 on the subframes 20D, 20F and the corresponding connection points on the battery pack 120C and the engine 500 respectively.

The spacers 264D, 266D, 268D, 270D provide a rigid connection between the battery pack 120C and the subframe 20D. The engine mounts 502, 504, 506, 508 each include an elastomeric damper 518 for reducing the transmission of vibrations between the engine 500 and the subframe 20F.

The method begins with selecting the power unit between the electric motor and the internal combustion engine 500. Then, based on the selected one of the motor and the engine 500, the frame 20D or 20F is selected, and the spacers 264D, 266D, 268D, 270D or the engine mounts 502, 504, 506, 508 are selected.

As in the method previously described above, in response to selecting the electric motor, the spacers 264D, 266D, 268D and 270D are disposed between the battery pack 120C and the sides of the subframe 20D, and the battery pack 120C is connected to the sides of the subframe 20D via the spacers 264D, 266D, 268D and 270D. The rest of the snowmobile is then assembled as described above.

With reference to FIGS. 45 and 46, in response to selecting the engine 500, the the engine mounts 502, 504, 506, 508 are disposed between the engine 500 and the sides of the subframe 20F, and the engine 500 is connected to the sides of the subframe 20F via the the engine mounts 502, 504, 506, 508. A side support 522 is connected to the left side of the subframe 20F. The side support 522 is used to support a driven CVT pulley and a jackshaft (not shown) used to transmit torque from the engine 500 to the drive track 60. The rest of the snowmobile is then assembled, which includes fluidly connecting the heat exchanger 146 to the engine 500.

Alternative Connection Between Electric Motor and Drive Track

Turning now to FIGS. 33 to 38, an alternative embodiment of an operative connection between the electric motor 64 and the drive track 60 will be described. Components shown in the embodiment of FIGS. 33 to 38 that are the same or similar to those described above with respect to FIGS. 1 to 32 have been labeled with the same reference numerals and will not be described again.

Figure 35:
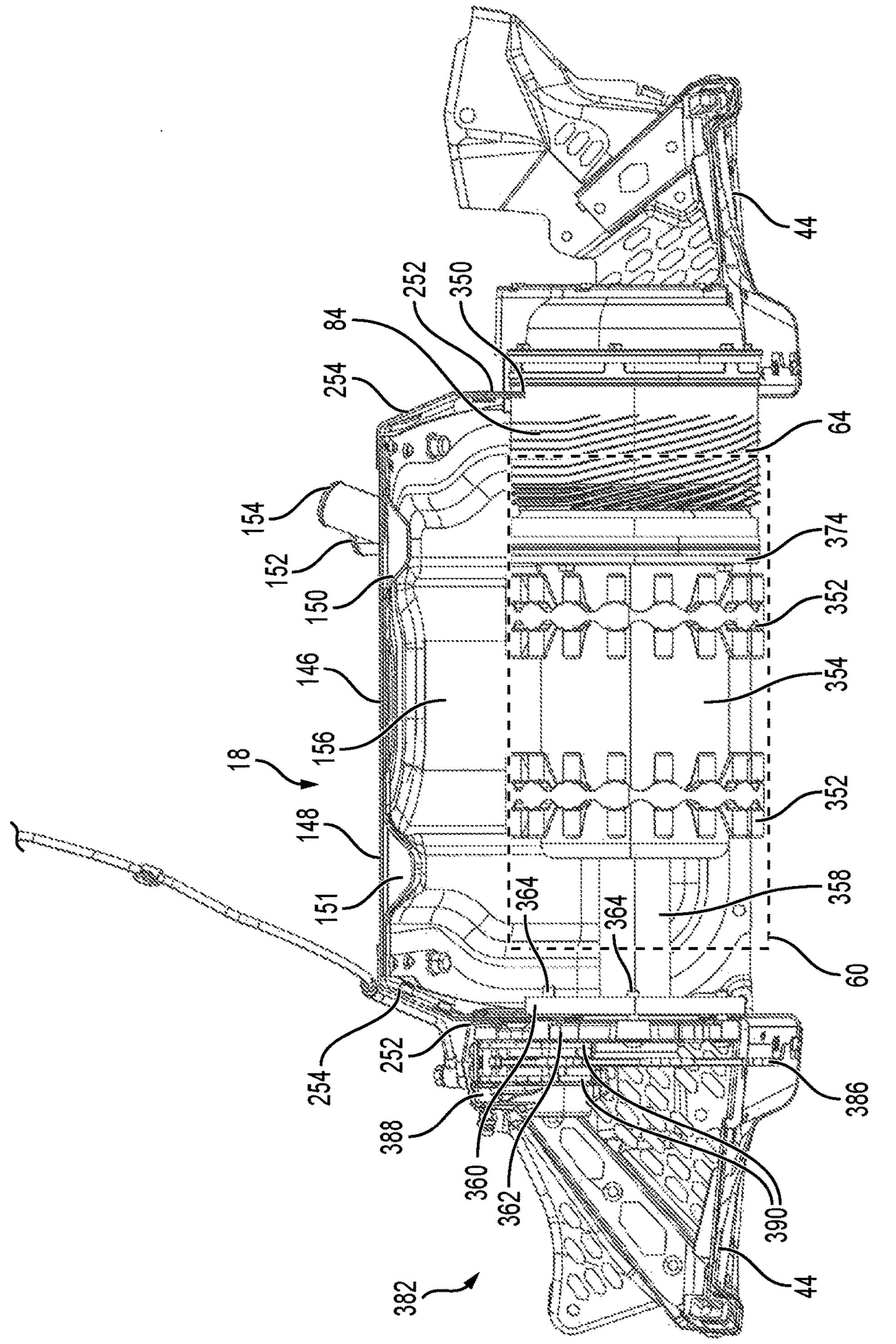
FIG. 35 is a rear elevation view a partial cross-section of the tunnel, the electric motor, its associated drive components, and a brake assembly taken along line 35-35 of FIG. 33.
Figure 36:
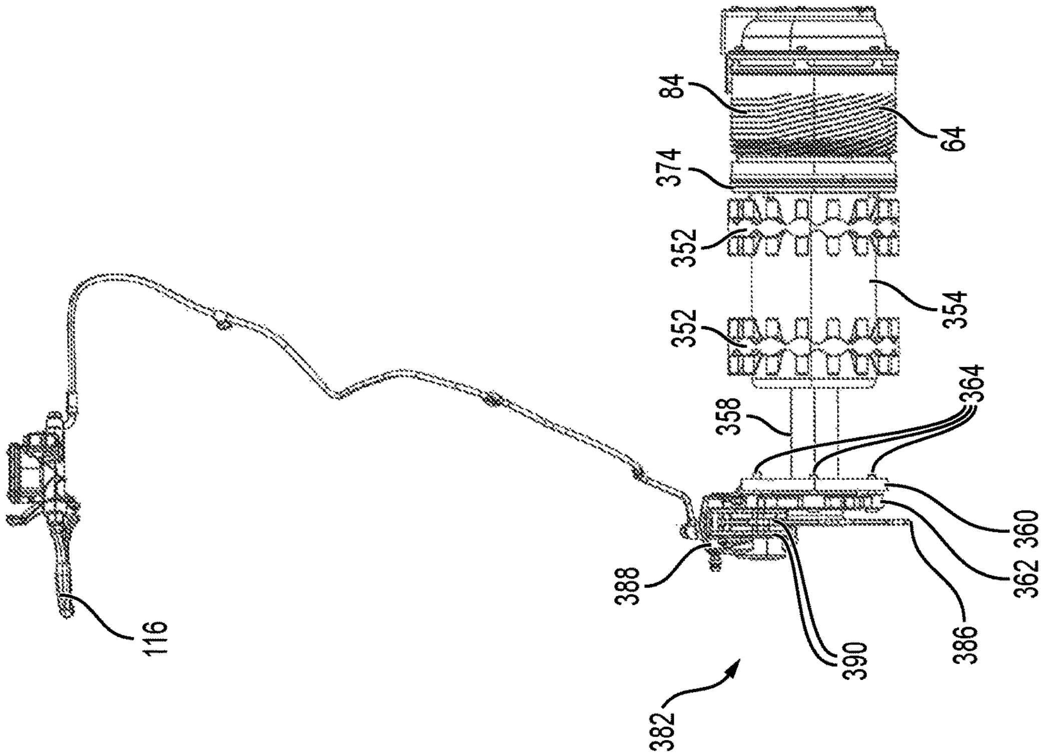
FIG. 36 is a rear elevation view of the electric motor, its associated drive components, and the brake assembly of FIG. 35.

In this embodiment, the electric motor 64 extends through an aperture 350 in a right side 252 of the tunnel 18 and is fastened to the right side 252 of the tunnel 18. As a result, part of the electric motor 64 is disposed laterally outward of the right side 252 of the tunnel 18 over the right footrest 44 and part of the electric motor 64 is disposed laterally inward of the right side 252 of the tunnel 18. Part of electric motor 64 is laterally between the lateral edges of the drive track 60 as can be seen in FIG. 35. The electric motor 64 is vertically lower than the top of the tunnel 18. The electric motor 64 is oriented such that the output shaft 82 of the electric motor 64 extends from a left side of the housing 84 of the electric motor 64. It is contemplated that in some embodiments, the electric motor 64 could be mounted to the left side 252 of the tunnel 18.

Two drive sprockets 352 are connected to a drive sleeve 354 and rotate therewith. As can be seen in FIG. 35, the drive sleeve 354 is disposed laterally between the sides 252 of the tunnel 18 and laterally between the lateral edges of the drive track 60. The drive sleeve 354, and therefore the drive sprockets 352, are operatively connected to the output shaft 82 of the electric motor 64. A reduction gearset 356 is operatively connected between the output shaft 82 of the electric motor 64 and the drive sleeve 354 such that the electric motor 64 can drive the drive sprockets 352 as will be described in more detail below. The drive sprockets 352 have axial teeth which engage inner lugs (not shown) of the drive track 60, thereby causing the drive track 60 to turn around the rear suspension assembly 62, thereby causing the snowmobile 10 to be propelled forward or rearward depending on the direction of rotation of the drive track 60. It is contemplated that there could be only one or more than two drive sprockets 352.

An axle 358 extends through the drive sleeve 354 and the drive sprockets 352. The output shaft 82, the drive sprockets 352, the drive sleeve 254 and the axle 358 are coaxial. The electric motor 64 is disposed on the right side of the axle 358. The left end of the axle 358 is connected to the left side 252 of the tunnel 18 via two rings 360, 262. The left end of the axle 358 is received inside the ring 360. The left side 252 of the tunnel 18 is sandwiched between the two rings 360, 362, with the ring 360 being disposed inside the tunnel 18 and the ring 362 being disposed outside the tunnel 18. Fasteners 364 extend through the ring 362, the left side 252 of the tunnel 18, and the ring 360 to fasten these components to each other. As such, in the present embodiment, the axle 358 is rotationally fixed and the drive sleeve 354 rotates about the axle 358 with the drive sprockets 352. As the electric motor 64, the drive sprockets 352, the drive sleeve 354, the reduction gearset 356 and the axle 358 are disposed behind the front of the tunnel 18, part of the battery pack 120 is disposed forward of these components.

Figure 37:
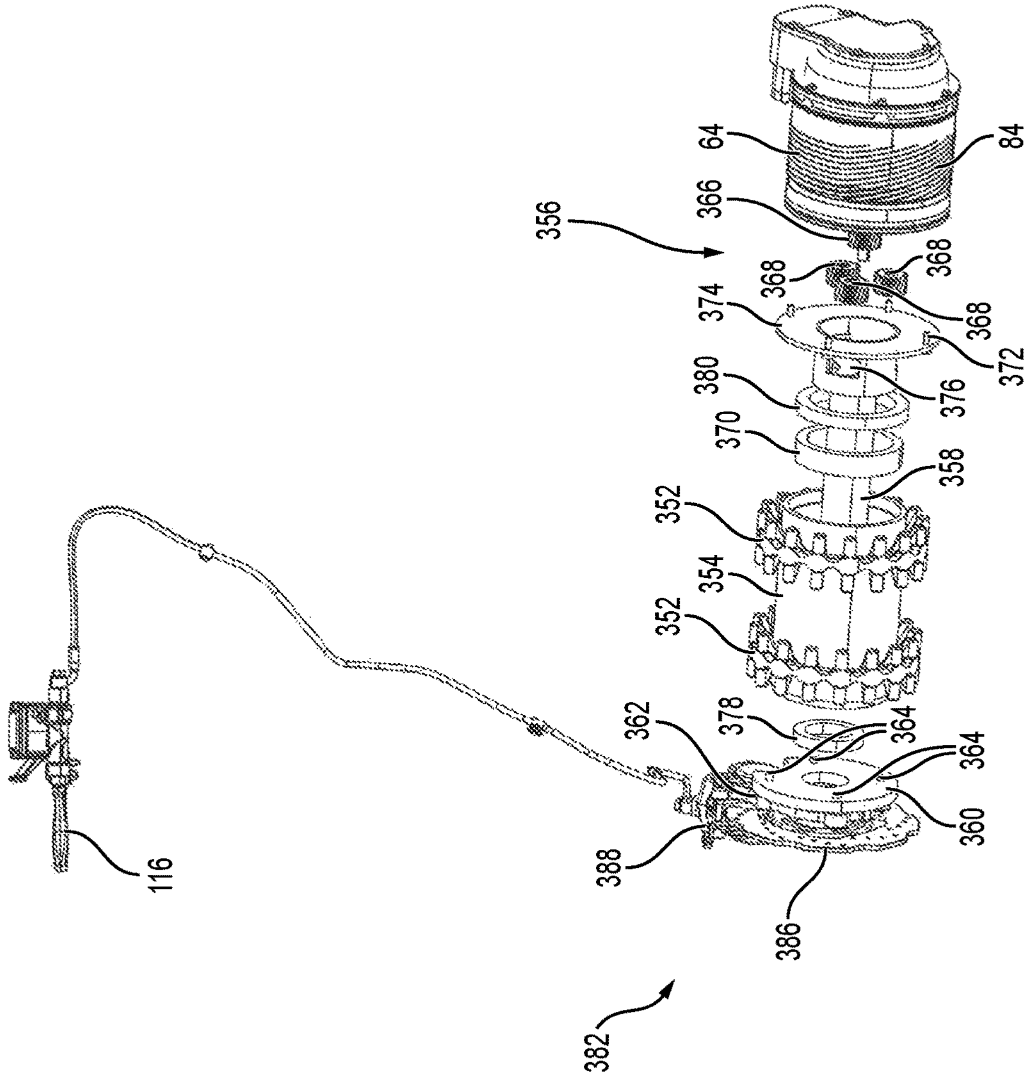
FIG. 37 is a perspective view, take from a rear, right side of a partially exploded view of the components of FIG. 36.
Figure 38:
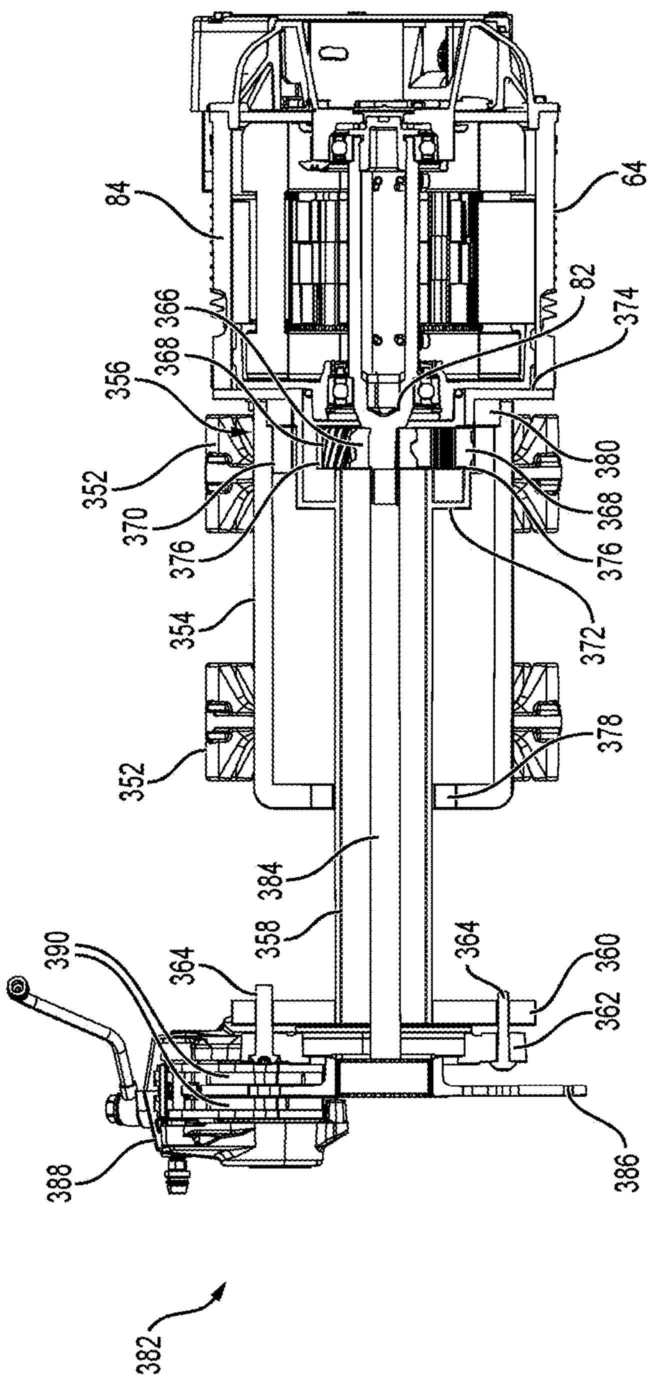
FIG. 38 is a cross-section taken along line 35-35 of FIG. 33 of the components of FIG. 36.

With reference to FIGS. 37 and 38, in the present embodiment, the reduction gearset 356 is a planetary gearset 356, but it is contemplated that in other embodiments as different type of reduction gearset could be used. The planetary gearset 356 is disposed inside of the drive sleeve 354 as can be seen in FIG. 38. The planetary gearset 356 has a sun gear 366, three planet gears 368, a ring gear 370 and a holder 372. It is contemplated that there could be more of less than three planet gears 368.

The holder 372 has a flange 374 fastened to the housing 84 of the electric motor 64. The right end of the axle 358 is connected to the holder 372. As such the holder 372 is rotationally fixed. The holder 372 defines three windows 376.

The sun gear 366 is connected to and rotates with the output shaft 82 of the electric motor 64. The sun gear 366 is disposed inside the holder 372. The planet gears 368 are disposed about the sun gear 366 and engage the sun gear 366 to be driven by the sun gear 366. The planet gears 368 are rotationally mounted on shafts (not shown) connected to the holder 372. The planet gears 368 are rotationally connected to the holder 372 via these shafts such that when the output shaft 82 of the electric motor 64 turns, the planet gears 368 rotate about their respective shafts, but the shafts and therefore the gears 368 do not rotate around the sun gear 366. Each planet gear 366 is aligned with one of the windows 376 and protrudes from the holder 372 by the windows 376. The ring gear 370 is connected to the inside of the drive sleeve 354 so as to rotate with and drive the drive sleeve 354. The ring gear 370 is coaxial with the sun gear 366 and is disposed around the sun gear 366, the planet gears 368 and part of the holder 372. The ring gear 370 engages and is driven by the planet gears 368 which are disposed radially between the sun gear 366 and the ring gear 370. In response to rotation of the output shaft 82, the sun gear 366 drives the planet gears 368, which drive the ring gear 370, which drive the drive sleeve 354 and drive sprockets 352. The ring gear 370 turns slower than the output shaft 82 of the electric motor 64.

A bearing 378 is provided between the left end of the drive sleeve 354 and the axle 358. A bearing 380 is provided between the right end of the drive sleeve 354. The bearings 378, 380 rotationally connect the drive sleeve 354 to the axle 358.

A brake assembly 382 is connected to the output shaft 82 of the electric motor 64 via a brake shaft 384 to brake the output shaft 82 and thereby decelerate the snowmobile 10. The brake shaft 384 passes through the axle 358 and is coaxial with the output shaft 82. The brake assembly 382 is disposed outside the tunnel 18 to the left of the left side 252 of the tunnel 18. As such, the drive sprockets 352 and the drive sleeve 354 are disposed laterally between the brake assembly 382 and the electric motor 64.

In the present embodiment, the brake assembly 382 is a disc brake assembly 382, but other types of brake assemblies are contemplated. The disc brake assembly 382 has a disc 386 connected to the end of the brake shaft 384. A brake caliper assembly 388 including brake pads 390 (FIG. 38) straddles a top part of the disc 386. The brake caliper assembly 388 is hydraulically actuated in response to actuation of the brake lever 116.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. An electric snowmobile comprising:
- a frame having a tunnel;
- a seat connected to the tunnel;
- at least one ski operatively connected to the frame;
- a drive track disposed at least in part under the tunnel;
- an electric motor supported by the frame, the electric motor being operatively connected to the drive track;
- a battery pack connected to the frame and electrically connected to the electric motor;
- a charger electrically connected to the battery pack; and
- a cooling and heating system comprising:
  - a valve having an inlet, a first outlet and a second outlet;
  - a heat exchanger connected to the tunnel or defining part of the tunnel, the heat exchanger being fluidly connected to the first outlet of the valve;
  - a heater fluidly connected to the second outlet of the valve; and
  - a pump fluidly connected to the inlet of the valve for causing coolant flow through the cooling and heating system; and
  - a temperature sensor for sensing a temperature of coolant in the cooling and heating system;
  - in a first position of the valve:
    - the first outlet of the valve being open;
    - the second outlet of the valve being closed; and
    - coolant pumped by the pump flowing:
      - from the valve to the heat exchanger,
      - from the heat exchanger to the charger, the battery pack and the electric motor, and
      - from the charger, the battery pack and the electric motor to the valve;
  - in a second position of the valve:
    - the first outlet of the valve being closed;
    - the second outlet of the valve being open; and
    - coolant pumped by the pump flowing:
      - from the valve to the heater,
      - from the heater to the battery pack and the electric motor, and
      - from the battery pack and the electric motor to the valve.

2. The electric snowmobile of claim 1, wherein in the first position of the valve, coolant pumped by the pump flows sequentially from the valve to the heat exchanger, from the heat exchanger to the charger, from the charger to the battery pack, from the battery pack to the electric motor, and from the electric motor to the valve.

3. The electric snowmobile of claim 1, wherein in the first position of the valve, coolant pumped by the pump flows sequentially from the charger to the heater, and from the heater to the battery pack.

4. The electric snowmobile of claim 1, wherein in the second position of the valve, coolant pumped by the pump flows sequentially from the valve to the heater, from the heater to the battery pack, from the battery pack to the electric motor, and from the electric motor to the valve.

5. The electric snowmobile of claim 1, wherein in the second position of the valve, coolant pumped by the pump bypasses the heat exchanger.

6. The electric snowmobile of claim 1, wherein in the second position of the valve, coolant pumped by the pump bypasses the charger.

7. The electric snowmobile of claim 1, wherein in the first and second positions of the valve, coolant pumped by the pump flows sequentially from the battery pack to the pump, and from the pump to the electric motor.

8. The electric snowmobile of claim 1, further comprising an inverter electrically connected to the battery pack;
- wherein in the first and second positions of the valve, coolant pumped by the pump flows sequentially from the inverter to the battery pack.

9. The electric snowmobile of claim 1, wherein the temperature sensor is a thermistor.

10. The electric snowmobile of claim 1, wherein:
- the heat exchanger is fluidly connected between the first outlet of the valve and the charger;
- the charger is fluidly connected between the heat exchanger and the heater;
- the heater is fluidly connected between the charger and the battery pack;
- the heater is fluidly connected between the second outlet of the valve and the battery pack;
- the battery pack is fluidly connected between the heater and the electric motor; and
- the electric motor is fluidly connected between the battery pack and the inlet of the valve.

11. The electric snowmobile of claim 10, wherein the pump is fluidly connected between the battery pack and the electric motor.

12. The electric snowmobile of claim 1, wherein the cooling and heating system further comprises an expansion tank fluidly connected to the pump.

13. The electric snowmobile of claim 1, wherein in response to the temperature sensed by the temperature sensor being below a predetermined temperature:
- moving the valve to the second position of the valve.

14. The electric snowmobile of claim 13, wherein in response to the temperature sensed by the temperature sensor being below a predetermined temperature and to the valve being in the second position of the valve:
- turning the heater on in response to the charger being powered by an external power source.

15. The electric snowmobile of claim 13, wherein in response to the temperature sensed by the temperature sensor being below a predetermined temperature and to the valve being in the second position of the valve:
- turning the heater off in response to the snowmobile being in use.

16. The electric snowmobile of claim 15, wherein in response to the temperature sensed by the temperature sensor being below the predetermined temperature, to the valve being in the second position of the valve, and to the snowmobile being in use:
- applying electric power to the electric motor for generating heat in response to the snowmobile being at rest.

17. The electric snowmobile of claim 13, wherein:
- the predetermined temperature is a first predetermined temperature; and in response to a temperature sensed by the temperature sensor being above a second predetermined temperature:

moving the valve to the first position of the valve, the second predetermined temperature being higher than the first predetermined temperature.

18. The electric snowmobile of claim 1, wherein in response to the temperature sensed by the temperature sensor being above a predetermined temperature:

moving the valve to the first position of the valve.

* * * * *